US009614621B2

(12) United States Patent
Ishihara et al.

(10) Patent No.: US 9,614,621 B2
(45) Date of Patent: Apr. 4, 2017

(54) SIGNAL GENERATING CIRCUIT, OPTICAL SIGNAL TRANSMITTING APPARATUS, SIGNAL RECEIVING CIRCUIT, METHOD FOR ESTABLISHING OPTICAL SIGNAL SYNCHRONIZATION, AND OPTICAL SIGNAL SYNCHRONIZATION SYSTEM

(71) Applicant: Nippon Telegraph and Telephone Corporation, Tokyo (JP)

(72) Inventors: Koichi Ishihara, Yokosuka (JP); Takayuki Kobayashi, Yokosuka (JP); Riichi Kudo, Yokosuka (JP); Yasushi Takatori, Atsugi (JP); Munehiro Matsui, Yokosuka (JP); Masato Mizoguchi, Yokosuka (JP); Akihide Sano, Yokosuka (JP); Shogo Yamanaka, Yokosuka (JP); Etsushi Yamazaki, Yokosuka (JP); Yutaka Miyamoto, Yokosuka (JP); Eiji Yoshida, Yokosuka (JP); Tadao Nakagawa, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 328 days.

(21) Appl. No.: 14/550,424

(22) Filed: Nov. 21, 2014

(65) Prior Publication Data
US 2015/0078762 A1    Mar. 19, 2015

Related U.S. Application Data

(62) Division of application No. 13/318,757, filed as application No. PCT/JP2010/003331 on May 18, 2010, now Pat. No. 8,929,750.

(30) Foreign Application Priority Data

| May 18, 2009 | (JP) | 2009-120301 |
| May 18, 2009 | (JP) | 2009-120302 |
| Jul. 10, 2009 | (JP) | 2009-164254 |

(51) Int. Cl.
H04B 10/12 (2006.01)
H04B 10/50 (2013.01)
(Continued)

(52) U.S. Cl.
CPC ....... H04B 10/50 (2013.01); H04B 10/07951 (2013.01); H04B 10/2513 (2013.01);
(Continued)

(58) Field of Classification Search
CPC .......... H04B 10/07951; H04B 10/2513; H04B 10/50; H04B 10/556; H04B 10/616; H04B 10/6161; H04L 7/027
See application file for complete search history.

(56) References Cited

U.S. PATENT DOCUMENTS

| 5,222,103 A | 6/1993 | Gross |
| 5,390,185 A | 2/1995 | Hooijmans et al. |

(Continued)

FOREIGN PATENT DOCUMENTS

| CN | 101282175 A | 10/2008 |
| CN | 101283560 A | 10/2008 |

(Continued)

OTHER PUBLICATIONS

Office Action, U.S. Appl. No. 14/550,262, Nov. 24, 2015.
(Continued)

*Primary Examiner* — Ken N Vanderpuye
*Assistant Examiner* — Amritbir Sandhu
(74) *Attorney, Agent, or Firm* — Harness, Dickey & Pierce, P.L.C.

(57) ABSTRACT

To enable signal position detection, frequency offset compensation, clock offset compensation, and chromatic disper-
(Continued)

sion amount estimation in a communication system based on coherent detection using an optical signal, even on a signal having a great offset in an arrival time depending on a frequency due to chromatic dispersion. An optical signal transmitting apparatus generates specific frequency band signals having power concentrated on two or more specific frequencies and transmits a signal including the specific frequency band signals. An optical signal receiving apparatus converts a received signal into a digital signal, detects positions of the specific frequency band signals from the converted digital signal, estimates frequency positions of the detected specific frequency band signals, and detects a frequency offset between an optical signal receiving apparatus and an optical signal transmitting apparatus. Moreover, the optical signal receiving apparatus detects a clock offset between the optical signal receiving apparatus and the optical signal transmitting apparatus from an interval between the estimated frequency positions of the specific frequency band signals. Furthermore, the optical signal receiving apparatus estimates temporal positions of the detected specific frequency band signals and detects a chromatic dispersion amount from a difference between the temporal positions of the specific frequency band signals corresponding to different frequencies.

5 Claims, 29 Drawing Sheets

(51) Int. Cl.
| | |
|---|---|
| H04B 10/079 | (2013.01) |
| H04B 10/2513 | (2013.01) |
| H04B 10/556 | (2013.01) |
| H04B 10/61 | (2013.01) |
| H04L 7/027 | (2006.01) |

(52) U.S. Cl.
CPC ......... *H04B 10/556* (2013.01); *H04B 10/616* (2013.01); *H04B 10/6161* (2013.01); *H04L 7/027* (2013.01)

(56) References Cited

U.S. PATENT DOCUMENTS

| | | | |
|---|---|---|---|
| 5,546,190 | A | 8/1996 | Hill et al. |
| 6,407,846 | B1 | 6/2002 | Myers et al. |
| 6,469,812 | B2 | 10/2002 | McKiel, Jr. |
| 6,522,697 | B1 | 2/2003 | Spickermann |
| 6,608,863 | B1 | 8/2003 | Onizawa et al. |
| 6,735,259 | B1* | 5/2004 | Roberts ........ H04L 7/0337 375/316 |
| 6,741,643 | B1 | 5/2004 | McGibney |
| 6,912,359 | B2 | 6/2005 | Blumenthal et al. |
| 7,925,169 | B2 | 4/2011 | Griffin |
| 7,995,930 | B2 | 8/2011 | Yoneyama et al. |
| 8,179,995 | B2 | 5/2012 | Ishihara et al. |
| 8,218,979 | B2 | 7/2012 | Liu |
| 8,355,637 | B2 | 1/2013 | Sano et al. |
| 8,406,635 | B2 | 3/2013 | Nakashima et al. |
| 8,437,638 | B2 | 5/2013 | Kobayashi et al. |
| 8,526,828 | B2 | 9/2013 | Nakashima et al. |
| 8,787,769 | B2 | 7/2014 | Ishihara et al. |
| 2003/0002112 | A1 | 1/2003 | Hirano et al. |
| 2004/0156309 | A1 | 8/2004 | Chadha et al. |
| 2005/0107045 | A1 | 5/2005 | Kroeger |
| 2005/0107145 | A1 | 5/2005 | Karashima et al. |
| 2005/0196176 | A1 | 9/2005 | Sun et al. |
| 2006/0013597 | A1 | 1/2006 | Crivelli et al. |
| 2006/0285855 | A1 | 12/2006 | Sun et al. |
| 2007/0165294 | A1 | 7/2007 | Witzel |
| 2007/0196109 | A1 | 8/2007 | Al-Chalabi |
| 2007/0213013 | A1 | 9/2007 | Kim |
| 2007/0291853 | A1 | 12/2007 | Kim et al. |
| 2008/0292027 | A1* | 11/2008 | Liu ........ H04B 1/0003 375/340 |
| 2009/0074428 | A1* | 3/2009 | Liu ........ H04B 10/2513 398/208 |
| 2009/0116844 | A1 | 5/2009 | Tanaka et al. |
| 2009/0129787 | A1* | 5/2009 | Li ........ H04B 10/61 398/208 |
| 2009/0168939 | A1 | 7/2009 | Constantinidis et al. |
| 2009/0169213 | A1 | 7/2009 | Lowery et al. |
| 2009/0190675 | A1 | 7/2009 | Ling et al. |
| 2009/0225913 | A1 | 9/2009 | Nakahara et al. |
| 2010/0028011 | A1* | 2/2010 | Kaneda ........ H04B 10/61 398/115 |
| 2010/0074627 | A1 | 3/2010 | Chen et al. |
| 2010/0104284 | A1 | 4/2010 | Liu et al. |
| 2010/0111543 | A1 | 5/2010 | Chow et al. |
| 2010/0150555 | A1 | 6/2010 | Wang et al. |
| 2010/0178057 | A1* | 7/2010 | Shieh ........ H04L 25/0224 398/79 |
| 2010/0189445 | A1* | 7/2010 | Nakashima ........ H04B 10/60 398/152 |
| 2010/0238787 | A1 | 9/2010 | Guey |
| 2010/0247113 | A1* | 9/2010 | Kaneda ........ H04B 10/60 398/208 |
| 2010/0329677 | A1* | 12/2010 | Kaneda ........ H04B 10/60 398/65 |
| 2010/0329683 | A1* | 12/2010 | Liu ........ H04B 10/2513 398/81 |
| 2010/0329698 | A1* | 12/2010 | Nakashima ........ H04B 10/60 398/208 |
| 2011/0002689 | A1 | 1/2011 | Sano et al. |
| 2011/0129041 | A1 | 6/2011 | Ishihara et al. |
| 2011/0150505 | A1* | 6/2011 | Roberts ........ H04B 10/60 398/208 |
| 2012/0033965 | A1* | 2/2012 | Zhang ........ H04B 10/611 398/38 |
| 2012/0039603 | A1 | 2/2012 | Wiegner et al. |
| 2012/0057863 | A1 | 3/2012 | Winzer et al. |
| 2012/0070159 | A1* | 3/2012 | Ishihara ........ H04B 10/07951 398/202 |
| 2012/0099864 | A1* | 4/2012 | Ishihara ........ H04B 3/06 398/65 |
| 2012/0121274 | A1* | 5/2012 | Fludger ........ H04B 10/61 398/208 |
| 2012/0128376 | A1* | 5/2012 | Sun ........ H04B 10/6162 398/208 |
| 2012/0315043 | A1 | 12/2012 | Nakagawa et al. |
| 2013/0028595 | A1 | 1/2013 | Nakagawa et al. |
| 2013/0058649 | A1* | 3/2013 | Li ........ H04B 10/2572 398/43 |
| 2013/0070874 | A1 | 3/2013 | Nakagawa et al. |
| 2013/0108271 | A1* | 5/2013 | Tang ........ H04L 7/0008 398/66 |
| 2013/0115903 | A1 | 5/2013 | Kroeger et al. |
| 2013/0238951 | A1 | 9/2013 | Guha |
| 2013/0251379 | A1 | 9/2013 | Hueda et al. |
| 2014/0126916 | A1 | 5/2014 | Ota |
| 2014/0341595 | A1 | 11/2014 | Harley et al. |
| 2015/0229410 | A1* | 8/2015 | Magri ........ H04B 10/25133 398/26 |

FOREIGN PATENT DOCUMENTS

| | | |
|---|---|---|
| CN | 101310458 A | 11/2008 |
| JP | 7046224 | 2/1995 |
| JP | 2006-115454 A | 4/2006 |
| JP | 2006-262452 A | 9/2006 |

(56) References Cited

FOREIGN PATENT DOCUMENTS

| JP | 2009-512365 A | 3/2009 |
|---|---|---|
| WO | 2007/045070 A1 | 4/2007 |

OTHER PUBLICATIONS

Communication pursuant to Article 94(3) EPC, European Patent Application No. 10 777 559.5, Feb. 8, 2016.
Litwin, Louis, et al., "The principles of OFDM," RF Signal Processing, Jan. 2001, pp. 30-48.
"Phase-shift keying," Wikipedia, the free encyclopedia, retrieved on Apr. 17, 2016, https://en.wikipedia.org/wiki/Phase-shift_keying.
Final Office Action, U.S. Appl. No. 14/550,262, Apr. 28, 2016.
Kudo, R., et al., "Single carrier transmission with two-stage overlap frequency domain equalisation for long-haul optical systems," Electronics Letters, vol. 45, No. 3, Jan. 29, 2009.
Jansen, S.L., et al., "20-Gb/s OFDM Transmission over 4,160-km SSMF Enabled by RF-Pilot Tone Phase Noise Compensation," Optical Fiber Communication Conference and Exposition and The National Fiber Optic Engineers Conference, paper PDP15, Mar. 25, 2007.
Communication pursuant to Article 94(3) EPC, European Patent Application No. 10 777 559.5, Jul. 6, 2015.
Notice of Allowance for related U.S. Appl. No. 14/550,262, mailed Aug. 9, 2016.
Liu, Ning, et al., "PMD and Chirp Effects Suppression in RF Tone-Based Chromatic Dispersion Monitoring," IEEE Photonics Technology Letters, vol. 18, No. 5, Mar. 1, 2006, pp. 673-675.
Notice of Reasons for Rejection, Japanese Patent Application No. 2011-514327, Oct. 9, 2012.
Search Report, European Patent Application No. 10777559.5, Dec. 5, 2012.
First Office Action, Chinese Patent Application No. 201080020412.1, Dec. 30, 2013.
Notice of Reasons for Rejection, Japanese Patent Application No. 2011-514327, Oct. 1, 2013.
Masahiro Morikura, "802.11 High-Speed Wireless LAN Textbook", Impress R & D Publishing, pp. 163-167, Apr. 2008 with partial English translation thereof.
H. Masuda, et al., "13.5-Tb/s (135x111-Gb/s/ch) No-Guard-Interval Coherent OFDM Transmission over 6,248 km using SNR Maximized Second-order DRA in the Extended L-band", OSA/OFC/NFOEC 2009, PDPB5.
Jianjun Yu, et al., "17 Tb/s (161x114 Gb/s) PolMux-RZ-8PSK transmission over 662 km of ultra-low loss fiber using C-band EDFA amplification and digital coherent detection", ECOC 2008, Th.3.E.2, Brussels, Belgium, Sep. 21-25, 2008.
L. Liu, et al., "Initial Tap Setup of Constant Modulus Algorithm for Polarization De-multiplexing in Optical Coherent Receivers", OSA/OFC/NFOEC 2009, OMT2, pp. 2-4.
Govind P. Agrawal, "Nonlinear Fiber Optics", Third Edition, Academic Press, pp. 63-65 and pp. 76-77, 2006.
J. J. Shynk, "Frequency-Domain and Multirate Adaptive Filtering," IEEE Signal Processing Magazine, vol. 9, issue 1, pp. 15-37, Jan. 1992.
Takaya Yamamoto, "Multimedia Transmission Technique Selected Book, Optical Fiber Communication Technique," Nikkan Kogyo Shimbun Ltd., p. 59, Jun. 26, 1995, First Issue of First Edition, with English translation thereof.
Takuya Ohara, et al., "OTN Standardization Trend", NTT Technical Journal, Jan. 2009, pp. 71-74, with English translation thereof.
S. M. Alamouti, "A Simple Transmit Diversity Technique for Wireless Communications," IEEE Journal on Select Areas in Communications, vol. 16, No. 8, pp. 1451-1458, Oct. 1998.
J. G. Proakis, "Digital Communications," Fourth Edition, McGraw-Hill, pp. 424-425, 2000.
International Search Report of the ISA, ISA/JP, Application No. PCT/JP2010/003331, mailed Aug. 17, 2010.
Office Action, U.S. Appl. No. 13/318,757, Jul. 15, 2013.
Office Action, U.S. Appl. No. 13/318,757, Nov. 22, 2013.
Office Action, U.S. Appl. No. 13/318,757, Jun. 3, 2014.
Notice of Allowance, U.S. Appl. No. 13/318,757, Sep. 3, 2014.

* cited by examiner $S(0)=1$
$S(1)=-1$

SIGNAL GENERATING CIRCUIT, OPTICAL SIGNAL TRANSMITTING APPARATUS, SIGNAL RECEIVING CIRCUIT, METHOD FOR ESTABLISHING OPTICAL SIGNAL SYNCHRONIZATION, AND OPTICAL SIGNAL SYNCHRONIZATION SYSTEM

TECHNICAL FIELD

The present invention relates to a signal generating circuit, an optical signal transmitting apparatus, a signal receiving circuit, a method for establishing optical signal synchronization, and an optical signal synchronization system for establishing synchronization between the optical signal transmitting apparatus and an optical signal receiving apparatus by transmitting and receiving a specific frequency band signal in optical communication, by detecting a signal position, a frequency offset and a clock offset between the optical signal transmitting apparatus and the optical signal receiving apparatus, and a chromatic dispersion amount, and by compensating for the same.

Priority is claimed on Japanese Patent Application Nos. 2009-120301 and 2009-120302, filed May 18, 2009, and Japanese Patent Application No. 2009-164254, filed Jul. 10, 2009, the contents of which are incorporated herein by reference.

BACKGROUND ART

In the field of optical communication, a communication system using a combination of a coherent detection scheme and signal processing for dramatically improving frequency utilization efficiency has attracted attention. This type of communication system can improve reception sensitivity, compared to a system built with direct detection. In addition, such a communication system is known to receive a transmitted signal as a digital signal, so that the communication system can perform signal position detection, frequency offset compensation, clock offset compensation, chromatic dispersion compensation, PMD (polarization-mode dispersion) compensation, and the like through signal processing of the received digital signal, and to have a high tolerance to signal quality degradation due to non-linear effects. Accordingly, introduction of such a communication system as a next-generation optical communication technique has been examined.

For example, in a wireless communication 802.11a standard, synchronization can be established by estimating a frequency offset or a clock offset using a configuration in which a short preamble or a long preamble is inserted into a transmission signal and by compensating for the offset based on the estimated result (see Non-Patent Document 1).

Further, in the field of conventional optical fiber communication, signal demodulation is performed by an analog differential detection process. Further, in a conventional optical transmission using a direct detection scheme, degradation of the signal quality is reduced using an optical compensator, such as a dispersion compensation fiber, and an electrical analog equalizer with respect to signal quality degradation factors for a transmission line such as chromatic dispersion and polarization-mode dispersion.

In recent years, a coherent transmission scheme using digital signal processing has been actively studied. This coherent transmission scheme can increase reception sensitivity, compared to the direct detection scheme. Further, the coherent transmission scheme is capable of accurately equalizing waveform distortion due to chromatic dispersion, polarization-mode dispersion, or the like by performing digital signal processing in a receiver. This dramatically increases a transmission distance of 100 Gb/s/ch optical signal particularly sensitive to the waveform distortion.

Digital coherent schemes exemplified in Non-Patent Documents 2 and 3 employ a method in which quasi-static chromatic dispersion is compensated for by a digital filter having a fixed number of taps (e.g., the number of taps is 2048 for the dispersion of 20000 ps/nm and for a signal at 28 G baud), and variable polarization-mode dispersion is compensated for by an adaptive filter with a small number of taps (e.g., about 10 to 12 taps for polarization-mode dispersion of 50 ps) using a blind algorithm.

In addition, polarization-division multiplexing transmission accompanying a high transmission rate has attracted attention, as exemplified in Non-Patent Document 4.

PRIOR ART DOCUMENT

Non-Patent Document

Non-Patent Document 1: Masahiro Morikura, "802.11 High-Speed Wireless LAN Textbook," Impress R&D Publishing, pp. 163-167, April, 2008

Non-Patent Document 2: H. Masuda, et al., "13.5-Tb/s (135×111-Gb/s/ch) No-Guard-Interval Coherent OFDM Transmission over 6,248 km using SNR Maximized Second-order DRA in the Extended L-band," OSA/OFC/NFOEC 2009, PDPB5.

Non-Patent Document 3: Jianjun Yu, et al., "17 Tb/s(161× 114 Gb/s) PolMux-RZ-8PSK transmission over 662 km of ultra-low loss fiber using C-band EDFA amplification and digital coherent detection," ECOC 2008, Th.3.E.2, Brussels, Belgium, 21-25 Sep. 2008.

Non-Patent Document 4: L. Liu, et al., "Initial Tap Setup of Constant Modulus Algorithm for Polarization De-multiplexing in Optical Coherent Receivers," OSA/OFC/NFOEC 2009, OMT2.

DISCLOSURE OF THE INVENTION

Problems to be Solved by the Invention

However, in optical communication, since there is a problem specific to an optical signal called chromatic dispersion, a reception bit is not correctly detected due to the chromatic dispersion and thus it is difficult for a receiving side to detect a short preamble and a long preamble. Further, there is another problem in that a transmitting apparatus requires a digital/analog conversion apparatus with a high quantization bit, and a system building cost is high.

Moreover, in the digital coherent schemes of Non-Patent Documents 2 and 3, it is necessary to separately measure chromatic dispersion in advance and manually input tap coefficients of a fixed-point digital filter to each of receivers for wavelength-division multiplexing (WDM) channels. Further, when the number of taps of an adaptive filter using a blind algorithm is increased to adaptively compensate for total chromatic dispersion, a convergence property is significantly degraded.

In a method for performing polarization-splitting on a transmitted signal, which is subjected to polarization-division multiplexing by the method of Non-Patent Document 4, using a conventional blind algorithm, there is a problem in that only one polarized wave can be demodulated due to effects of polarization-dependent loss or the like, and the stability of transmission is low.

In addition, problems caused by non-linear effects specific to optical fiber transmission and the instability of optical carriers due to high-speed optical fiber transmission cannot be ignored, and these problems limit the transmission distance and quality. For this reason, estimation and compensation of signal quality degradation factors are becoming important.

As described above, when high-speed optical fiber transmission is performed, degradation factors, e.g., a state of a transmission line such as dispersion (chromatic dispersion and polarization-mode dispersion), specific to the optical fiber transmission and a frequency variation of optical carriers, need to be estimated and compensated for at a receiver side.

The present invention has been made in view of such circumstances, and an object thereof is to provide a signal generating circuit, an optical signal transmitting apparatus, a signal receiving circuit, a method for establishing optical signal synchronization, and an optical signal synchronization system that are capable of performing signal position detection, frequency offset compensation, clock offset compensation, and chromatic dispersion amount estimation even on a signal having a large offset in an arrival time depending on a frequency due to chromatic dispersion, in a communication system based on coherent detection using an optical signal.

Moreover, an object of the present invention is to estimate a state of a transmission line and the instability specific to an optical transmitting apparatus using a known signal sequence group and realize improved transmission quality.

Means for Solving the Problems

In order to solve the above-described problems, a signal generating circuit of the present invention is a signal generating circuit in optical communication that includes: a specific frequency band signal generating circuit that generates a specific frequency band signal including, at a plurality of specific frequencies, signal components with a smaller frequency spread than a spectrum of a signal sequence to be transmitted; and at least one signal synthesizing circuit that receives an input of the specific frequency band signal generated by the specific frequency band signal generating circuit, and inserts the specific frequency band signal into the signal sequence to be transmitted, to generate a transmission signal sequence.

In the signal generating circuit of the present invention, the specific frequency band signal generating circuit may match a position of at least one frequency component included in both adjacent frequency channels in a frequency region in which the adjacent frequency channels overlap, to generate the specific frequency band signal.

In the signal generating circuit of the present invention, the specific frequency band signal generating circuit may match a position of at least one frequency component included in both adjacent frequency channels in a frequency region in which the adjacent frequency channels overlap, and may control an amplitude and a phase of the at least one frequency component so as to cancel each other, to generate the specific frequency band signal.

In the signal generating circuit of the present invention, the specific frequency band signal generating circuit may generate specific frequency band signals having a plurality of periods and specific frequency band signals obtained by rotating phases of the specific frequency band signals having the plurality of periods, and may synthesize or multiply the specific frequency band signals having the plurality of periods by the specific frequency band signals having the rotated phases to generate a signal obtained by synthesis or multiplication as the specific frequency band signal.

In the signal generating circuit of the present invention, the specific frequency band signal may be a binary phase shift keying (BPSK) signal sequence known between an optical signal transmitting apparatus and an optical signal receiving apparatus that perform the optical communication and configured by an alternating signal, and the at least one signal synthesizing circuit may insert at least one BPSK signal sequence into a front portion or an end portion of the signal sequence to be transmitted, to generate the transmission signal sequence.

In the signal generating circuit of the present invention, the BPSK signal sequence may be a sequence using a BPSK signal, a sequence using two point-symmetric points of a QPSK signal, or a sequence using two points of a point-symmetric signal in multilevel modulation.

In the signal generating circuit of the present invention, the at least one signal synthesizing circuit may periodically insert the BPSK signal sequence into the signal sequence to be transmitted, at constant intervals.

In the signal generating circuit of the present invention, the at least one signal synthesizing circuit may continuously and iteratively insert a plurality of BPSK signal sequences into the signal sequence to be transmitted.

In the signal generating circuit of the present invention, the at least one signal synthesizing circuit may determine a sequence length of the BPSK signal sequence based on a maximum delay difference of a state of a transmission line to be estimated.

In the signal generating circuit of the present invention, the at least one signal synthesizing circuit may switch an initial mode in which the optical signal transmitting apparatus transmits only a BPSK signal as a transmission signal and the optical signal receiving apparatus estimates a state of a transmission line and a data transmission mode in which the optical signal transmitting apparatus transmits a data signal and the optical signal receiving apparatus performs equalization and compensation using the state of the transmission line estimated in the initial mode.

In the signal generating circuit of the present invention, the at least one signal synthesizing circuit may insert signal sequences that are different for two polarized waves into the signal sequence to be transmitted, as the BPSK signal sequence.

An optical signal transmitting apparatus of the present invention includes: the signal generating circuit; and an electro-optical conversion circuit that converts the transmission signal sequence generated by the at least one signal synthesizing circuit into an optical signal.

An optical signal transmitting apparatus of the present invention includes: the signal generating circuit; and an electro-optical conversion/frequency-division multiplexing circuit that converts a plurality of signal sequences respectively generated by a plurality of signal synthesizing circuits in the signal generating circuit into optical signals corresponding to different frequency bands, and matches at least one frequency component of the converted optical signals.

A signal receiving circuit of the present invention is a signal receiving circuit in optical communication that includes: a photoelectric conversion circuit that converts an input optical signal into an electrical signal; an analog/digital conversion circuit that converts the electrical signal converted by the photoelectric conversion circuit into a digital signal; a Fourier transform circuit that performs a discrete Fourier transform on the digital signal converted by the analog/digital conversion circuit; a specific frequency band signal detecting circuit that detects a position in a frequency domain of a specific frequency band signal having power concentrated on two or more specific frequencies from a signal obtained by the discrete Fourier transform; and a reception signal property estimating circuit that estimates at least one of a frequency offset and a clock offset from the position of the specific frequency band signal detected by the specific frequency band signal detecting circuit.

In the signal receiving circuit of the present invention, the reception signal property estimating circuit may estimate a chromatic dispersion amount of an optical communication path from an offset in timing of appearance of the power of the specific frequency band signal, an offset in timing of disappearance of the power, or both the offset in timing of the appearance of the power and the offset in timing of the disappearance of the power.

The signal receiving circuit of the present invention may include a specific frequency band signal power storage circuit, wherein the Fourier transform circuit may perform the discrete Fourier transform at an interval smaller than or equal to the smaller of a length of the specific frequency band signal and a Fourier transform length, the specific frequency band signal detecting circuit may detect, for two or more frequencies, specific frequency band signal power values that are powers or amplitudes of the specific frequency band signal in a signal in a frequency domain subjected to the discrete Fourier transform by the Fourier transform circuit, and may store two or more values of an increasing value, a peak value, a decreasing value, and a minimum value among the detected specific frequency band signal power values, an individual arrival time difference calculated from the specific frequency band signal power values, or a coefficient that is calculated from the specific frequency band signal power values and is used in an calculation equation of the individual arrival time difference, in the specific frequency band signal power storage circuit, and the reception signal property estimating circuit may estimate an arrival time difference between specific frequency band signals corresponding to two or more frequency bands using the two or more values of the increasing value, the peak value, the decreasing value, and the minimum value among the detected specific frequency band signal power values, the individual arrival time difference calculated from the specific frequency band signal power values, or the coefficient used in the calculation equation of the individual arrival time difference, which are stored in the specific frequency band signal power storage circuit, and may estimate a chromatic dispersion amount of an optical communication path from the estimated arrival time difference.

The signal receiving circuit of the present invention may include a specific frequency band signal power storage circuit, and may further include a chromatic dispersion compensating circuit that applies an inverse property of chromatic dispersion to the digital signal converted by the analog/digital conversion circuit based on an estimated value of the chromatic dispersion amount estimated by the reception signal property estimating circuit, wherein the Fourier transform circuit may perform the discrete Fourier transform on the digital signal to which the inverse property of the chromatic dispersion has been applied, at an interval smaller than or equal to the smaller of a length of the specific frequency band signal and a Fourier transform length, the specific frequency band signal detecting circuit may detect specific frequency band signal power values that are powers or amplitudes of the specific frequency band signal in a signal in a frequency domain subjected to the discrete Fourier transform by the Fourier transform circuit, and may store two or more values of an increasing value, a peak value, a decreasing value, and a minimum value among the detected specific frequency band signal power values, an individual arrival time difference calculated from the specific frequency band signal power values, or a coefficient that is calculated from the specific frequency band signal power values and is used in a calculation equation of the individual arrival time difference, in the specific frequency band signal power storage circuit, and the reception signal property estimating circuit may estimate an arrival time difference of specific frequency band signals corresponding to two or more frequency bands using the two or more values of the increasing value, the peak value, the decreasing value, and the minimum value among the detected specific frequency band signal power values, the individual arrival time difference calculated from the specific frequency band signal power values, or the coefficient used in the calculation equation of the individual arrival time difference, which are stored in the specific frequency band signal power storage circuit, may estimate a chromatic dispersion amount of an optical communication path from the estimated arrival time difference, and may output the estimated chromatic dispersion amount to the chromatic dispersion compensating circuit.

In the signal receiving circuit of the present invention, the chromatic dispersion compensating circuit may delete at least part of content stored in the specific frequency band signal power storage circuit when changing a coefficient for chromatic dispersion compensation, and the reception signal property estimating circuit may store a chromatic dispersion amount of the optical communication path estimated for a new signal sequence in the specific frequency band signal power storage circuit.

In the signal receiving circuit of the present invention, the chromatic dispersion compensating circuit may apply the inverse property of the chromatic dispersion to the digital signal converted by the analog/digital conversion circuit based on the estimated value of the chromatic dispersion amount estimated by the reception signal property estimating circuit, and may notify the Fourier transform circuit of detection of the specific frequency band signal when the specific frequency band signal is detected, and the Fourier transform circuit may perform the discrete Fourier transform at the interval smaller than or equal to the smaller of the length of the specific frequency band signal and the Fourier transform length, and may output the signal subjected to the discrete Fourier transform to the specific frequency band signal detecting circuit when the detection of the specific frequency band signal is notified.

In the signal receiving circuit of the present invention, the chromatic dispersion compensating circuit may apply the inverse property of the chromatic dispersion to the digital signal converted by the analog/digital conversion circuit based on the estimated value of the chromatic dispersion amount estimated by the reception signal property estimating circuit, and may output a signal including the specific frequency band signal to the Fourier transform circuit, the Fourier transform circuit may perform the discrete Fourier transform on the signal including the specific frequency band signal output from the chromatic dispersion compensating circuit at an interval smaller than or equal to the smaller of the length of the specific frequency band signal and the Fourier transform length, and may output the signal subjected to the discrete Fourier transform to the specific frequency band signal detecting circuit when the specific frequency band signal is detected, and the specific frequency band signal detecting circuit may acquire two or more values of the increasing value, the peak value, the decreasing value, and the minimum value among the specific frequency band signal power values from the signal subjected to the discrete Fourier transform output from the Fourier transform circuit, and may store the two or more acquired values in the specific frequency band signal power storage circuit.

In the signal receiving circuit of the present invention, the specific frequency band signal detecting circuit may shift frequencies for which the specific frequency band signal power values are to be calculated, using information on a frequency offset estimated by the reception signal property estimating circuit or externally input frequency offset information when detecting the specific frequency band signal power values, which are the powers or the amplitudes of the specific frequency band signal in the signal in the frequency domain subjected to the discrete Fourier transform.

In the present invention signal receiving circuit, the Fourier transform circuit may perform the discrete Fourier transform on a signal that includes the specific frequency band signal and that has a length that is an integer multiple of the length of the specific frequency band signal, at the same interval as the length of the specific frequency band signal, and may output a signal obtained by the discrete Fourier transform to the specific frequency band signal detecting circuit.

In the signal receiving circuit of the present invention, the reception signal property estimating circuit may calculate the frequency offset from a centroid position of a signal distribution in a frequency domain of a received signal in which the specific frequency band signal has not been detected by the specific frequency band signal detecting circuit.

A method for establishing optical signal synchronization of the present invention includes: an optical signal generation step of generating specific frequency band signals having power concentrated on two or more specific frequencies; a digital signal acquisition step of receiving a signal including the specific frequency band signals generated in the optical signal generation step and converting the received signal into a digital signal; a signal position detection step of detecting positions of the specific frequency band signals from the digital signal converted in the digital signal acquisition step; a frequency offset detection step of estimating frequency positions of the specific frequency band signals detected in the signal position detection step and detecting a frequency offset between an optical signal receiving apparatus and an optical signal transmitting apparatus that perform optical communication; a clock offset detection step of estimating the frequency positions of the specific frequency band signals detected in the signal position detection step, and detecting a clock offset between the optical signal receiving apparatus and the optical signal transmitting apparatus from an interval between the frequency positions; and a chromatic dispersion amount detection step of estimating temporal positions of the specific frequency band signals detected in the signal position detection step, and detecting a chromatic dispersion amount from a difference between the temporal positions of the specific frequency band signals corresponding to different frequencies.

A method for establishing optical signal synchronization of the present invention includes: an optical signal generation step of generating specific frequency band signals having power concentrated on two or more specific frequencies; a digital signal acquisition step of receiving a signal including the specific frequency band signals generated in the optical signal generation step and converting the received signal into a digital signal; a chromatic dispersion compensation step of applying an inverse property of an estimated chromatic dispersion to the digital signal converted in the digital signal acquisition step; a specific frequency band signal power value calculation step of performing a discrete Fourier transform on the digital signal and calculating specific frequency band signal power values that are powers or amplitudes of the specific frequency band signals; a signal position detection step of detecting positions of the specific frequency band signals from the digital signal to which the inverse property of the estimated chromatic dispersion has been applied in the chromatic dispersion compensation step; a specific frequency band signal storage step of storing the specific frequency band signal power values detected in the signal position detection step; a frequency offset detection step of estimating frequency positions of the specific frequency band signals from the specific frequency band signal power values stored in the specific frequency band signal storage step, and detecting a frequency offset between an optical signal receiving apparatus and an optical signal transmitting apparatus that perform optical communication; a clock offset detection step of estimating the frequency positions of the specific frequency band signals from the specific frequency band signal power values stored in the specific frequency band signal storage step, and detecting a clock offset between the optical signal receiving apparatus and the optical signal transmitting apparatus from an interval between the frequency positions; and a chromatic dispersion amount detection step of estimating temporal positions of the specific frequency band signals from the specific frequency band signal power values stored in the specific frequency band signal storage step, and detecting a chromatic dispersion amount from a difference between the temporal positions of the specific frequency band signals corresponding to different frequencies.

In the method for establishing optical signal synchronization of the present invention, the specific frequency band signal power value calculation step may include shifting a frequency region when calculating the specific frequency band signal power values in accordance with an amount of the frequency offset detected in the frequency offset detection step.

An optical signal synchronization system of the present invention includes: an optical signal transmitting apparatus; and an optical signal receiving apparatus that performs optical communication with the optical signal transmitting apparatus, wherein the optical signal transmitting apparatus includes a specific frequency band signal generating circuit that generates specific frequency band signals having power concentrated on two or more specific frequencies, and the optical signal receiving apparatus includes: an analog/digital conversion circuit that receives a signal including the specific frequency band signals generated in the specific frequency band signal generating circuit, and converts the received signal into a digital signal; a specific frequency band signal detecting circuit that detects positions of the specific frequency band signals from the digital signal converted in the analog/digital conversion circuit; and a reception signal property estimating circuit that estimates frequency positions of the specific frequency band signals detected in the specific frequency band signal detecting circuit, detects a frequency offset between the optical signal receiving apparatus and the optical signal transmitting apparatus, detecting a clock offset between the optical signal receiving apparatus and the optical signal transmitting apparatus from an interval between the frequency positions, estimating temporal positions of the specific frequency band signals detected in the specific frequency band signal detecting circuit, and detecting a chromatic dispersion amount from a difference between the temporal positions of the specific frequency band signals corresponding to different frequencies.

An optical signal synchronization system of the present invention includes: an optical signal transmitting apparatus; and an optical signal receiving apparatus that performs optical communication with the optical signal transmitting apparatus, wherein the optical signal transmitting apparatus includes a specific frequency band signal generating circuit that generates specific frequency band signals having power concentrated on two or more specific frequencies, and the optical signal receiving apparatus includes: an analog/digital conversion circuit that receives a signal including the specific frequency band signals generated in the specific frequency band signal generating circuit, and converts the received signal into a digital signal; a chromatic dispersion compensating circuit that applies an inverse property of an estimated chromatic dispersion to the digital signal converted in the analog/digital conversion circuit; a Fourier transform circuit that performs a discrete Fourier transform on the digital signal; a specific frequency band signal detecting circuit that detects position of the specific frequency band signals from the digital signal to which the inverse property of the estimated chromatic dispersion has been applied in the chromatic dispersion compensating circuit; a specific frequency band signal storage circuit that stores specific frequency band signal power values that are powers or amplitudes of the specific frequency band signals detected in the specific frequency band signal detecting circuit; and a reception signal property estimating circuit that estimates frequency positions of the specific frequency band signals from the specific frequency band signal power values of the specific frequency band signals stored in the specific frequency band signal storage circuit, detects a frequency offset between the optical signal receiving apparatus and the optical signal transmitting apparatus, detects a clock offset between the optical signal receiving apparatus and the optical signal transmitting apparatus from an interval between the frequency positions, estimates temporal positions of the specific frequency band signals from the specific frequency band signal power values of the specific frequency band signals stored in the specific frequency band signal storage circuit, and detects a chromatic dispersion amount from a difference between the temporal positions of the specific frequency band signals corresponding to different frequencies.

Effects of the Invention

In accordance with the present invention, the signal generating circuit of an optical signal generates a specific frequency band signal including, at a plurality of specific frequencies, signal components with a smaller frequency spread in a frequency domain than the spectrum of a signal sequence to be transmitted and transmits the generated specific frequency band signal. Furthermore, the signal receiving circuit of the optical signal detects the specific frequency band signal and estimates at least one of a frequency offset and a clock offset from the detected specific frequency band signal. Thus, since the signal with a small spread in the frequency domain in each specific frequency band is dealt with, effects of the chromatic dispersion can be significantly reduced and the frequency offset and the clock offset can be estimated. Further, the chromatic dispersion amount can be estimated from a difference between temporal positions of the specific frequency band signals corresponding to two or more different frequencies.

Furthermore, as the time-division multiplexed signal sequence group known to the optical signal transmitting apparatus and the optical signal receiving apparatus is used, it is possible to realize optical fiber communication in which the transmission quality is improved by estimating the state of the transmission line and the instability specific to optical transmitting apparatuses.

MODE FOR CARRYING OUT THE INVENTION

Hereinafter, each embodiment of the present invention will be described in detail with reference to the drawings.

First Embodiment

First, an optical signal transmitting apparatus in accordance with a first embodiment of the present invention will be described.

Figure 1:
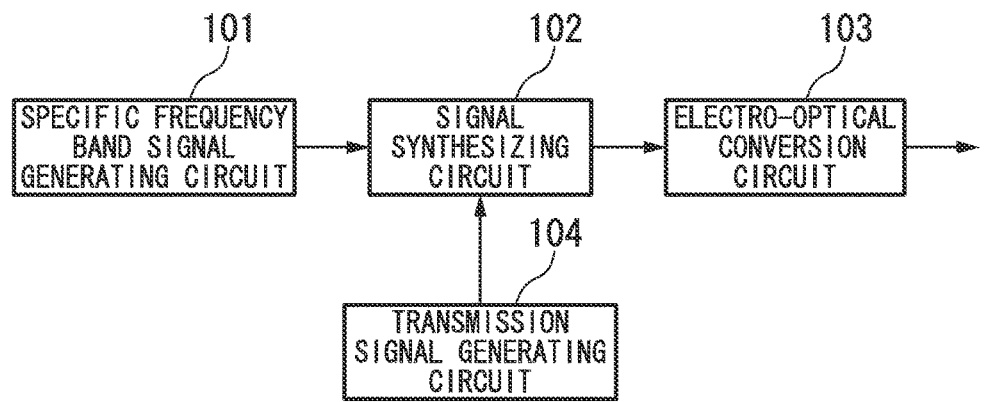
FIG. 1 is a block diagram schematically showing the configuration of a specific frequency band signal generating apparatus for optical communication provided in a first optical signal transmitting apparatus of a first embodiment of the present invention.

FIG. 1 shows an example of the configuration of a specific frequency band signal generating apparatus as a signal generating circuit provided in a first optical signal transmitting apparatus of an optical signal synchronization system utilizing a specific frequency signal in accordance with the present embodiment. In FIG. 1, 101 indicates a specific frequency band signal generating circuit, 102 indicates a signal synthesizing circuit, 103 indicates an electro-optical conversion circuit, and 104 indicates a transmission signal generating circuit.

Figure 2:
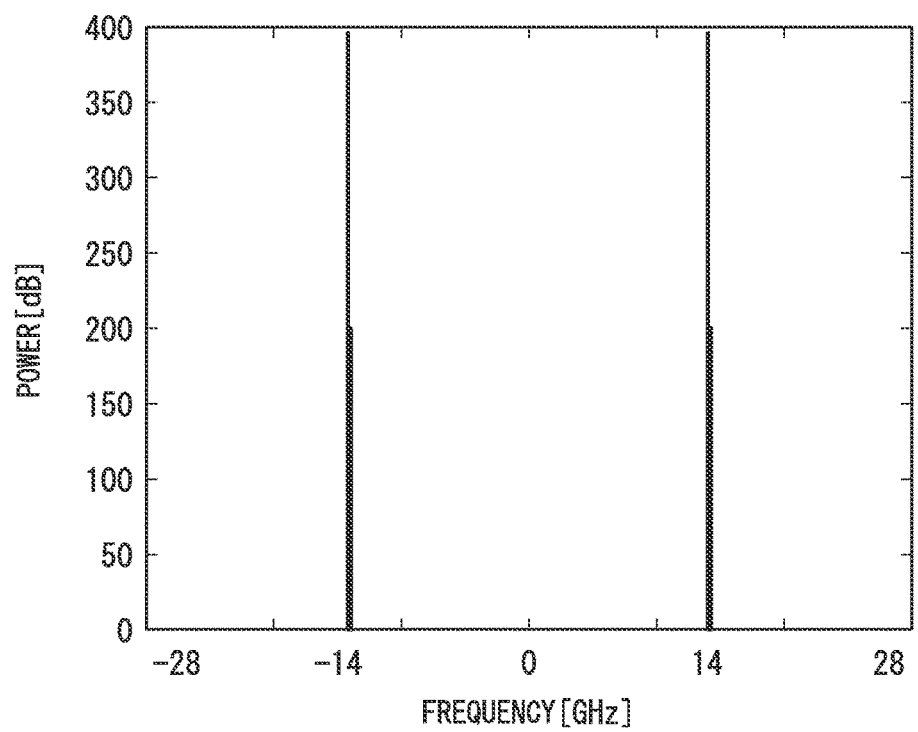
FIG. 2 is a diagram showing the spectrum of a specific frequency band signal that is an alternating signal with one repetition in the same embodiment.
Figure 3:
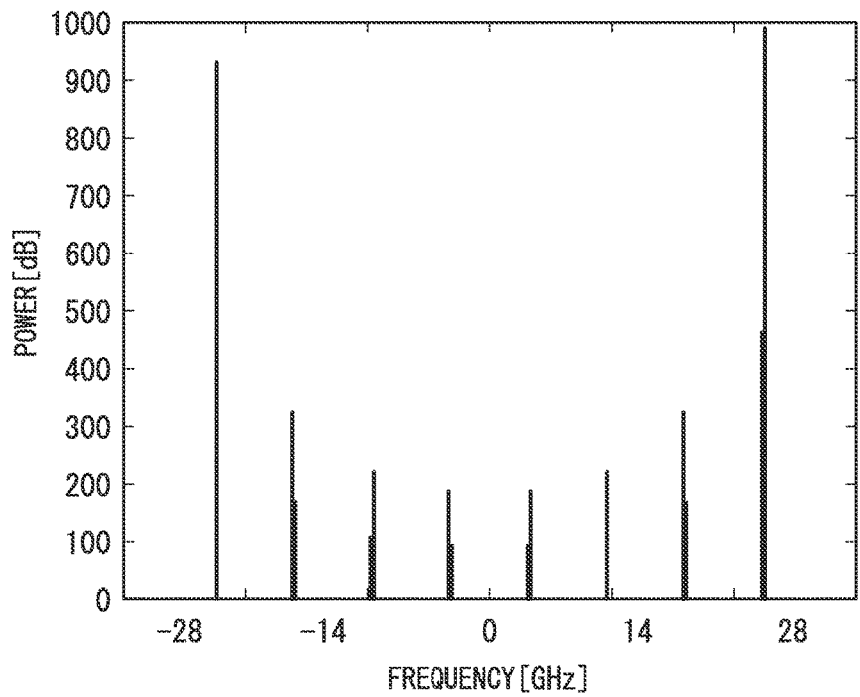
FIG. 3 is a diagram showing the spectrum of a specific frequency band signal obtained by multiplying an alternating signal with four repetitions by an alternating signal with one repetition in the same embodiment.

The specific frequency band signal generating circuit 101 generates a signal sequence having signals at two or more specific frequencies when being up-converted into an optical signal as a specific frequency band signal. It is to be noted that, ideally, it is desirable for the specific frequency band signal to be line spectra, as shown in FIGS. 2 and 3. However, in practice, the spectra of the specific frequency band signal are somewhat spread due to the incompleteness of the apparatus such as effects of phase noise and a filter. Accordingly, the specific frequency band signal in the present Description is not limited to the line spectra, but includes a signal having a spectrum of a certain width due to, for example, the incompleteness of the apparatus. That is, the specific frequency band signal refers to a signal having, at a plurality of specific frequencies, signal components of a smaller frequency spread than the spectrum of a signal sequence to be transmitted.

For example, an alternating signal satisfying a relationship in which the alternating signal is symmetrical with respect to a zero point on an IQ plane can be used as the specific frequency band signal. The specific frequency band signal can be generated by generating a BPSK (binary phase shift keying) signal and alternately using two signal points like −S, S, −S, S, . . . , −S, S or by generating a QPSK (quadrature phase shift keying) signal and alternately using two types of signal points of imaginary numbers like (S, S), (−S, −S), (S, S), (−S, −S), . . . , (S, S), (−S, −S) or (S, −S), (−S, S), (S, −S), (−S, S), . . . , (S, −S), (−S, S). Here, in the notation of (α, β), α and β denote signal components of a real part and an imaginary part, respectively, and it can be represented as α+jβ with an imaginary number representation. j is an imaginary unit. By doing so, a specific frequency band signal having signals corresponding to two frequencies at a frequency interval corresponding to a transmission rate $F_t$ of the optical signal transmitting apparatus is generated.

Alternatively, an alternating signal in which respective signal points are repeated an arbitrary number of times (N times; N is an integer greater than or equal to 2) like −S, −S, S, S, −S, −S, S, S, . . . , −S, −S, S, S may be used. In this case, a specific frequency band signal having peaks at a frequency interval $F_t/N$ is generated. Alternatively, a specific frequency band signal having peaks in four or more frequency bands can be generated by mixing or convoluting signals corresponding to the number of a plurality of repetitions.

Further, since use of the alternating signal causes power to be concentrated on specific frequency bands, there is a possibility that the power concentrated on the specific frequencies becomes too high during propagation of the signal through an optical fiber, adversely affecting the optical fiber and communication quality due to non-linear effects. To address such a problem, for example, a signal with repetitions of −S, S, −S, S, −S, S, . . . , −S, S is mixed with S, −S, S, −S in which −S and S are in the inverse order with respect to such a repeated signal, such that the powers of the specific frequency bands can be dispersed to other frequency bands.

Alternatively, the specific frequency band signal generating circuit 101 can generate specific frequency band signals having a plurality of periods together with specific frequency band signals obtained by inverting their phases, and synthesize or multiply them to generate a composite specific frequency band signal.

FIG. 2 shows the spectrum of a specific frequency band signal when an alternating signal of (S, S) and (−S, −S) of a QPSK signal is generated using a transmission signal at 28 Gbaud. It can be seen from FIG. 2 that signals at a 28 GHz interval are formed at a high frequency side of 14 GHz and a low frequency side of −14 GHz. A signal represented as negative in a frequency domain is an alias component of a signal corresponding to an electrical signal in a range of 28 to 56 GHz; however, the electrical signal is converted into a negative region with respect to a carrier frequency when the electrical signal is up-converted into an optical signal, and accordingly such notation is used.

FIG. 3 shows the spectrum of a specific frequency band signal generated by multiplying an alternating signal configured by (S, S) and (−S, −S) of a QPSK signal at 28 Gbaud by an alternating signal with eight repetitions (N=8). This control causes the specific frequency band signal to be with a repetition of (S, S), (−S, −S), (S, S), (−S, −S), (S, S), (−S, −S), (S, S), (−S, −S), (−S, −S), (S, S), (−S, −S), (S, S), (−S, −S), (S, S), (−S, −S), (S, S), resulting in generation of a specific frequency band signal with the increased number of occupying specific frequency bands.

The specific frequency band signal generated by the specific frequency band signal generating circuit 101 in this matter is input to the signal synthesizing circuit 102. The input specific frequency band signal is inserted into a specific position in a transmission signal input from the transmission signal generating circuit 104 by the signal synthesizing circuit 102. The signal synthesized by the signal synthesizing circuit 102 is transmitted as an optical signal by the electro-optical conversion circuit 103.

Next, a second optical signal transmitting apparatus in accordance with the present embodiment will be described.

Figure 4:
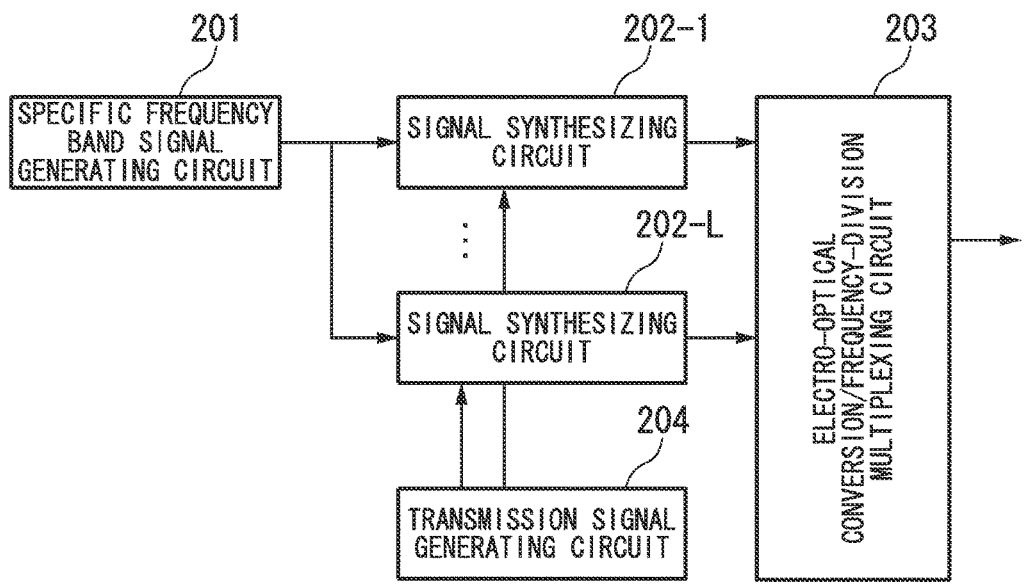
FIG. 4 is a block diagram schematically showing the configuration of a specific frequency band signal generating apparatus for optical communication provided in a second optical signal transmitting apparatus of the same embodiment.

FIG. 4 shows an example of the configuration of a specific frequency band signal generating apparatus as a signal generating circuit provided in the second optical signal transmitting apparatus in accordance with the present embodiment. The specific frequency band signal generating apparatus in accordance with the present embodiment causes analog signals in an optical or electrical domain to overlap in two or more different frequency bands and transmits an optical signal with two or more different frequency channels. In FIG. 4, 201 indicates a specific frequency band signal generating circuit, 202-1 to 202-L (L is an integer greater than or equal to 2) indicate signal synthesizing circuits, 203 indicates an electro-optical conversion/frequency-division multiplexing circuit, and 204 denotes a transmission signal generating circuit.

The specific frequency band signal generating circuit 201 generates a signal sequence having signals in two or more specific frequency bands when being up-converted into an optical signal as a specific frequency band signal, similar to the specific frequency band signal generating circuit 101 of the first optical signal transmitting apparatus. This generated specific frequency band signal is input to the signal synthesizing circuits 202-1 to 202-L. The signal synthesizing circuits 202-1 to 202-L (hereinafter referred to collectively as signal synthesizing circuits 202) insert the input specific frequency band signal into a transmission signal sequence input from the transmission signal generating circuit 204 and supply L obtained electrical signals to the electro-optical conversion/frequency-division multiplexing circuit 203. The electro-optical conversion/frequency-division multiplexing circuit 203 up-converts the L input electrical signals into different frequency bands, multiplexes the up-converted electrical signals, performs electro-optical conversion on the multiplexed electrical signal, and outputs an optical signal. Alternatively, the electro-optical conversion/frequency-division multiplexing circuit 203 up-converts the L input electrical signals into optical signals in different frequency bands when performing the electro-optical conversion on these electrical signals. Alternatively, the electro-optical conversion/frequency-division multiplexing circuit 203 converts the L input electrical signals into optical signals, performs optical frequency conversion so that the converted optical signals are optical signals in different frequency bands, multiplexes the optical signals subjected to the frequency conversion, and outputs the multiplexed optical signal. Such an operation enables the specific frequency band signal to be included in the signal output from the electro-optical conversion/frequency-division multiplexing circuit 203.

It is to be noted that the electro-optical conversion/frequency-division multiplexing circuit 203 can arrange the L input electrical signals at any frequency intervals, but may arrange these electrical signals at the same frequency interval as the Baud rate of the electrical signals, for transmission based on orthogonal frequency division multiplexing (OFDM).

Figure 5A:
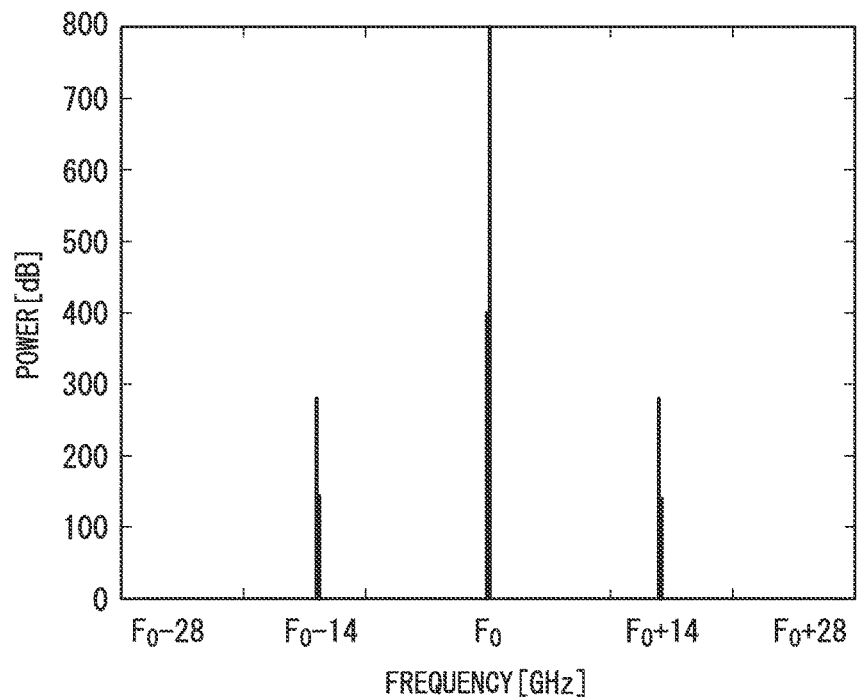
FIG. 5A is a diagram showing the spectrum in the same embodiment when signals input from two signal synthesizing circuits are multiplexed in an electro-optical conversion/frequency-division multiplexing circuit and the multiplexed signal is output from the electro-optical conversion/frequency-division multiplexing circuit.
Figure 5B:
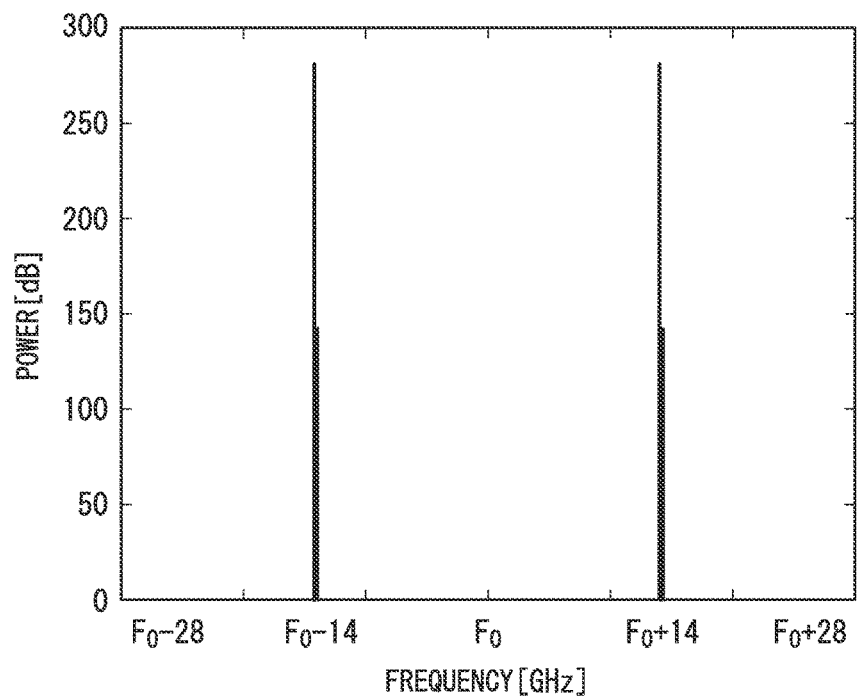
FIG. 5B is a diagram showing the spectrum in the same embodiment when signals input from two signal synthesizing circuits are multiplexed in an electro-optical conversion/frequency-division multiplexing circuit and the multiplexed signal is output from the electro-optical conversion/frequency-division multiplexing circuit.

Further, the two specific frequency band signals transmitted with different frequency channels are synthesized so that at least one frequency component coincides between the specific frequency band signals in a frequency region in which the two specific frequency band signals overlap, so that these signals in this frequency region are cancelled or a signal having specific power is generated. Spectrum diagrams in which transmission using an alternating signal with one repetition is performed when L is equal to 2 are shown in FIGS. 5A and 5B. Here, the number of the signal synthesizing circuits 202 is 2 (L=2), the Baud rate of the transmission signal is set to 14 Gbaud, and the interval between frequency channels is also set to 14 Gbaud. Examples are shown for a case in which an alternating signal among alternating signals output to the two signal synthesizing circuits 202-1 and 202-2 is shifted by 90° and input to the signal synthesizing circuit 202 corresponding to a low frequency channel, and for a case in which the alternating signal is shifted by −90° and input to the signal synthesizing circuit 202 corresponding to the low frequency channel. When the alternating signal is shifted by 90°, the alternating signal corresponding to the high frequency channel is a repetition of (S, S), (−S, −S) while the alternating signal corresponding to the low frequency channel is a repetition of (−S, S), (S, −S). With the repetition of (S, S), (−S, −S), when a signal formed at an upper side in the frequency domain is represented as $S_f$, a signal formed at a lower side is represented as $j \times S_f$. On the other hand, in case of the 90° shifted alternating signal, a signal formed at the upper side is $j \times S_f$, and a signal formed at the lower side is $-S_f$. For this reason, if the signal at the lower side of the high frequency channel and the signal at the upper side of the low frequency channel are controlled to overlap at a frequency $F_0$ on a light path, the powers of the alternating signals overlap in the same phase and strengthen each other. This result is shown in FIG. 5A. Further, if a signal sequence of −90° shifted alternating signals (S, −S), (−S, S) is used, a signal formed at the upper side is $-j \times S_f$ and a signal formed at the lower side is $S_f$. For this reason, if a signal at the lower side of the high frequency channel and a signal at the upper side of the low frequency channel are controlled to overlap at a frequency $F_0$ on the light path, the signals overlap in an opposite phase, and thus the signals are cancelled (FIG. 5B). As shown in FIG. 5B, the signals at the frequency $F_0$ cancel each other and disappear, and it can be seen that the spectrum similar to that shown in FIG. 2 can be obtained even in the case in which transmission is performed in accordance with an OFDM scheme.

Here, the number of signal synthesizing circuits 202 for obtaining the spectrum similar to that shown in FIG. 2 can be set arbitrarily. When L is set to be greater than 2, overlapping signals may be set to cancel each other in adjacent frequency channels. In communication using the alternating signal, in order to reduce frequency components other than a signal at an upper side of a frequency channel at the highest frequency and a signal at a lower side of a frequency channel at the lowest frequency, signals may be input to the signal synthesizing circuits 202 so that the −90° shifted alternating signal is used in a frequency channel immediately below the OFDM frequency channel to be transmitted. A table of signals formed at the upper side and the lower side is shown as follows:

TABLE 1

| Type of alternating signal | Signal at upper side | Signal at lower side |
|---|---|---|
| One QPSK (S, S), (−S, −S) | $S_f$ | $j \times S_f$ |
| 90° shift (−S, S), (S, −S) | $j \times S_f$ | $-S_f$ |
| −90° shift (S, −S), (−S, S) | $-j \times S_f$ | $S_f$ |
| 180° shift (−S, −S), (S, S) | $-S_f$ | $-j \times S_f$ |
| BPSK (S, 0), (−S, 0) | $(S_f - j \times S_f)/\sqrt{2}$ | $(S_f + j \times S_f)/\sqrt{2}$ |
| 90° shift (0, S), (0, −S) | $(S_f + j \times S_f)/\sqrt{2}$ | $(-S_f + j \times S_f)/\sqrt{2}$ |
| −90° shift (0, −S), (0, S) | $(-S_f - j \times S_f)/\sqrt{2}$ | $(S_f - j \times S_f)/\sqrt{2}$ |
| 180° shift (−S, 0), (S, 0) | $(-S_f + j \times S_f)/\sqrt{2}$ | $(-S_f - j \times S_f)/\sqrt{2}$ |

Further, if there are signals that are set so as to cancel each other when the electro-optical conversion/frequency-division multiplexing circuit 203 multiplexes a plurality of input electrical signals in different frequency bands, the electro-optical conversion/frequency-division multiplexing circuit 203 can adjust the power of the signals after cancellation to be lower than a predetermined value by branching the signals in a frequency band to be cancelled and estimating the power, or by estimating the power and the phase of the input signals.

Further, by setting the specific frequency band signal to be longer than the time spread caused by chromatic dispersion assumed in a used optical signal synchronization system utilizing the specific frequency signal, the load of signal processing at a receiving side can be reduced.

Further, the specific frequency band signal generating apparatus can also be used for transmission using polarization-division multiplexing. In this case, the same specific frequency band signal may be inserted into two polarized waves, specific frequency band signals with a rotated phase may be inserted into two polarized waves, a signal may be inserted into only one polarized wave and not into the other polarized wave, different specific frequency band signals may be used for respective polarized waves, or specific frequency band signals may be inserted using a plurality of combinations of these four methods. The insertion of the same specific frequency band signal into two polarization planes is intended to increase the estimation accuracy for a clock offset, a frequency offset, and chromatic dispersion. On the other hand, the insertion of the different specific frequency band signals into the two polarization planes is intended for a miscapturing or the like not to be generated when the specific frequency band signals are used for calculation of an equalization coefficient.

Alternatively, the specific frequency band signal generating apparatus may insert a different specific frequency band signal at each insertion timing. Alternatively, the specific frequency band signal generating apparatus may insert specific frequency band signals into two polarized waves using different rules. For example, a common specific frequency band signal may be inserted into one polarized wave and a specific frequency band signal that varies every time may be inserted into the other polarization plane. As the specific frequency band signal that varies every time, a specific frequency band signal whose phase is rotated by −90°, 90°, or 180° each time may be inserted.

However, if a plurality of alternating signals are multiplied as shown in FIG. 3, the above-described relationship is not established. To obtain a condition that overlapping signals cancel or strengthen each other, phase rotation of a higher accuracy than 90° is applied to the output signals of the signal synthesizing circuits 202. For example, an analog device for phase rotation may be added as a subsequent stage of the signal synthesizing circuit 202 corresponding to each frequency channel.

Such control enables the optical signal receiving apparatus to estimate a signal position, a frequency offset, a clock offset, and a chromatic dispersion amount, which will be described later, using the same apparatus configuration even when signals are multiplexed in the frequency domain.

Further, in the optical signal synchronization system utilizing the specific frequency signal, an initial mode in which synchronization between the optical signal transmitting apparatus and the optical signal receiving apparatus is performed and a data mode may be switched. When communication is performed, notifying the optical signal receiving apparatus of a transmission mode may be performed by using a specific frequency band signal in the initial mode and not using the specific frequency band signal in the data mode or by switching a type of specific frequency band signal between the initial mode and the data mode.

Figure 6:
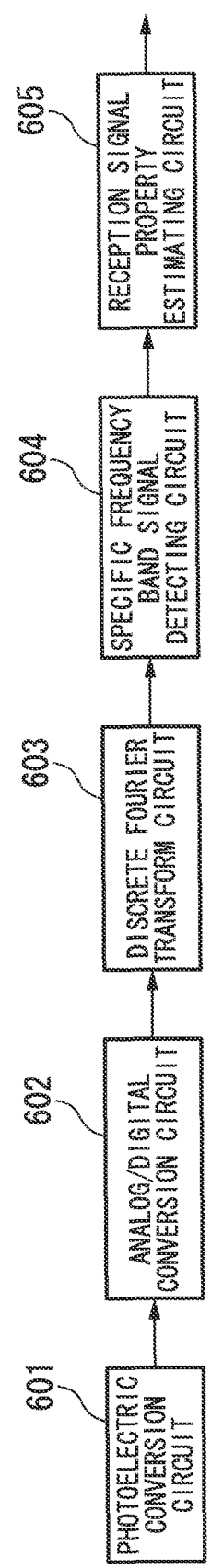
FIG. 6 is a block diagram schematically showing the configuration of a specific frequency band signal receiving apparatus for optical communication provided in a first optical signal receiving apparatus of the same embodiment.

FIG. 6 shows an example of the configuration of a specific frequency band signal receiving apparatus as a signal receiving circuit provided in a first optical signal receiving apparatus in accordance with the present embodiment. This optical signal receiving apparatus receives the signal transmitted by the first optical signal transmitting apparatus shown in FIG. 1 or the second optical signal transmitting apparatus shown in FIG. 4 described above. In FIG. 6, 601 indicates a photoelectric conversion circuit, 602 indicates an analog/digital conversion circuit, 603 indicates a discrete Fourier transform circuit, 604 indicates a specific frequency band signal detecting circuit, and 605 indicates a reception signal property estimating circuit.

The photoelectric conversion circuit 601 converts an input optical signal into a signal in an electrical domain. The analog/digital conversion circuit 602 converts the signal in an electrical domain into a digital signal. The discrete Fourier transform circuit 603 performs a discrete Fourier transform of Nf points on the digital signal input from the analog/digital conversion circuit 602 at Ns sample intervals. The digital signal converted into a frequency domain by the discrete Fourier transform is input to the specific frequency band signal detecting circuit 604. The specific frequency band signal detecting circuit 604 detects a position of the specific frequency band signal. If the position of the specific frequency band is detected, the digital signal in the frequency domain is input to the reception signal property estimating circuit 605, in which information on one or more of a frequency offset, a clock offset, a timing offset, and a chromatic dispersion amount is estimated.

Here, functions of the specific frequency band signal detecting circuit 604 and the reception signal property estimating circuit 605 will be described using an example in which the optical signal transmitting apparatus transmits a specific frequency band signal with a spectrum as shown in FIG. 2 using an alternating signal with one repetition, and the optical signal receiving apparatus receives this specific frequency band signal. It is assumed that a QPSK signal configured by a PN (pseudo noise) sequence or a random signal is used as a transmission signal sequence transmitted in a temporal region other than the specific frequency band signal, and the transmission signal sequence is transmitted at 28 Gbaud with polarization-division multiplexing. It is to be noted that a signal of 1024 symbols was used as the specific frequency band signal. Further, the specific frequency band signal detecting circuit 604 receives a signal from the discrete Fourier transform circuit 603. Here, reception is performed by the analog/digital conversion circuit 602 of 56 GS/s (reception sampling rate Fr=56 G).

A light path that gives chromatic dispersion of a chromatic dispersion amount of 10400 ps/nm and polarization mode dispersion of a dispersion amount of 10 ps was assumed, and noise was added so that the SNR (signal to noise ratio) was 10 dB. First, detection of the specific frequency band signal from the received signal will be considered.

In this case, a Fourier transform is performed by the discrete Fourier transform circuit 603, and the signal subjected to the Fourier transform is output to the specific frequency band signal detecting circuit 604. Here, the number of points Nf of the discrete Fourier transform is 1024 and the discrete Fourier transform is performed on each of 1024 received signals (Ns=1024). As Ns is set to a smaller value, the accuracy in detection of a signal position increases and the computational load increases. The specific frequency band signal is a signal having powers at two or more specific frequencies, as shown in FIG. 2 or 3, and this feature is not changed no matter how great effects of the chromatic dispersion are. Using this feature, the specific frequency band signal detecting circuit 604 determines that the specific frequency band signal has been detected when the power of the specific frequency band, the power of the received signal of a frequency band other than the specific frequency band, or a ratio of these signal powers exceeds a certain value. However, when the power of the specific frequency band is selected, it is necessary to set a wide selection range in consideration of the frequency offset and the clock offset assumed for the optical signal receiving apparatus.

Figure 7A:
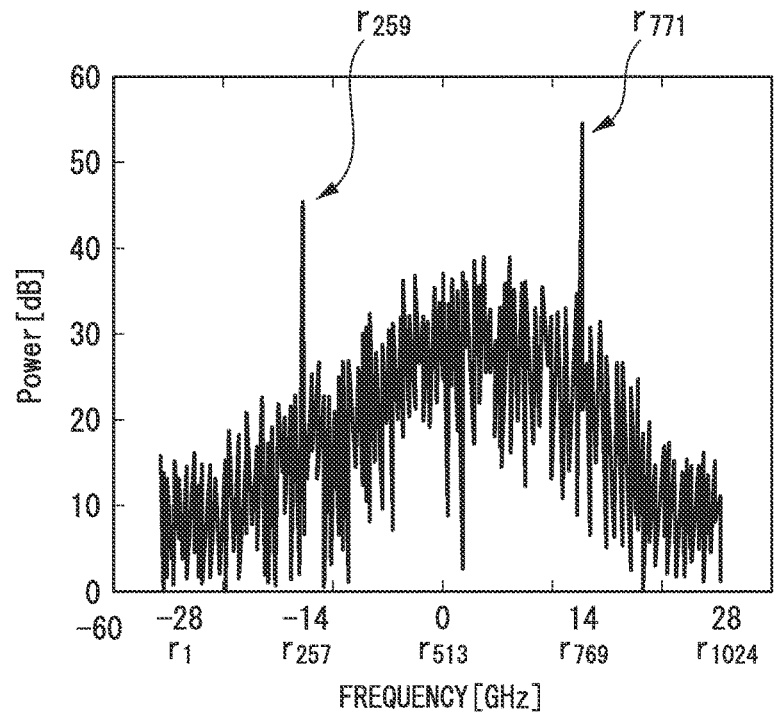
FIG. 7A is a diagram showing the spectrum of a received signal including a specific frequency band signal in the same embodiment.
Figure 7B:
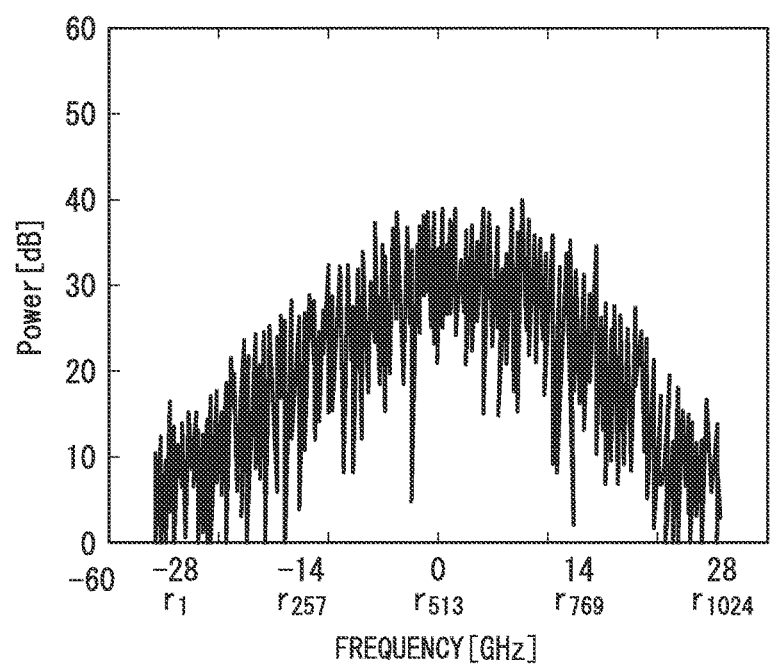
FIG. 7B is a diagram showing the spectrum of a received signal that does not include a specific frequency band signal of the same embodiment.

The signals subjected to the discrete Fourier transform are denoted by $r_1, r_2, \ldots, r_k, \ldots, r_{Nf}$. Here, k is a serial number in the discrete Fourier transform, and $r_k$ corresponds to a frequency of $(k-1)Fs/Nf-Fs/2$. It is to be noted that Fs is a sampling rate. $r_k$ when the specific frequency band signal is received and $r_k$ when the specific frequency band signal is not received are shown in FIGS. 7A and 7B, respectively. In FIG. 7A, there are peaks in power at two frequencies in a received signal corresponding to the specific frequency band signal, and signal power at the other frequencies are significantly small. In contrast, as shown in FIG. 7B, such peak signals cannot be found in a randomly generated QPSK signal, which is transmitted as a signal other than the specific frequency band signal. Using this difference between the features, it is possible to detect the specific frequency band signal.

The power of a region of the specific frequency band signal can be obtained as shown in the following Equation 1.

[Equation 1]

$$Ps = \sum_{s=1}^{K} \left( \sum_{nf(s)-nd \leq k \leq nf(s)+nd} |r_k|^2 \right) \quad \text{(Equation 1)}$$

K indicates the number of frequency peaks of the specific frequency band signal, and nf(s) indicates a serial number of a frequency corresponding to an s-th peak of the specific frequency band signal. In Equation 1, only an arbitrary peak position of the specific frequency band may be selected instead of calculating a sum relating to s, the sum of the absolute values of $r_k$ may be used instead of using the sum of the squares of the absolute values of $r_k$, or $|r_k|^2$ may be multiplied by a weight coefficient obtained from the difference in power between spectra in transmission. nd can be determined so as to correspond to a frequency offset amount to be considered. In order to detect the specific frequency band signal with an allowable frequency offset of $\Delta f$, nd is set so that nd>Nf$\Delta$f/Fs. Further, Ps can be obtained while compensating for the frequency offset, and in this case, nd may be gradually changed to smaller values.

Further, a frequency band signal other than the specific frequency band signal can be obtained using the following Equation 2.

[Equation 2]

$$Pn = \sum_{k \notin Cs} |r_k|^2 \qquad \text{(Equation 2)}$$

Cs denotes all serial numbers in the frequency regions after a discrete Fourier transform included in an nd section before a specific frequency band nf(s) and an nd section after the specific frequency band nf(s). Further, a wider range of Cs enables the signal power of Pn to be set so as not to be influenced by other signals. For example, degradation factors can be removed by setting the section Cs to be considered so as to be D times (D>1) the nd sections before and after the specific frequency band nf(s) or by adding serial numbers corresponding to a frequency band that degrades the accuracy of Pn, such as a component of a frequency 0, to Cs.

Figure 8:
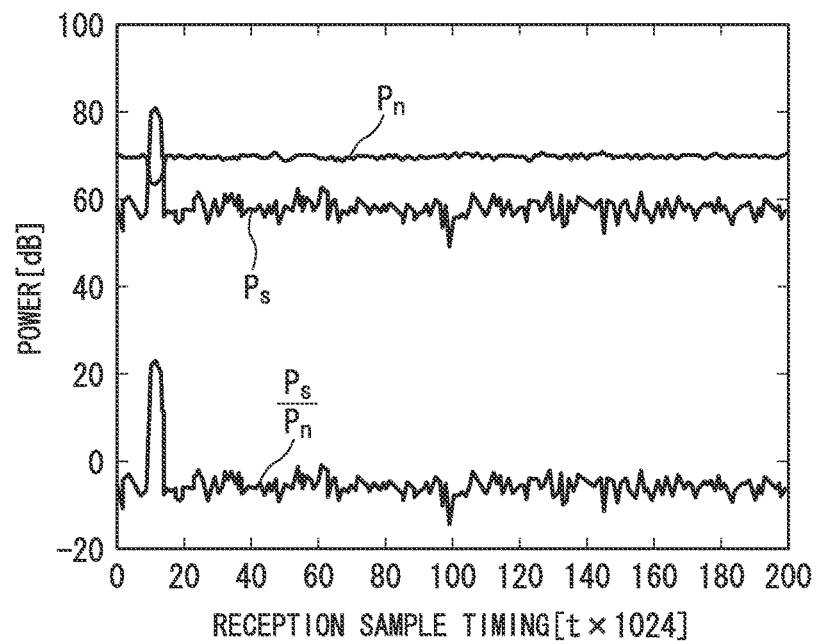
FIG. 8 is a configuration diagram schematically showing Ps, Pn, and Ps/Pn used for detection of the position of a specific frequency band signal for optical communication in the same embodiment.

Further, a ratio of Equation 1 and Equation 2, Ps/Pn, may be used as a method for detecting a signal position. In FIG. 8, a discrete Fourier transform of 1024 points (Ns=1024) is actually performed on a received signal subjected to chromatic dispersion of a chromatic dispersion amount of 10400 ps/nm and polarization mode dispersion of a dispersion amount of 5 ps, Ps, Pn, and Ps/Pn are calculated, and Ps, Pn, and Ps/Pn are normalized and plotted so that they can be shown using the same vertical axis. It can be confirmed that the position of the specific frequency band signal is detected for each of Ps, Pn and Ps/Pn.

Once the position of the specific frequency band signal is confirmed as described above, the reception signal property estimating circuit 605 detects a frequency offset and a clock offset.

First, a method for verifying the clock offset will be described. For a signal obtained by performing a discrete Fourier transform on the specific frequency band signal, the frequency interval $\Delta Fc'$ between local maximums in the frequency domain of the received signal is calculated. When it is assumed that the local maximum values are measured at $r_k$ and $r_l$, $\Delta Fc'$ can be expressed as |k−l|×Fr/Nf. When $\Delta Fc'$ is different from a frequency interval $\Delta Fc$ of the specific frequency band used in transmission, there is a clock offset between the optical signal transmitting apparatus and the optical signal receiving apparatus, which requires adjustment of an operation speed of the analog/digital conversion circuit 602. Accordingly, in the optical signal receiving apparatus, $\Delta Fc$ is held in a memory (not shown), $\Delta Fc$ is compared with $\Delta Fc'$, and the operation speed of the analog/digital conversion circuit 602 is adjusted based on the compared result, thereby making it possible to compensate for the clock offset. In this case, since the operation speed of the analog/digital conversion circuit 602 of the optical signal receiving apparatus is smaller by ($\Delta Fc - \Delta Fc'$) [Hz], the operation speed is adjusted by this frequency to make it possible to decrease a clock offset value between the optical signal transmitting apparatus and the optical signal receiving apparatus.

Alternatively, the clock offset can be compensated for using the length of the specific frequency band signal or an insertion interval of the specific frequency band. The length of the specific frequency band signal or the interval of the specific frequency band signal is assumed to be $\Delta tc$, and the length of the specific frequency band signal or the interval of the specific frequency band signal estimated in the optical signal receiving apparatus is assumed to be $\Delta tc'$. In this case, since the operation speed of the analog/digital conversion circuit 602 is larger by a ratio of $(\Delta tc - \Delta tc')/\Delta tc$, the operation speed is adjusted to be $Fs \times \Delta tc/(\Delta tc - \Delta tc')$, thereby making it possible to compensate for the clock offset.

Next, a method for estimating the frequency offset will be described.

For a signal obtained by performing a discrete Fourier transform on the specific frequency band signal, a frequency position at which the received signal becomes a local maximum in the frequency domain is calculated. When it is assumed that local maximum values are measured at $r_k$ and $r_l$, an offset from serial numbers n(1) and n(2) after the discrete Fourier transform in which the local maximum values are to be included when there is no frequency offset is calculated. Here, local maximum values at r259 and r771 can be confirmed from the result of FIG. 7A. When an alternating signal at 28 Gbaud is used in the optical signal transmitting apparatus, the power of the received signal should have local maximums at r257 and r769. Therefore, it can be seen that the frequency has been shifted by a frequency corresponding to $\Delta nf=2$. That is, since the frequency has an offset of $\Delta nf \times Fs/Nf$, it can be seen that the frequency has an offset of 2×56G/1024=109 MHz. Accordingly, the received signal can be compensated by performing a correction process to shift the frequency of the received signal by −109 MHz.

Alternatively, an average phase rotation amount in each symbol is estimated: by multiplying a received signal including a specific frequency band signal by a complex conjugate of the specific frequency band signal; by multiplying the obtained signal sequence by a complex conjugate of a signal obtained by applying 1 symbol delay to this signal sequence; and by averaging the obtained signals for M symbols (M is an integer greater than or equal to 2), and a phase rotation having an inverse property with respect to the phase rotation of the estimated average phase rotation amount is applied to the received signal sequence, thereby the frequency offset can be compensated for.

However, if the frequency offset is known by another means in advance, its value may be input from the exterior and used.

Further, a method for estimating the chromatic dispersion amount and a method for precisely estimating the signal position will be described.

A position at which the specific frequency band signal is inserted can be detected using the method of FIG. 8. A Fourier transform or a convolution operation is performed on a start point, an end point, or all of the positions the specific frequency band signal.

First, a method based on a Fourier transform will be described. In the method of FIG. 8, a discrete Fourier transform of Nf points is performed on every Ns samples; whereas, in this case, a Fourier transform of Nff points is performed at Nss sample intervals. While Nf and Nff may have different values, Nf and Nff may have the same value so as to simplify the circuit configuration of the apparatus. As Nss is set to a smaller value, the estimation accuracy for the chromatic dispersion and the signal position is improved. First, a serial number of a frequency corresponding to a peak of a specific frequency band signal present in a high frequency band is defined as $n_{up}$ and a serial number of a frequency corresponding to a peak of the specific frequency band signal present in a low frequency band is defined as $n_{lw}$.

A power $P_{up}$ of the signal corresponding to the high frequency band, and a signal power $P_{lw}$ corresponding to the low frequency band can be represented by the following Equation 3.

[Equation 3]

$$P_{up} = \sum_{n_{up}-n_{dd} \le k \le n_{up}+n_{dd}} |r_k|^2, \quad P_{lw} = \sum_{n_{lw}-n_{dd} \le k \le n_{lw}+n_{dd}} |r_k|^2 \quad \text{(Equation 3)}$$

Figure 9:
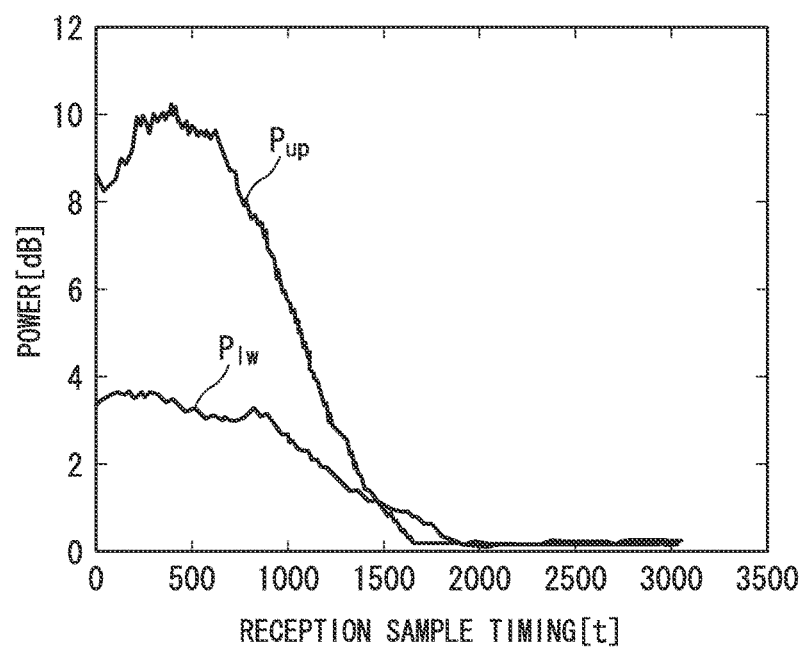
FIG. 9 is a diagram showing a temporal variation in power of an upper band and a lower band of an alternating signal.

$n_{dd}$ may be set to a width corresponding to a residual value of the frequency offset; alternatively, $n_{dd}$ may be smaller than nd or $n_{dd}$ may be equal to 0 by estimating the frequency offset and the clock offset using the above-described method in advance and compensating for these offsets. FIG. 9 shows the result of calculating $P_{up}$ and $P_{lw}$ by performing a discrete Fourier transform of 1024 points per 1 sample (Nss=1) for 3000 samples before and after the last sample of a position at which the specific frequency band signal is detected in the received signal. It can be confirmed from FIG. 9 that each signal power decreases. Here, $P_{up}$ is dissipated earlier than $P_{lw}$. This is because the chromatic dispersion amount is positive and thus a signal corresponding to a high frequency arrives faster due to the effect of the chromatic dispersion. Accordingly, as a result of the estimation of an arrival time difference Δt [ps] from the characteristics of FIG. 9, a chromatic dispersion amount $D_c$ [ps/nm] can be estimated as shown in the following Equation 4.

[Equation 4]

$$Dc = \frac{c \Delta t}{\lambda^2 \Delta F} \quad \text{(Equation 4)}$$

Here, c denotes the speed of light [nm/s], λ denotes the wavelength of light [nm], and ΔF [Hz] denotes a frequency difference between two peak positions of a specific frequency band signal to be considered. The effect of the chromatic dispersion can be compensated for by the thus estimated $D_c$. A chromatic dispersion compensation coefficient using $D_c$ is given by the following Equation 5 as a phase rotation for a frequency f in an electrical domain. This is disclosed, for example, in Govind P. Agrawal, "Nonlinear Fiber Optics," Academic press, pp. 63-65 and pp. 76-77, 2006 (Reference Document 1).

[Equation 5]

$$g(f) = \exp j\left(\frac{\pi \lambda^2}{c} Dc f^2\right) \quad \text{(Equation 5)}$$

For example, the chromatic dispersion may be compensated for by multiplying the received signal subjected to the discrete Fourier transform for the verification of the chromatic dispersion by the coefficient obtained using Equation 5, and then converting the resultant signal into the time domain. As signal processing in this case, an overlap-save method or an overlap-add method, which are frequency domain equalization techniques, may be used. They are disclosed, for example, in J. J. Shynk, "Frequency-domain and multirate adaptive filtering," Signal Processing Magazine, IEEE, vol. 9, issue 1, pp. 15-37, January 1992 (Reference Document 2).

Figure 10:
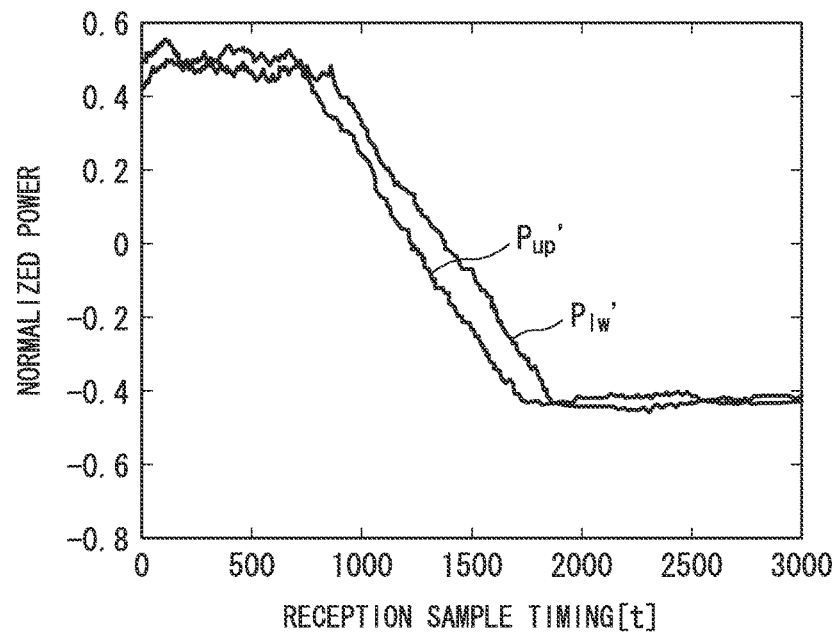
FIG. 10 is a diagram showing a result of applying a predetermined calculation to a temporal variation in power of an upper band and a lower band of an upper alternating signal.

Some examples of a Δt calculation method will be described. FIG. 10 shows a temporal change normalized using maximum values $P_{upmax}$ and $P_{lwmax}$ and minimum values $P_{upmin}$ and $P_{lwmin}$ of $P_{up}$ and $P_{lw}$ in FIG. 9. Specifically, a normalized $P_{up}'$ is obtained by $(P_{up}-(P_{upmax}-P_{upmin})/2)/(P_{upmax}-P_{upmin})$, and normalized $P_{lw}'$ is obtained by $(P_{lw}-(P_{lwmax}-P_{lwmin})/2)/(P_{lwmax}-P_{lwmin})$. Here, for example, centroid positions may be calculated for $P_{up}'$ and $P_{lw}'$ that fall within a range that is greater than or equal to −0.4 and less than or equal to 0.4, and a time difference therebetween may be calculated. The centroid positions can be obtained by $t_{up}=\Sigma(tP_{up})/\Sigma(P_{up})$ and $t_{lw}=\Sigma(tP_{lw})/\Sigma(P_{lw})$ for $P_{up}$ or $P_{lw}$ satisfying the condition of the range that is greater than or equal to −0.4 and less than or equal to 0.4, and the time difference between $t_{up}$ and $t_{lw}$ may be used as Δt.

Alternatively, the difference between times when the $P_{up}$ and $P_{lw}$ values become the minimum values may be calculated as Δt. For example, the times when the $P_{up}$ and $P_{lw}$ values become the minimum values can be calculated by performing the following process. Since slopes in FIG. 9 when $P_{up}$ and $P_{lw}$ are decreasing are determined by the number of points Nff of the Fourier transform, arbitrary straight lines having slopes half these slopes are obtained and the obtained straight lines are subtracted from the two graphs shown in FIG. 10. The obtained graphs are shown in FIG. 11 and it can be seen that the difference between the times $t_{up}$ and $t_{lw}$ when the $P_{up}$ and $P_{lw}$ values become the minimum values is Δt.

Figure 11:
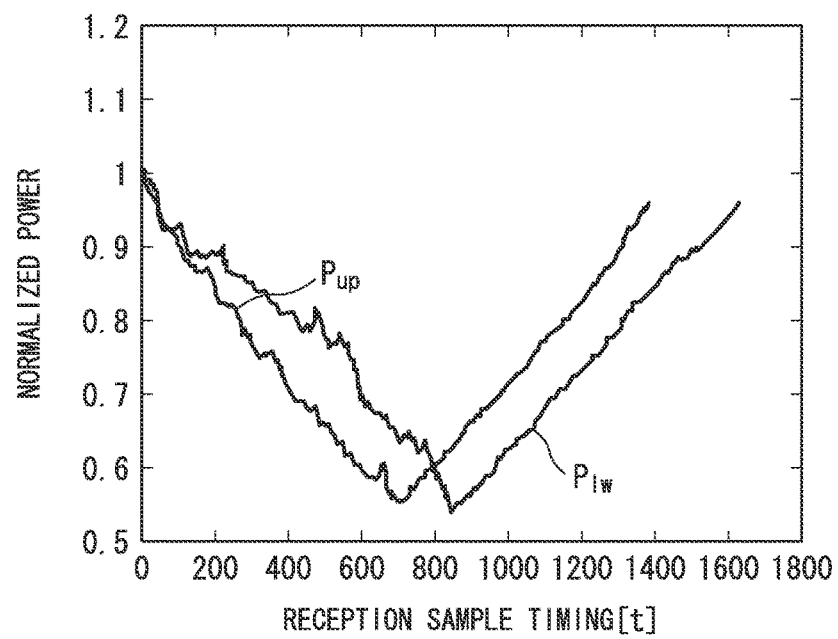
FIG. 11 is a diagram showing a result of applying a predetermined calculation to a temporal variation in power of an upper band and a lower band of an upper alternating signal.

Referring to FIG. 11, since the difference between reception sample timings at temporal positions when the $P_{up}$ and $P_{lw}$ values become the minimum values is 139 and reception is performed by an analog/digital conversion circuit of 56 GS/s, Δt=139/(56×10⁹)=2.48 nsec can be obtained. Accordingly, when the chromatic dispersion amount is calculated using Equation 4, Dc=11069 ps/nm can be obtained, and it can be seen that there is an offset of 669 ps/nm from the real chromatic dispersion amount 10400 ps/nm, but it allows for estimation of the chromatic dispersion amount.

Moreover, here, the midpoint between $t_{up}$ and $t_{lw}$ when the $P_{up}$ and $P_{lw}$ values become the minimum values is an end time of the section of the specific frequency band signal, and it may be used for detailed estimation of signal position detection.

Further, a plurality of combinations of specific frequency band signals may be used in the Δt calculation. For example, since there are eight frequency peaks in FIG. 3, the chromatic dispersion can be estimated using Equation 4 for each of a plurality of arbitrarily selected frequency intervals ΔF.

Accordingly, it is possible to improve the estimation accuracy for the chromatic dispersion by averaging the obtained estimated values of the chromatic dispersion. It is also possible to prevent the detection accuracy of the specific frequency band from being degraded due to attenuation of the specific frequency caused by fading resulting from polarization mode dispersion.

Also, it is possible to improve the detection accuracy of the signal position and the Δt estimation accuracy by setting a signal sequence inserted into a section following the specific frequency band signal so that the signal level of the frequency region occupied by the specific frequency band signal is made low.

Alternatively, since the slopes when $P_{up}$ and $P_{lw}$ are decreasing in FIG. 9 are determined by the number of points Nff of the Fourier transform, the difference between the normalized powers corresponds to the chromatic dispersion.

Further, aforementioned FIGS. 9 and 10 show temporal changes of $P_{up}$ and $P_{lw}$ and temporal changes of $P_{up}'$ and $P_{lw}'$ when a frequency of Fourier transforms that are performed at a start point or an end point of the specific frequency band signal is increased (Ns>Nss) after the position of the specific frequency band signal has been detected. On the other hand, chromatic dispersion estimation, clock offset estimation, and signal position detection may be performed without increasing the frequency of the Fourier transforms (Ns=Nss). In this way, the discrete Fourier transform can be shared and the circuit configuration of the optical signal receiving apparatus can be simplified by equally setting discrete Fourier transform intervals used for data decoding and chromatic dispersion compensation to Ns.

Specific signal processing will be described. Referring to the result of performing calculation on the signal subjected to the Fourier transform at Ns sample intervals as shown in FIG. 8, the calculated results of $P_{up}$ and $P_{lw}$ corresponding to the result of the Fourier transform at which a peak value of Ps/Pn is output are defined as 1/E of the peak value are defined as $P_{up,E}$ and $P_{lw,E}$, and the calculated results of $P_{up}$ and $P_{lw}$ when Ps/Pn decreases to the minimum are defined as $P_{up,min}$ and $P_{lw,min}$, respectively. Here, E is a constant greater than 1 and can be set arbitrarily.

Here, $P_{up,n}$ and $P_{lw,n}$ of the normalized signals are defined as follows:

$$P_{up,n}=(P_{up,E}-(P_{up,max}-P_{up,min})/2)/(P_{up,max}-P_{up,min})$$

$$P_{lw,n}=(P_{lw,E}-(P_{lw,max}-P_{lw,min})/2)/(P_{lw,max}-P_{lw,min})$$

Each of these corresponds to one point in a portion where $P_{up}'$ or $P_{lw}'$ is decreasing in the graphs of normalized $P_{up}'$ and $P_{lw}'$ shown in FIG. 10. That is, the value of $P_{up,n}-P_{lw,n}$ corresponds to the chromatic dispersion amount. The difference between reception samples of the signals corresponding to the two frequencies can be expressed by Nf× $(P_{up,n}-P_{lw,n})$. An arrival time difference Δt between the two frequency components is calculated from this result, and the chromatic dispersion amount can be estimated using Equation 4.

Further, a method for precisely estimating a clock offset between the optical signal transmitting apparatus and the optical signal receiving apparatus and performing signal position detection using the values of $P_{up,n}$ and $P_{lw,n}$ will be described. In the optical signal receiving apparatus, if a repetition period of a specific frequency band signal is previously set, $P_{up,n}$ and $P_{lw,n}$ can be obtained at constant intervals. If clocks perfectly coincide between the optical signal transmitting apparatus and the optical signal receiving apparatus, $P_{up,n}$ and $P_{lw,n}$ that are output are always the same values. In the graphs shown in FIG. 10, a result at the same position in the portion where $P_{up}'$ and $P_{lw}'$ are decreasing is output every time. However, when the clock offset is generated, the values of $P_{up,n}$ and $P_{lw,n}$ increase or decrease. When these values increase, the clock of the optical signal receiving apparatus is faster than the clock of optical signal transmitting apparatus, and thus feeding back to the analog/digital conversion circuit 602 is performed to slow the clock of the optical signal receiving apparatus. In contrast, when these values decrease, the clock of the optical signal receiving apparatus is slower than the clock of optical signal transmitting apparatus, and thus feeding back to the analog/digital conversion circuit 602 is performed to make the clock of the optical signal receiving apparatus fast. In order to perform signal position synchronization, control is performed to change a position at which the Fourier transform is performed so that an error between $P_{up,n}+P_{lw,n}$ and an arbitrary value $P_0$ is less than or equal to a constant value. This control enables timing synchronization, clock synchronization, and CD (chromatic dispersion) compensation to be performed using the specific frequency band signal received at intervals of a constant repetition period. Further, the position of the discrete Fourier transform can be arbitrarily set by arbitrarily setting $P_0$. For example, if $P_0=0$, a Fourier transform at this position includes one-half of the specific frequency band signal and one-half of its subsequent signal. Accordingly, the processing of the subsequent signal is started from the center of this Fourier transform block.

$P_{up,n}$, $P_{lw,n}$, and $P_{up,n}-P_{lw,n}$ need not necessarily be obtained from the result of one Fourier transform. For example, it is possible to improve the estimation accuracy by averaging a plurality of results obtained at positions of specific frequency band signals repeated at intervals of a constant period.

Here, an example has been shown which uses $P_{up,n}$ and $P_{lw,n}$ in the vicinity of an end position of the specific frequency band signal, but $P_{up,n}$ and $P_{lw,n}$ may be evaluated similarly in the vicinity of a start position of the specific frequency band signal. In this case, FIG. 10 include upward-sloping graphs. Alternatively, it is possible to improve the estimation accuracy using respective results in the vicinity of the start position and the vicinity of the end position of the specific frequency band signal.

Further, in an optical signal synchronization system utilizing a specific frequency signal, switching may be performed between an initial mode in which synchronization between the optical signal transmitting apparatus and the optical signal receiving apparatus is performed and a data mode. Moreover, when communication is performed, the optical signal receiving apparatus determines that the mode is switched to the data mode when the specific frequency band signal is not detected at an expected timing or when a type of the specific frequency band signal is changed, and the optical signal receiving apparatus initiates transmission of decoded data. Alternatively, a function may be provided that notifies the exterior that preparation for decoding has been completed if information on at least one of clock estimation, frequency offset estimation, chromatic dispersion estimation, and the decoded result satisfies a reference value.

Figure 12:
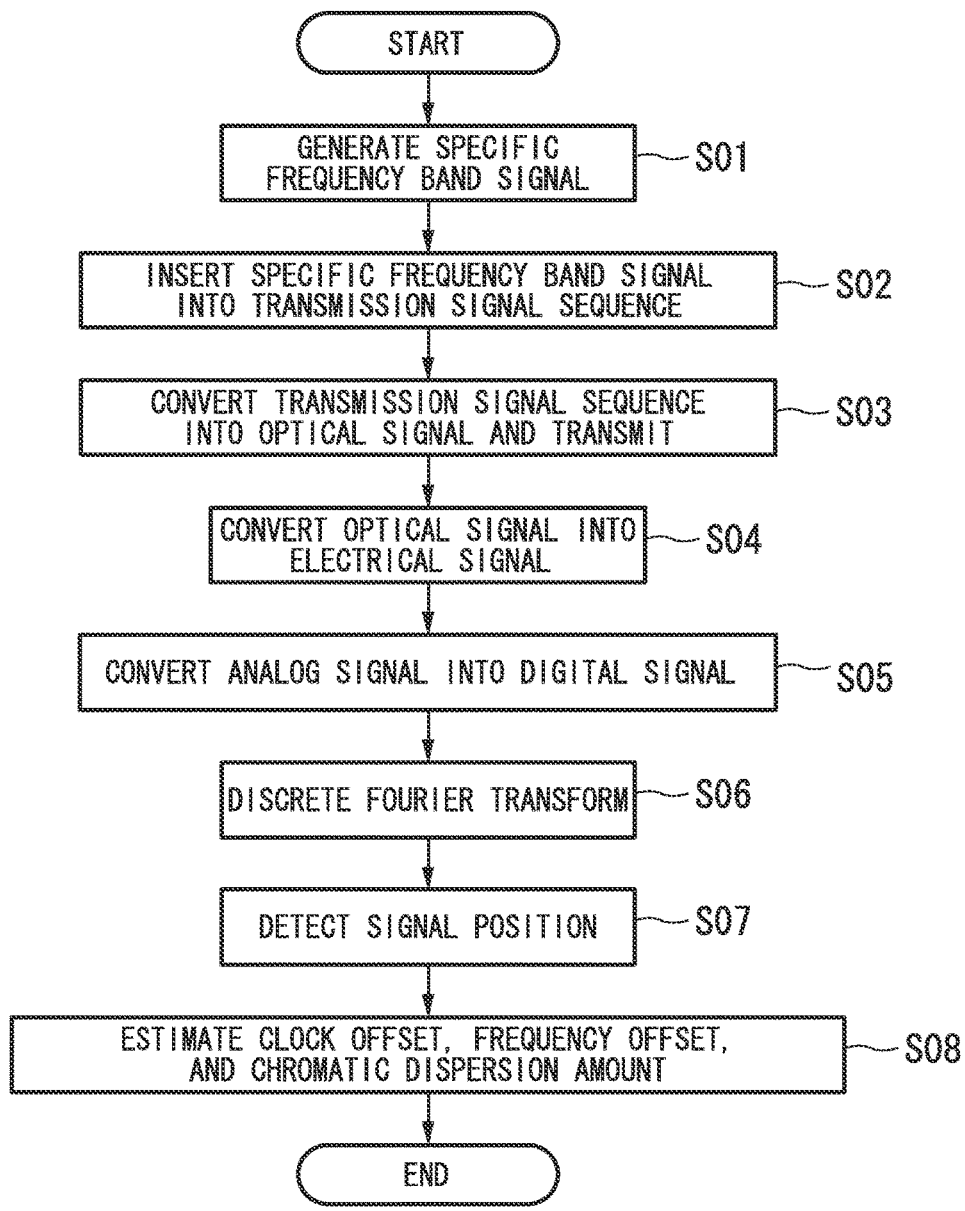
FIG. 12 is a diagram showing the flow of a method for establishing optical signal synchronization of the same embodiment.

Further, FIG. 12 is a diagram showing steps constituting the flow of a method for establishing optical signal synchronization in accordance with the present embodiment.

First, the specific frequency band signal generating circuit 101 (or the specific frequency band signal generating circuit 201) of the optical signal transmitting apparatus generates a specific frequency band signal (step S01). Next, the signal synthesizing circuit 102 (or the signal synthesizing circuit 202) inserts the specific frequency band signal into a transmission signal sequence (step S02). The electro-optical conversion circuit 103 (or the electro-optical conversion/frequency-division multiplexing circuit 203) converts the transmission signal sequence including the specific frequency band signal into an optical signal (step S03), and this optical signal arrives at the optical signal receiving apparatus via an optical propagation path.

In the optical signal receiving apparatus, the photoelectric conversion circuit 601 converts the optical signal into an electrical signal (step S04). Next, the analog/digital conversion circuit 602 converts an analog signal, which is the converted electrical signal, into a digital signal (step S05), and then the discrete Fourier transform circuit 603 performs a discrete Fourier transform at intervals of a constant period (step S06). The specific frequency band signal detecting circuit 604 detects a signal position from the signal converted into the frequency domain by the discrete Fourier transform (step S07). Next, the reception signal property estimating circuit 605 estimates a clock offset, a frequency offset, and a chromatic dispersion amount (step S08). The optical signal receiving apparatus compensates the signal sequence for the effects of the clock offset, the frequency offset, and the chromatic dispersion that have thus been estimated. The optical signal receiving apparatus can improve the estimation accuracy by iteratively performing the process of steps S06 to S08 on the compensated signal sequence.

Figure 13:
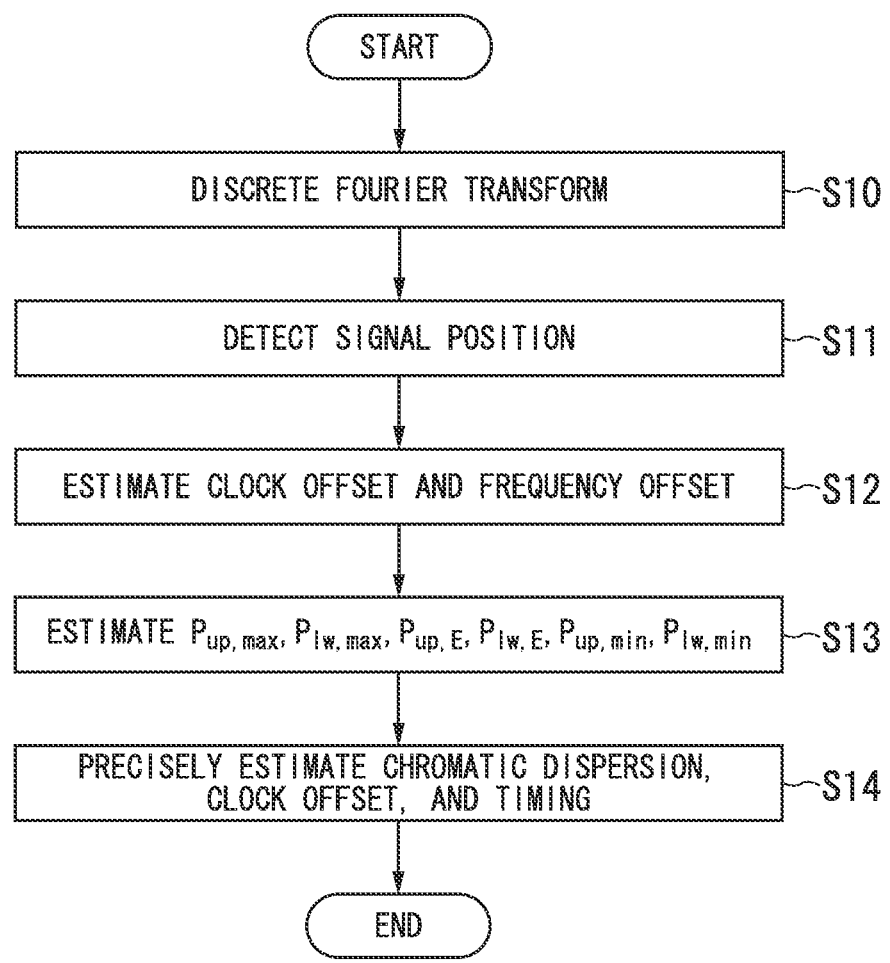
FIG. 13 is a diagram showing steps including a discrete Fourier transform and its subsequent steps in the flow of a method for establishing optical signal synchronization in the same embodiment.

Further, FIG. 13 is a diagram showing steps including the discrete Fourier transform and its subsequent steps when an interval of the discrete Fourier transform for detecting a specific frequency band signal and an interval Nss of the discrete Fourier transform for estimating chromatic dispersion are the same in the method for establishing optical signal synchronization in accordance with the present embodiment.

The discrete Fourier transform circuit 603 of the optical signal receiving apparatus performs the discrete Fourier transform at intervals of a constant period Ns (step S10). The specific frequency band signal detecting circuit 604 detects a signal position from the signal converted into the frequency domain (step S11). The reception signal property estimating circuit 605 estimates a clock offset and a frequency offset from the positions of the peaks of signal power in the frequency domain (step S12). The reception signal property estimating circuit 605 estimates $P_{up,max}$, $P_{lw,max}$, $P_{up,E}$, $P_{lw,E}$, $P_{up,min}$, and $P_{lw,min}$ based on the detected signal positions (step S13). The reception signal property estimating circuit 605 further calculates $P_{up,n}$, $P_{lw,n}$, and $P_{up,n}-P_{lw,n}$ from these values and performs precise estimation for the chromatic dispersion, the clock offset, and the timing (step S14). The optical signal receiving apparatus compensates the signal sequence for the effects of the clock offset, the frequency offset, and the chromatic dispersion that have thus been estimated, and iteratively performs the process from step S10 to step S14 on the compensated signal sequence or averages $P_{up,max}$, $P_{lw,max}$, $P_{up,E}$, $P_{lw,E}$, $P_{up,min}$, $P_{lw,min}$, $P_{up,n}$, and $P_{lw,n}$ in steps S13 and S14, thereby improving the estimation accuracy.

Next, a second optical signal receiving apparatus in accordance with the present embodiment will be described. In the second optical signal receiving apparatus, the power of a specific frequency signal is detected in consideration of the discrete Fourier transform length and then the property of a received signal is estimated to realize compensation with higher accuracy.

Figure 14:
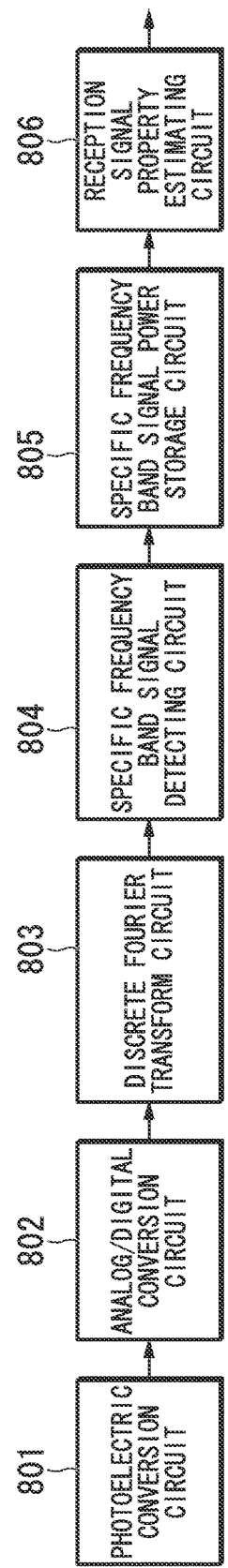
FIG. 14 is a block diagram schematically showing the configuration of a specific frequency band signal receiving apparatus for optical communication provided in a second optical signal receiving apparatus of the same embodiment.

FIG. 14 shows an example of the configuration of a specific frequency band signal receiving apparatus as a signal receiving circuit provided in the second optical signal receiving apparatus in the present embodiment. 801 indicates a photoelectric conversion circuit, 802 indicates an analog/digital conversion circuit, 803 indicates a discrete Fourier transform circuit, 804 indicates a specific frequency band signal detecting circuit, 805 indicates a specific frequency band signal power storage circuit, and 806 indicates a reception signal property estimating circuit.

The photoelectric conversion circuit 801 converts an input optical signal into a signal in an electrical domain. The analog/digital conversion circuit 802 converts this signal in the electrical domain into a digital signal. The discrete Fourier transform circuit 803 performs a discrete Fourier transform of $N_f$ points on the digital signal input from the analog/digital conversion circuit 802 at $N_s$ sample intervals. The digital signal converted into a frequency domain by the discrete Fourier transform is input to the specific frequency band signal detecting circuit 804, in which a position of the specific frequency band signal is detected. When the position of the specific frequency band is detected, the specific frequency band signal detecting circuit 804 outputs power values in the vicinity of the specific frequency band signal component (at least part of $P_p(i)$, $P_{m,1}(i)$, $P_{m,2}(i)$, $P_u(i)$, and $P_d(i)$, which will be described later) among power values of the digital signal in the frequency domain, an individual arrival time difference calculated from these values, or coefficients used in an equation for calculating the individual arrival time difference calculated from these values, to the specific frequency band signal power storage circuit 805 to be stored. Further, the specific frequency band signal detecting circuit 804 can calculate the frequency offset, the clock offset, and the timing offset from the position of a peak in the frequency domain of the received specific frequency band signal, similar to the first optical signal receiving apparatus. The reception signal property estimating circuit 806 estimates information on one or more of the frequency offset, the clock offset, the timing offset, and the chromatic dispersion amount from the information stored in the specific frequency band signal power storage circuit 805.

It is to be noted that since the spectrum of the specific frequency band signal is somewhat spread due to the incompleteness of the apparatus as described above, a representation, a power value in the "vicinity" of the specific frequency band signal component, is used here. By treating a component of a frequency spread portion in the vicinity of the specific frequency band signal as the specific frequency band signal component, the power value in the "vicinity" of the specific frequency band signal component can be simply called a power value of the specific frequency band signal component. The same applies to recitations of "vicinity" related to the power values in the following description.

Hereinafter, relationships between the length of an alternating signal and the length of discrete Fourier transform, and a method for estimating a chromatic dispersion amount from an arrival time difference between signal components corresponding to a high frequency region and a low frequency region of the specific frequency band signal will be described for each of possible cases of the relationships. In the following description, it is assumed that $N_s=N_{ss}$, $N_f=N_{ff}$, and the number of points of a discrete Fourier transform for detection of a specific frequency band signal is equal to that of a discrete Fourier transform for chromatic dispersion compensation.

Figure 15:
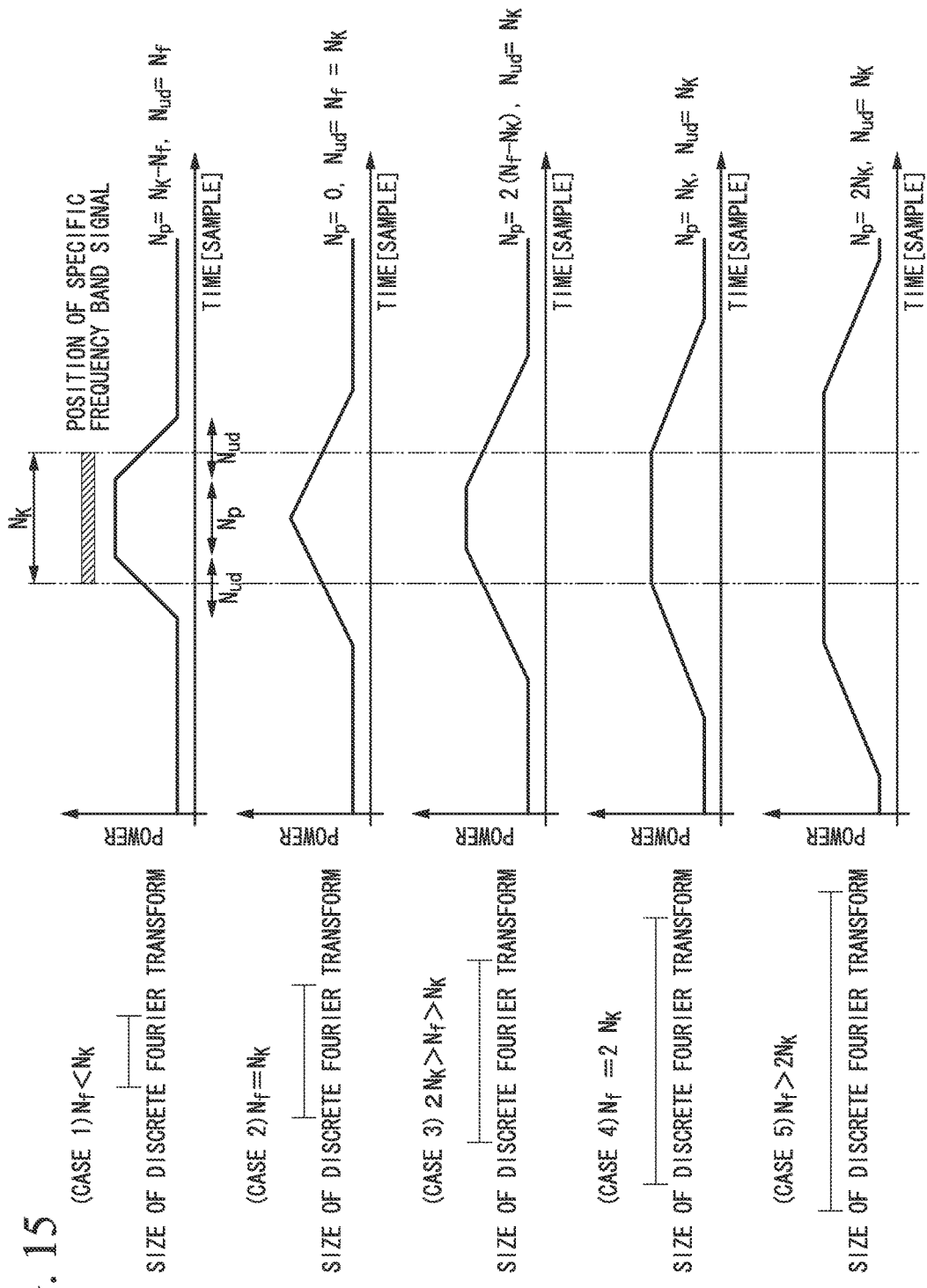
FIG. 15 is a diagram showing a relationship between a specific frequency band signal and the discrete Fourier transform length.

In the received signal received at a sampling frequency Fr, the number of reception samples corresponding to the length of the specific frequency band signal generated in the optical signal transmitting apparatus is $N_k$, and relationships between the number of reception samples $N_K$ and the number of samples $N_f$ of a received signal used for a discrete Fourier transform are classified into the following Cases 1 to 5. That is, the method for estimating an arrival time of an alternating signal will be described in respective cases including:

(Case 1) $N_f < N_k$
(Case 2) $N_f = N_k$
(Case 3) $N_K < N_f < 2N_k$
(Case 4) $N_f = 2N_k$
(Case 5) $N_f > 2N_k$ FIG. 15 shows a change in a reception power in a frequency band corresponding to a received specific frequency band signal together with the position of the specific frequency band signal when discrete Fourier transforms are performed on the received specific frequency band signal while shifting the received specific frequency band signal by one reception sample. It can be confirmed from FIG. 15 that in each of the five cases, the number of reception samples $N_{ud}$ corresponding to regions in which the reception power increases or decreases and the number of reception samples $N_p$ corresponding to a region in which the reception power is a constant peak value can be determined using $N_f$ and $N_k$. That is, In case 1, $N_p = N_k - N_f$, $N_{ud} = N_f$
In case 2, $N_p = 0$, $N_{ud} = N_f = N_k$
In case 3, $N_p = 2(N_f - N_k)$, $N_{ud} = N_k$
In case 4, $N_p = N_k$, $N_{ud} = N_k$
In case 5, $N_p = 2N_k$, $N_{ud} = N_k$ When the arrival timing of the specific frequency band signal is assumed to be a center portion of the specific frequency band signal (a center of two chain double-dashed lines vertically shown in FIG. 15), a center portion of a reception power having a trapezoidal or triangular shape in the vicinity of the position of the specific frequency band signal shown in FIG. 15 is obtained. There are a number of specific methods for obtaining the center portion. In some examples, a centroid position of a reception power from a point at which the reception power begins to increase until a point at which a decrease in the reception power ends may be obtained, a center portion of reception samples in which their peak is observed may be obtained, a center between a point at which a peak starts and a point at which the peak ends may be obtained as the center portion, or an increasing line and a decreasing line may be extrapolated in a center portion to calculate an intersection therebetween. The chromatic dispersion amount can be estimated from Equation 4 by calculating arrival timings for a signal component corresponding to a high frequency band and a signal component corresponding to a low frequency band as described above and obtaining the difference therebetween as Δt.

When the discrete Fourier transform is performed on each reception sample as described above, the center portion can be estimated using all data. However, in practice, such a discrete Fourier transform performed at a high frequency increases the computational load in view of implementation. Thus, it is necessary to set a discrete Fourier transform interval to be as great as possible.

Figure 16:
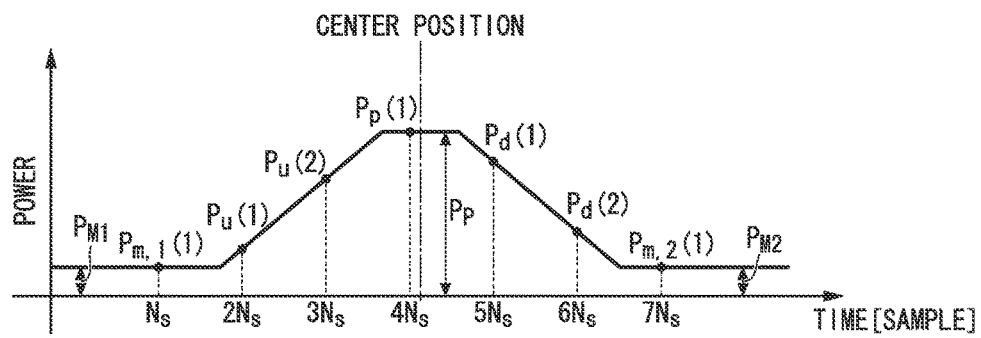
FIG. 16 is a diagram showing the reception power of a specific frequency band signal obtained by each discrete Fourier transform.

FIG. 16 is a diagram showing a reception power of a specific frequency band signal obtained by each discrete Fourier transform. In FIG. 16, the discrete Fourier transform interval is denoted by $N_s$, a power obtained as a minimum value before the position of the specific frequency band signal is denoted by $P_{m,1}(1)$, increasing reception powers corresponding to the specific frequency signal are denoted by $P_u(1)$ and $P_u(2)$, a point at which a peak power is observed is denoted by $P_p(1)$, decreasing powers are denoted by $P_d(1)$ and $P_d(2)$, and a power having a minimum value detected after the decrease has been completed is denoted by $P_{m,2}(1)$, and respective reception timings are $N_s$, $2N_s$, $3N_s$, $4N_s$, $5N_s$, $6N_s$, and $7N_s$. FIG. 16 shows an example in which one or two points are acquired for each power value, but any number of points may be acquired for $P_{m,1}$ and $P_{m,2}$, $N_{ud}/N_s$ points may be acquired for $P_u$ and $P_d$, and $N_p/N_s$ points may be acquired for $P_p$. $N_{ud}/N_s$ and $N_p/N_s$ may be decimals; however, in this case, an integer obtained by truncating digits subsequent to a decimal point is used.

First, in the example in which two of $P_u$ and $P_d$ and one $P_p$ are obtained as shown in FIG. 16, the center position of a trapezoid, that is, the position of the specific frequency band signal (a dashed dot line in FIG. 16), is obtained. Here, a power value of a peak position is defined as $P_p$, a minimum power value before the position of the specific frequency band signal is defined as $P_{M1}$, and a minimum power value after the position of the specific frequency band signal is defined as $P_{M2}$.

As shown in FIG. 16, the signal position of the specific frequency band signal (hereinafter referred to simply as "signal position") cannot be estimated from a point of timing at which the peak position is observed. $P_u$ and $P_d$ are important for obtaining the signal position of the specific frequency band signal. Accordingly, the discrete Fourier transform needs to be performed at intervals of a period less than or equal to $N_f$ in a scenario of case 1 of FIG. 15 and at intervals of a period less than or equal to $N_k$ in scenarios of cases 2 to 5. That is, the discrete Fourier transform is performed at intervals of a period less than or equal to the smaller of $N_f$ and $N_k$. When the discrete Fourier transform is performed at intervals of a period equal to the smaller value of $N_f$ and $N_k$, the computational load is smallest. Comparing $P_u(1)+P_u(2)$ with $P_d(1)+P_d(2)$, $P_d(1)+P_d(2)$ is greater in FIG. 16. This indicates that the position of $P_p$ (when there are a plurality of signal points at a peak position, an average position of the signal points at the peak position) is present before the signal position of the specific frequency band signal. That is, it can be seen that the signal position $T_{s0}$ of the specific frequency band signal is present to be $4N_s < T_{s0} < 5N_s$.

Next, a method for obtaining the signal position of the specific frequency band signal in the specific frequency band signal detecting circuit 804 will be described. As suggested by FIG. 16, considering a case in which $P_u(1)+P_u(2)=P_d(1)+P_d(2)$, if a peak position is received at one timing, the timing is the signal position of the specific frequency band signal, and if peak positions are received at two or more timings, an average value of these peak positions is the signal position of the specific frequency band signal. In order to find the signal position, positions at which the discrete Fourier transform is performed may be changed so that the sum of increasing signal powers is equal to the sum of decreasing signal powers ($\Sigma P_u(i) = \Sigma P_d(i)$). The center position $T'_{s0}$ of the signal power can be obtained from the measured values of the signal power, as follows.

[Equation 6]

$$T'_{s0} = T_p - \frac{N_s}{2}\left(\frac{P_u - P_{M1}}{P_P - P_{M1}} - \frac{P_d - P_{M2}}{P_P - P_{M2}}\right)\frac{N_{ud}}{N_s} \quad \text{(Equation 6)}$$
$$= T_p - \frac{N_{ud}}{2}\left(\frac{P_u - P_{M1}}{P_P - P_{M1}} - \frac{P_d - P_{M2}}{P_P - P_{M2}}\right)$$

Here, $T_p$ denotes a center position of signal powers observed at the peak positions ($4N_s$ in FIG. 16), $N_{ud}$ denotes the number of acquisitions of the reception power acquired during the reception power is increasing or decreasing (2 in FIG. 16), $P_u$ indicates an average value of $P_u(i)$, and $P_d$ indicates an average value of $P_d(i)$. Further, $P_P$, $P_{M1}$, and $P_{M2}$ are obtained as an average of powers $P_p(i)$ at peak positions of a specific signal power, an average of minimum values $P_{m,1}(i)$ before the peak positions, and an average of minimum values $P_{m,2}(i)$ after the peak positions, respectively. For example, the signal position is obtained by Equation 6 in the example of FIG. 16, if $P_u(1)=23$, $P_u(2)=55$, $P_d(1)=68$, $P_d(2)=34$, $P_{m,1}(1)=11$, $P_{m,2}(1)=12$, $P_p(1)=72$, and $N_{ud}=2$. $P_{m,1}(1)$ is used as $P_{M1}$, $P_{m,2}(1)$ is used as $P_{M2}$, and $P_p(1)$ is used as $P_P$. If these are applied to Equation 6, $T'_{s0}$ is calculated as $T'_{s0}=4N_s+0.19N_s=4.19N_s$.

Further, the calculation in Equation 6 can be simplified when $P_{M1}=P_{M2}=P_M$. In this case, $T'_{s0}$ is calculated by Equation 7.

[Equation 7]

$$T'_{s0} = T_p - \frac{N_{ud}}{2}\left(\frac{P_u - P_d}{P_P - P_M}\right) \quad \text{(Equation 7)}$$

Here, since the accuracy of $P_{M1}$, $P_{M2}$, $P_u$, $P_p$, and $P_d$ in each measurement is low, averaging can increase the estimation accuracy for chromatic dispersion. To this end, as these values, the specific frequency band signal power storage circuit 805 stores $P_{m,1}(i)$, $P_{m,2}(i)$, $P_p(i)$, $P_u(i)$, and $P_d(i)$ output by the specific frequency band signal detecting circuit 804 each time the specific frequency band signal arrives. Further, the reception signal property estimating circuit 806 averages these values corresponding to specific frequency band signals received $M_k$ times ($M_k$ is an integer greater than or equal to 2) and uses the resultant value. This results in improved the estimation accuracy for chromatic dispersion.

However, the values of $P_u(i)$ and $P_d(i)$ vary each time a specific frequency band signal is received. For this reason, parameters that are expected to be constant values may be stored in the specific frequency band signal power storage circuit 805, in place of $P_u(i)$ and $P_d(i)$. For example, $(P_u-P_d)$ in Equation 7 may be stored in the specific frequency band signal power storage circuit 805 and a plurality of stored $(P_u-P_d)$ may be averaged. Moreover, it may not be necessary to average all the values. For example, $\Delta t=T'_{s0,L}-T'_{s0,H}$ may be calculated from an arrival time $T'_{s0,H}$ of the specific frequency band signal obtained in the high frequency band and an arrival time $T'_{s0,L}$ of the specific frequency band signal obtained in the low frequency band by Equation 6 or Equation 7, and the obtained individual arrival time difference $\Delta t$ may be stored in the specific frequency band signal power storage circuit 805. Based on the stored values, the reception signal property estimating circuit 806 may calculate $M_k$ numbers of $T'_{s0,H}$ and $T'_{s0,L}$ from $M_k$ sets of $P_u(i)$ and $P_d(i)$ using average values of $P_{m1}(i)$, $P_{m2}(i)$, and $P_p(i)$ as $P_{M1}$, $P_{M2}$, and $P_p$, estimate an arrival time difference by averaging $M_k$ number of individual arrival time differences $\Delta t=T'_{s0,L}-T'_{s0,H}$ obtained from the positions of specific frequency band signals corresponding to different frequencies, and obtain a chromatic dispersion amount using this averaged arrival time difference as $\Delta t$ in Equation 4. Alternatively, the reception signal property estimating circuit 806 may obtain chromatic dispersion amounts from the $M_k$ stored individual arrival time differences $\Delta t$ and average the obtained chromatic dispersion amounts.

Figure 17:
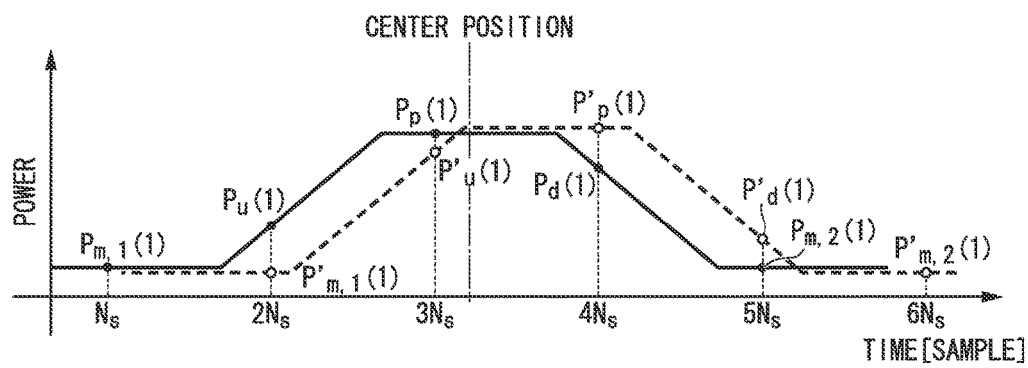
FIG. 17 is a diagram showing the power values of specific frequency band signals corresponding to two frequency bands.

An image for $\Delta t$ calculation is shown in FIG. 17. In FIG. 17, $P_u(1)$, $P_p(1)$, $P_d(1)$, $P_{m,1}(1)$, and $P_{m,2}(1)$ are power values detected for a specific frequency band signal corresponding to a high frequency. Further, $P'_u(1)$, $P'_p(1)$, $P'_d(1)$, $P'_{m,1}(1)$, and $P'_{m,2}(1)$ are power values detected for a specific frequency band signal corresponding to a low frequency. The signal position may be detected by Equation 6 or Equation 7 for each signal, and $\Delta t$ may be calculated based on the detected signal position, or $\Delta t$ may be obtained by the following Equation 8.

[Equation 8]

$$\Delta t = T_{p,lw} - T_{p,up} - \frac{N_{ud}}{2}\left(\frac{P_{u,lw} - P_{d,lw}}{P_{P,lw} - P_{M,lw}} - \frac{P_{u,up} - P_{d,up}}{P_{P,up} - P_{M,up}}\right) \quad \text{(Equation 8)}$$

Here, the values with a subscript lw correspond to the specific frequency band signal corresponding to the low frequency, and the values relating to the power among these values are obtained from $P'_u(1)$, $P'_p(1)$, $P'_d(1)$, $P'_{m,1}(1)$, and $P'_{m,2}(1)$. Further, the values with a subscript up correspond to the specific frequency band signal corresponding to the high frequency, and the values relating to the power among these values are obtained from $P_u(1)$, $P_p(1)$, $P_d(1)$, $P_{m,1}(1)$, and $P_{m,2}(1)$.

Further, in the above calculation, $P_M$ or $P_p$ can be calculated without estimation of $P_{m,1}(i)$ and $P_{m,2}(i)$, or $P_p(i)$. First, a method for obtaining $P_M$ using $P_p$, $P_u$, and $P_d$ will be described. As shown in FIG. 15, since $N_p$ and $N_{ud}$ are known if the length of the specific frequency band signal and the discrete Fourier transform length are determined, $P_M$ is necessarily obtained by setting the value of $N_s$ to be smaller than $N_p$. When $N_s$ is greater than $N_p$, $P_M$ can be obtained with the probability of $N_p/N_s$, and thus $P_M$ is obtained by acquiring the specific frequency band signal a plurality of times. A method for acquiring $P_M$ using a condition that the trapezoid (the triangle, if $N_p=0$) is laterally symmetrical will be described with reference to FIG. 18.

Figure 18:
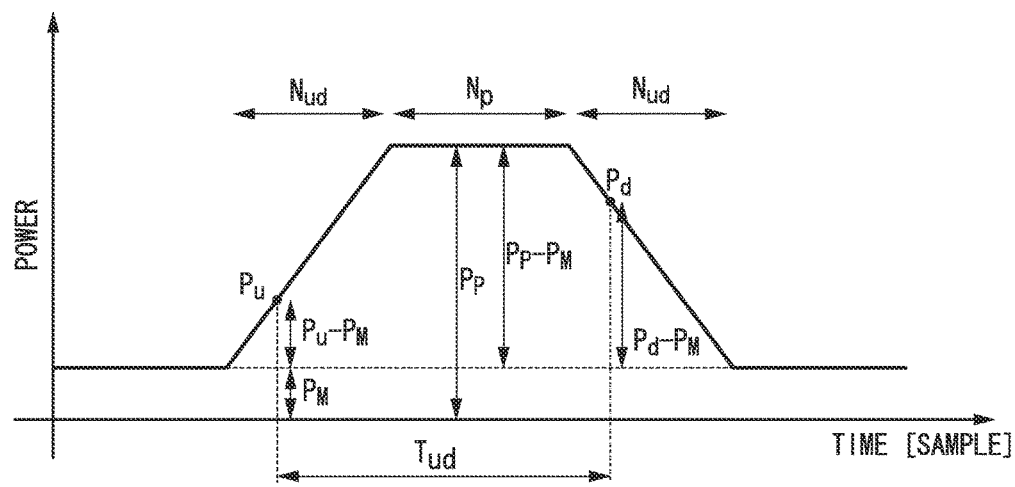
FIG. 18 is a diagram showing the reception power of a specific frequency band signal obtained by each discrete Fourier transform.

FIG. 18 is a diagram showing a reception power of a specific frequency band signal obtained by each discrete Fourier transform. In FIG. 18, $P_u$ and $P_d$ are detected at a reception sample interval $T_{ud}$. Since $P_u$ and $P_d$ are detected at constant intervals at a left side and a right side of a trapezoid, respectively, a sum, $P_u+P_d-2P_M$, of $(P_u-P_M)$ at the left side and $(P_d-P_M)$ at the right side is a constant value as shown in the following Equation 9.

[Equation 9]

$$P_u + P_d - 2P_M = \frac{(P_p - P_M)(2N_{ud} + N_p - T_{ud})}{N_{ud}} \quad \text{(Equation 9)}$$

Accordingly, $P_M$ can be obtained as shown in the following Equation 10.

[Equation 10]

$$P_M = \frac{N_{ud}P_u + N_{ud}P_d - (2N_{ud} + N_p - T_{ud})P_P}{T_{ud} - N_p} \quad \text{(Equation 10)}$$

Such control enables $P_M$ to be output without calculating and storing $P_M$.

Moreover, similarly, $P_p$ may be obtained from Equation 10 using $P_M$, $P_u$, and $P_d$. This is effective in case 2 or when $N_p$ is smaller than $N_s$ and $N_p$ cannot necessarily be acquired.

In the above-described method, the case in which the same numbers of $P_u(i)$ and $P_d(i)$ can be obtained has been described. On the other hand, in order to operate the foregoing algorithm when the number of $P_u(i)$ differs from the number of $P_d(i)$, the same number of values may be selected from each of $P_u(i)$ and $P_d(i)$, in which only a predetermined number of higher values or a predetermined number of lower values may be selected.

However, if the same numbers of values are selected arbitrarily from $P_u(i)$ and $P_d(i)$, it is difficult to determine which values correspond to $P_u(i)$, $P_p(i)$, $P_d(i)$, $P_{m,1}(i)$, and $P_{m,2}(i)$. This problem can be avoided by using at least one of method A and method B, which will be described later.

In method A, an interval $N_s$ at which the discrete Fourier transform is performed is set to 1/integer of $N_p$. On the other hand, in method B, the interval $N_s$ at which the discrete Fourier transform is performed is set to 1/integer of $N_{ud}$. Since the number of reception samples at the peak positions and the number of reception samples during the power value is increasing or decreasing can be fixed by method A and method B, determination and selection operations from the acquired signal can be omitted and the load resulting from the operations can be reduced. That is, the discrete Fourier transform length, the discrete Fourier transform interval, and the specific frequency band length may be determined so that the condition defined in method A, the condition defined in method B, or the both are satisfied. If the conditions of both methods A and B are satisfied, the reception samples $P_p(i)$ obtained at the peak, and $P_u(i)$ and $P_d(i)$ can be obtained by the same number every time, and thus an equation for calculating $P_M$ can be represented more simply than the calculation of $P_M$ using Equation 10. A case in which $N_p=mN_s$ and $N_{ud}=nN_s$ is considered. Here, n and m are arbitrary integers. In this case, since $T_{ud}=(n+m)N_s$, Equation 10 can be expressed by the following Equation 11.

[Equation 11]

$$P_M = P_u + P_d - P_P \quad \text{(Equation 11)}$$

It can be confirmed that the equation for calculating $P_M$ can be significantly simplified by simply setting $N_p=mN_s$ and $N_{ud}=nN_s$.

Figure 19:
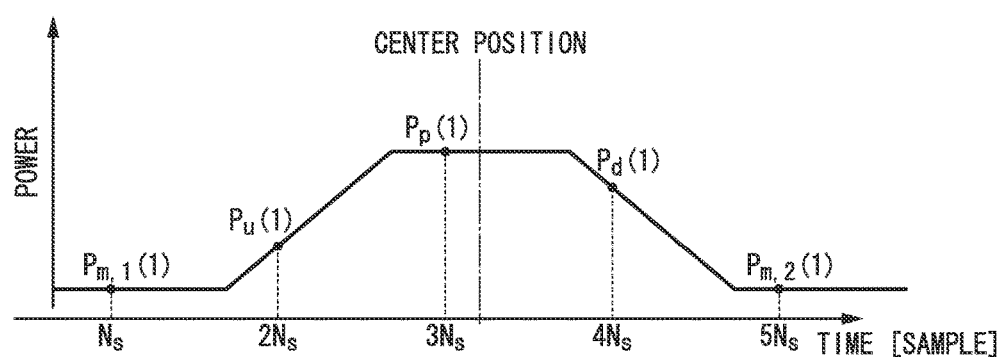
FIG. 19 is a diagram showing the reception power of a specific frequency band signal when a discrete Fourier transform interval is $N_k$ in case 4 shown in FIG. 15.

FIG. 19 shows an example of a case in which the equation for calculating $P_M$ is simplified. FIG. 19 corresponds to case 4 in FIG. 15, in which $N_f$ is set to $2N_k$ and $N_s$ is set to $N_k$. This setting enables $P_u$, $P_d$, and $P_p$ to be acquired at one point. In the optical signal receiving apparatus, a signal of $P_p$ is detected and signal powers before and after $P_p$ are used as $P_u$ and $P_d$, respectively. $P_{m,1}(1)$ and $P_{m,2}(1)$ can also be acquired, but $P_{m,1}(1)$ and $P_{m,2}(1)$ may be calculated using $P_u$ and $P_d$ from Equation 11. Equation 7 can be expressed by the following Equation 12.

[Equation 12]

$$T'_{s0} = T_p - \frac{N_K}{2}\left(\frac{P_u - P_d}{P_P - P_M}\right) \quad \text{(Equation 12)}$$

When reception information for a plurality of specific frequency band signals is used, chromatic dispersion can be obtained as follows. That is, the specific frequency band signal detecting circuit 804 uses and averages a plurality of calculation results for $P_p$ and $P_M$ and obtains $T'_{s0}$ using the averaged $P_p$ and $P_M$ for each $P_u$-$P_d$. The reception signal property estimating circuit 806 averages individual arrival time differences $\Delta t$ obtained as the difference $T'_{s0,L} - T'_{s0,H}$ between $T'_{s0,L}$ and $T'_{s0,H}$ obtained for different frequency bands and uses the averaged arrival time difference as $\Delta t$ in Equation 4.

Figure 20:
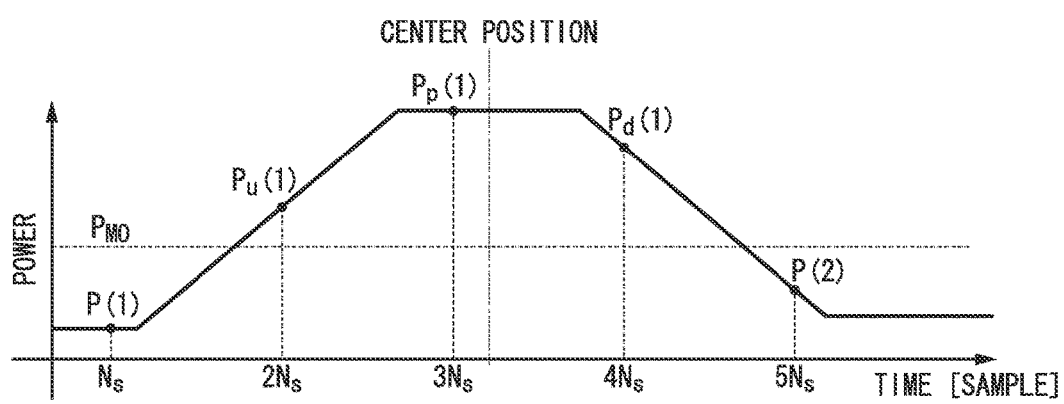
FIG. 20 is a diagram showing the reception power of a specific frequency band signal when a discrete Fourier transform interval is $N_f$-$N_k$ in case 3 shown in FIG. 15.

However, although the method satisfying both the condition of method A and the condition of method B reduces the computational load through simplification of the calculation, the length of the specific frequency band signal is greatly limited. In particular, since the discrete Fourier transform length has a value of power of 2, it may be difficult to satisfy both the condition of method A and the condition of method B due to other restrictions of a system. In such a case, if the condition of method A is to be satisfied, it is not necessary to provide a mechanism for determining $P_p$, $P_u$, and $P_d$. Since the condition of method A is satisfied, the peak power is necessarily $P_p$, and $P_u(i)$ and $P_d(i)$ are before and after a constant amount of $P_p$. The number of $P_u(i)$ and the number of $P_d(i)$ are not necessarily constant; however, since $P_u(i)$ and $P_d(i)$ of the number corresponding to an integer obtained by truncating digits subsequent to a decimal point of $N_p/N_s$ are necessarily present, a constant number of $P_u(i)$ and $P_d(i)$ that are present before and after $P_p$ are selected. FIG. 20 shows an example of the acquired result of the reception power of the specific frequency band signal when $N_s=N_f-N_k$ and $2N_k>N_f>N_k$ (case 3). In this case, since one peak value $P_p$ is necessarily detected, this can be used for detection of a specific frequency band signal, detection of a frequency offset, and detection of a clock offset. Further, the signal position can be obtained from Equations 9 and 7 using $P_u(1)$ and $P_d(1)$ before and after the peak value $P_p$ as $P_u$ and $P_d$, respectively. By calculating a distribution of levels in a frequency domain as shown in FIG. 7A for the result of the Fourier transform when $P_p$ is detected, the frequency offset and the clock offset can be determined from the peak position of the specific frequency band signal. When $P_p$ is detected for specific frequency band signals corresponding to different frequencies at different timings, a plurality of results of the Fourier transform may be used.

Here, a method for obtaining the signal position more simply using $P_{M0}$ in place of $P_M$ (see FIG. 18) when the condition of method A is satisfied will be described. While it has already been demonstrated that it is possible to easily obtain the signal position when both the condition of method A and the condition of method B are satisfied, the same condition can be virtually applied even when only the condition of method A is satisfied. That is, an offset value $P_{M0}$, which is not the minimum value of the power value, may be used in place of the minimum power $P_M$. This will be described using FIG. 20. In FIG. 20, since $N_{ud}$ is greater than $N_s$, the numbers of $P_u$ and $P_d$ are not constant. For this reason, it is originally difficult to calculate the signal position, but a power value indicated by a dotted line in FIG. 20 is defined as $P_{M0}$. This is a line connecting points of a trapezoid at which a distance on an X coordinate (the time domain) from each of a left end and a right end of an upper side of the trapezoid is $N_s$. It can be seen from a trapezoid above $P_{M0}$ that exactly the same condition as that in FIG. 19 is obtained. That is, when $P_{M0}$ is used in place of $P_M$, FIG. 20 can be treated as exactly the same subject as FIG. 19 and the signal position can be easily calculated. Specifically, $P_{M0}$ in FIG. 20 is defined by the following Equation 13.

[Equation 13]

$$P_{M0} = P_u + P_d - P_P \quad \text{(Equation 13)}$$

The signal position can be obtained as shown in Equation 14 using the thus obtained $P_{M0}$ in place of $P_M$. This is applied to any of cases 3 to 5.

[Equation 14]

$$T'_{s0} = T_p - \frac{N_{ud}}{2}\left(\frac{P_u - P_d}{P_P - P_{M0}}\right) \quad \text{(Equation 14)}$$
$$= T_p - \frac{N_{ud}}{2}\left(\frac{P_u - P_d}{2P_P - P_u - P_d}\right)$$

The description has been given using the power values of the specific frequency band signal in a certain frequency band, and a method for calculating a power value P will be described. The power value P of the specific frequency band signal that has been described so far can be obtained using a plurality of methods. For example, in a specific frequency band signal having one peak in each of a high frequency band and a low frequency band, a power $P_{S,H}$ of the high frequency band and a power $P_{S,L}$ of the low frequency band are obtained as shown in Equation 15.

[Equation 15]

$$P_{S,H} = \sum_{fu-nd \le k \le fu+nd} |r_k|^2, \quad P_{S,L} = \sum_{fd-nd \le k \le fd+nd} |r_k|^2 \quad \text{(Equation 15)}$$

Here, fu denotes a signal position in a frequency domain corresponding to a center position of the specific frequency band signal in the high frequency band, and fd denotes a signal position in a frequency domain corresponding to a center position of the specific frequency band signal in the low frequency band. A power value can be obtained by summing nd signals before and after these signal positions. When received signals $r_{x1}$ to $r_{xNf}$ and $r_{y1}$ to $r_{yNf}$ for a plurality of polarization planes can be obtained, the signal power P need not be exactly obtained, and calculation for obtaining $\Delta t$ can be performed without problems using a value that has a correlation with the signal power P. For example, powers $P_{S,H}$ and $P_{S,L}$ may be defined by Equation 16.

[Equation 16]

$$P_{S,H} = \sum_{fu-nd \le k \le fu+nd} |r_k|, \quad P_{S,L} = \sum_{fd-nd \le k \le fd+nd} |r_k| \quad \text{(Equation 16)}$$

Further, when reception signals are received on two polarization planes, the power $P_{S,H}$ and the power $P_{S,L}$ can be obtained using Equation 17 from $P_{S,H}(1)$ and $P_{S,H}(2)$ corresponding to a high frequency component and $P_{S,L}(1)$ and $P_{S,L}(2)$ corresponding to a low frequency component with respect to each polarization plane.

[Equation 17]

$$P_{s,H} = P_{s,H}(1) + P_{s,H}(2), P_{s,L} = P_{s,L}(1) + P_{s,L}(2) \quad \text{(Equation 17)}$$

Respective expected values for $P_{S,H}(1)$ and $P_{S,H}(2)$ may be estimated and the estimated expected values may be summed by weighting of maximal ratio combining.

In Equations 15 and 16, since the frequency offset remains in the received signal, fu and fd may have an offset from the real peak position of the specific frequency band signal. If $\Delta t$ is obtained from the signal power P when the frequency offset still remains, conditions for calculating a signal position are different from a frequency band to a frequency band, causing a residual error to be generated in the chromatic dispersion amount. Accordingly, after the above-described frequency offset is detected, the positions of fu and fd are shifted by the frequency offset and $P_{S,L}$ and $P_{S,H}$ are calculated, thereby making it possible to reduce a residual error of chromatic dispersion.

Further, chromatic dispersion values may be obtained from the received signals for two polarization planes, respectively, and the obtained chromatic dispersion values may be averaged. Alternatively, the received signals for two polarization planes may be alternately detected and a chromatic dispersion amount may be estimated from the powers of the obtained specific frequency band signals. Further, in this case, the received signal with a higher power among the received signals for two polarization planes may be selected and may be used for the calculation of the chromatic dispersion compensation.

Further, the concept of FIG. 15 can be used for the detection of the specific frequency band signal. When a discrete Fourier transform is used to detect the position of the specific frequency band signal, the size $N_f$ of the discrete Fourier transform is small and a period $N_s$ in which the discrete Fourier transform is used is as great as possible, thereby making it possible to reduce the computational load. It is assumed that the discrete Fourier transform size used for only signal detection is $N_{f0}$ and the period is $N_{s0}$. In this case, referring to FIG. 15, it can be said that a condition in which $N_f$ is as small as possible and $N_p$ is as great as possible is best. This is because, when $N_{s0}$ is set to be greater than $N_p$, a maximum value is not necessarily obtained and the detection accuracy is degraded. For this reason, it is necessary to increase $N_p$ in order to increase $N_{s0}$. A case in which the greatest $N_p$ can be set is case 5, but in case 5, the size of the discrete Fourier transform is also great. In case 2, it is difficult to obtain the peak since $N_p=0$. In contrast, in case 1, $N_p>0$ and the specific frequency band signal can be detected with a small discrete Fourier transform size ($N_f<N_k$), and thus the computational load is small. In case 1, one peak position can be obtained by performing a discrete Fourier transform per $N_k-N_f$. In order to detect the specific frequency band signal from the peak position, for example, the power of the specific frequency band signal is output during a constant time, the maximum power of the output signal is stored as $P_{p0}$, and thereafter a signal with a value greater than $\beta P_{p0}$ is detected, thereby the specific frequency band signal can be detected. $\beta$ is a value smaller than 1 and greater than 0, and is set so that a detection error is smaller than the variance of the peak power of the specific frequency band signal. Further, $P_{p0}$ can be updated with the detected result of the specific frequency band signal. Further, in cases 3 to 5, the specific frequency band signal can be detected by performing a discrete Fourier transform per $N_f-N_k$.

A chromatic dispersion amount estimation algorithm may be used after the specific frequency band signal is detected with such a small calculation amount.

When an insertion period of the specific frequency band signal is known, if it is determined that the specific frequency band signal is detected when the specific frequency band signal is iteratively detected $M_{chk}$ times ($M_{chk}$ is an integer greater than or equal to 2) at intervals of the insertion period, erroneous detection can be prevented.

A method for establishing optical signal synchronization using the second optical signal receiving apparatus is the same as the flow of FIG. 12, except for the following point. That is, in step S07, the specific frequency band signal detecting circuit 804 detects a signal position from the signal converted into the frequency domain, and if the position of the specific frequency band is detected, at least some of $P_p(i)$, $P_{m,1}(i)$, $P_{m,2}(i)$, $P_u(i)$, and $P_d(i)$ in the digital signal in the frequency domain, an individual arrival time difference calculated from these values, or a coefficient which is used in an equation for calculating the individual arrival time difference and which is calculated from these values is output to the specific frequency band signal power storage circuit 805 to be stored. In step S08, the reception signal property estimating circuit 806 then estimates information on one or more of the frequency offset, the clock offset, the timing offset, and the chromatic dispersion amount from the information stored in the specific frequency band signal power storage circuit 805.

Figure 21:
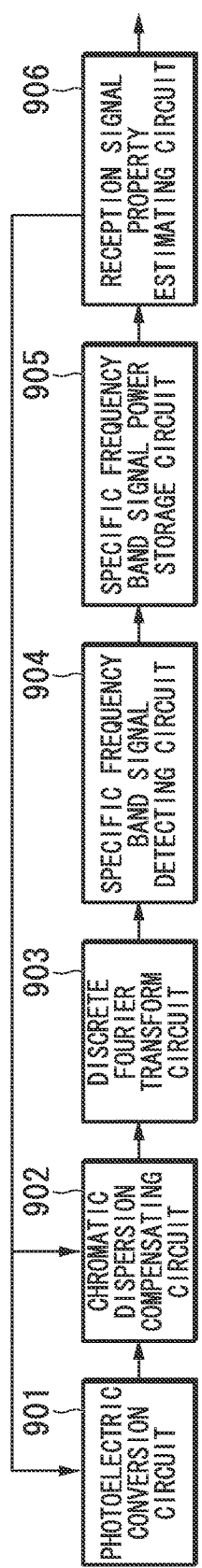
FIG. 21 is a block diagram schematically showing the configuration of a specific frequency band signal receiving apparatus for optical communication provided in a third optical signal receiving apparatus of the same embodiment.

FIG. 21 shows an example of the configuration of a specific frequency band signal receiving apparatus as a signal receiving circuit provided in a third optical signal receiving apparatus in the present embodiment. 901 indicates a photoelectric conversion circuit, 902 indicates a chromatic dispersion compensating circuit, 903 indicates a discrete Fourier transform circuit, 904 indicates a specific frequency band signal detecting circuit, 905 indicates a specific frequency band signal power storage circuit, and 906 indicates a reception signal property estimating circuit.

The photoelectric conversion circuit 901 converts an input optical signal into a signal in an electrical domain, and converts the converted signal in an electrical domain into a digital signal. The chromatic dispersion compensating circuit 902 applies an inverse property of chromatic dispersion to the output signal from the photoelectric conversion circuit 901 based on an estimated value of a chromatic dispersion amount estimated by the reception signal property estimating circuit 906. Specifically, the chromatic dispersion compensating circuit 902 compensates for the chromatic dispersion by multiplying the coefficient of Equation 5 by the digital signal in the frequency domain using estimated chromatic dispersion amount information maintained therein. A signal whose chromatic dispersion amount has been compensated for with the estimated chromatic dispersion amount information is input to the discrete Fourier transform circuit 903. The discrete Fourier transform circuit 903 performs a discrete Fourier transform of $N_f$ points on the input digital signal at $N_s$ sample intervals. The digital signal converted into the frequency domain is input to the specific frequency band signal detecting circuit 904. The specific frequency band signal detecting circuit 904 detects the position of the specific frequency band signal. If the position of the specific frequency band signal is detected, the specific frequency band signal detecting circuit 904 outputs at least some of $P_p(i)$, $P_{m,1}(i)$, $P_{m,2}(i)$, $P_u(i)$, and $P_d(i)$ for digital signals obtained in at least two frequency regions, an individual arrival time difference calculated from these values, or a coefficient which is used in an equation for calculating the individual arrival time difference and which is calculated from these values to the specific frequency band signal power storage circuit 905 to be stored. The reception signal property estimating circuit 906 estimates information on one or more of the frequency offset, the clock offset, the timing offset, and the chromatic dispersion amount from the information stored in the specific frequency band signal power storage circuit 905, outputs the chromatic dispersion amount and the frequency offset information to the chromatic dispersion compensating circuit 902, and outputs the clock offset information and the timing offset information to the photoelectric conversion circuit 901. It is to be noted that the photoelectric conversion circuit 901 also includes the function of the analog/digital conversion circuit shown in FIG. 6 or FIG. 14 for converting a signal in an electrical domain into a digital signal.

Further, in the third optical signal receiving apparatus, when the chromatic dispersion compensating circuit 902 has a function of detecting the position of the specific frequency band signal, the chromatic dispersion compensating circuit 902 may detect the position of the specific frequency band signal and output signal position information to the discrete Fourier transform circuit 903. In this case, it is sufficient for circuits including the discrete Fourier transform circuit 903 and its subsequent circuits to operate when the position of the specific frequency band signal has been detected, and thus the computational load can be reduced. Alternatively, the chromatic dispersion compensating circuit 902 may output information on a frequency in the vicinity of the obtained specific frequency band signal (a signal in a frequency domain including the frequency band of the specific frequency band signal) to the discrete Fourier transform circuit 903, and the discrete Fourier transform circuit 903 may detect the specific frequency band signal using the input frequency information and perform a discrete Fourier transform when detecting the specific frequency band signal. Accordingly, it is sufficient for the circuits including the discrete Fourier transform circuit 903 and its subsequent circuits to operate when the specific frequency band signal has been detected, and thus the computational load can be reduced. In these cases, the specific frequency band signal detecting circuit 904 can be omitted.

Further, the above scheme can reduce an offset between $P_{M1}$ and $P_{M2}$ by causing signals before and after the alternating signal to approach symmetrical. For example, $S_{a1}$, $S_{a2}$, ..., $S_{aNa}$ are inserted before the alternating signal, and a signal sequence of $S_{aNa}$, $S_{a(Na-1)}$, ..., $S_{a2}$, $S_{a1}$ having the inverse order of this signal sequence is inserted after the alternating signal, and thus leakage of components other than the alternating signal is made the same condition and the detection accuracy can be improved.

Figure 22:
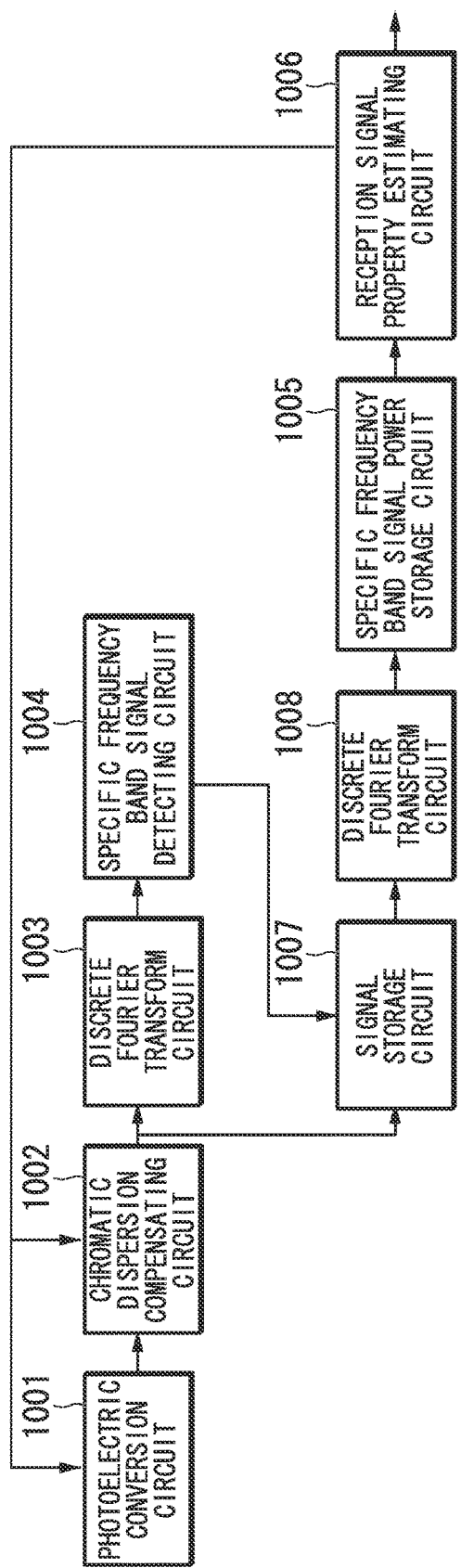
FIG. 22 is a block diagram schematically showing the configuration of a specific frequency band signal receiving apparatus for optical communication provided in a fourth optical signal receiving apparatus of the same embodiment.

FIG. 22 shows an example of the configuration of a specific frequency band signal receiving apparatus as a signal receiving circuit provided in a fourth optical signal receiving apparatus in the present embodiment. 1001 indicates a photoelectric conversion circuit, 1002 indicates a chromatic dispersion compensating circuit, 1003 and 1008 indicate a discrete Fourier transform circuit, 1004 indicates a specific frequency band signal detecting circuit, 1005 indicates a specific frequency band signal power storage circuit, 1006 indicates a reception signal property estimating circuit, and 1007 indicates a signal storage circuit.

The photoelectric conversion circuit 1001 converts an input optical signal into a signal in an electrical domain and converts the converted signal in an electrical domain into a digital signal. The chromatic dispersion compensating circuit 1002 applies an inverse property of chromatic dispersion to the output signal of the photoelectric conversion circuit 1001 based on an estimated value of a chromatic dispersion amount estimated by the reception signal property estimating circuit 1006. Specifically, the chromatic dispersion compensating circuit 1002 compensates for the chromatic dispersion by multiplying the coefficient of Equation 5 by the digital signal in the frequency domain using estimated chromatic dispersion amount information maintained therein. The signal whose chromatic dispersion amount has been compensated for with the estimated chromatic dispersion amount information is input to the discrete Fourier transform circuit 1003 and the signal storage circuit 1007. The digital signal input to the discrete Fourier transform circuit 1003 is subjected to a discrete Fourier transform of $N_{f0}$ points at $N_{s0}$ sample intervals and converted into a digital signal in the frequency domain. The specific frequency band signal detecting circuit 1004 detects a position of a specific frequency band signal from the input digital signal converted into the frequency domain. If the position of the specific frequency band signal is detected, a detection notification signal is output to the signal storage circuit 1007. The signal storage circuit 1007 stores a constant amount of signal received from the chromatic dispersion compensating circuit 1002 in a memory. If the detection notification signal is input from the specific frequency band signal detecting circuit 1004, the signal storage circuit 1007 outputs the constant amount of received signal stored in the memory to the discrete Fourier transform circuit 1008. The discrete Fourier transform circuit 1008 performs a discrete Fourier transform of $N_f$ points at $N_s$ sample intervals, and outputs at least some of $P_p(i)$, $P_{m,1}(i)$, $P_{m,2}(i)$, $P_u(i)$, and $P_d(i)$ obtained in at least two frequency regions in the digital signal in the frequency domain, an individual arrival time difference calculated from these values, or a coefficient which is used in an equation for calculating the individual arrival time difference and which is calculated from these values to the specific frequency band signal power storage circuit 1005 to be stored. The reception signal property estimating circuit 1006 estimates information on one or more of the frequency offset, the clock offset, the timing offset, and the chromatic dispersion amount from the information stored in the specific frequency band signal power storage circuit 1005, outputs the chromatic dispersion amount to the chromatic dispersion compensating circuit 1002, and outputs the clock offset information and the timing offset information to the photoelectric conversion circuit 1001. The frequency offset information may be output from the reception signal property estimating circuit 1006 to the chromatic dispersion compensating circuit 1002.

Further, in the third and fourth optical signal receiving apparatuses, when the chromatic dispersion amount information is fed back to the chromatic dispersion compensating circuit 902 or 1002, another coefficient that does not include λ can be fed back, instead of Dc in Equation 4. Accordingly, a coefficient for compensating for the chromatic dispersion can be calculated independent of a frequency at which communication is performed. When the coefficient g(f) is to be obtained from the chromatic dispersion amount Dc in Equation 5, the coefficient g(f) cannot be obtained if λ is unknown. On the other hand, if a value such as Δt, ωt, or cΔt/ΔF is passed to the chromatic dispersion compensating circuit 902 or 1002, $\lambda^2 D_C$ in Equation 5 becomes known, and thus the chromatic dispersion compensation coefficient can be obtained without using information on λ.

Further, in the third and fourth optical signal receiving apparatuses, when a communication device (not shown) connected to the reception signal property estimating circuit 906 or 1006 has already begun to decode data, an updated amount of the coefficient for chromatic dispersion compensation used in the chromatic dispersion compensating circuit 902 or 1002 may be limited so as to perform a setting to suppress influence on the decoded result of the data to a defined value or smaller. For example, when Δt is input and |Δt| is greater than $\Delta t_{max}$, the chromatic dispersion compensation coefficient may be updated as if $\Delta t = \Delta t_{max} \times \Delta t / |\Delta t|$ has been detected.

Further, in the first to fourth optical signal receiving apparatuses, the reception signal property estimating circuit may estimate the frequency offset using a received signal other than the received signal when the specific frequency band signal detecting circuit detects the specific frequency band signal. For example, the signal in the frequency domain, which has been subjected to the discrete Fourier transform and output, may be acquired a plurality of times, a value at which a signal level is maximized in each frequency channel may be stored, and the centroid position of a signal level distribution of the obtained signals in the frequency domain may be estimated, and the centroid position is used as frequency offset information Δf. Alternatively, the signal in the frequency domain, which has been subjected to the discrete Fourier transform and output, may be acquired a plurality of times, an average of signal levels in each frequency channel may be calculated, and the centroid position of a signal level distribution for the obtained signals in the frequency domain may be estimated, and the centroid position is used as the frequency offset information Δf. While the centroid can be detected even using the received signal in which the specific frequency band signal is included, the centroid position may have a great error due to an influence of a frequency-selective level variation because the level of the specific frequency band signal is too high. For this reason, the specific frequency band signal detecting circuit may select a signal other than the specific frequency band signal to thereby making it possible to improve the accuracy of frequency offset information. It is also possible to calculate the centroid from a frequency component other than the specific frequency band signal.

Figure 23:
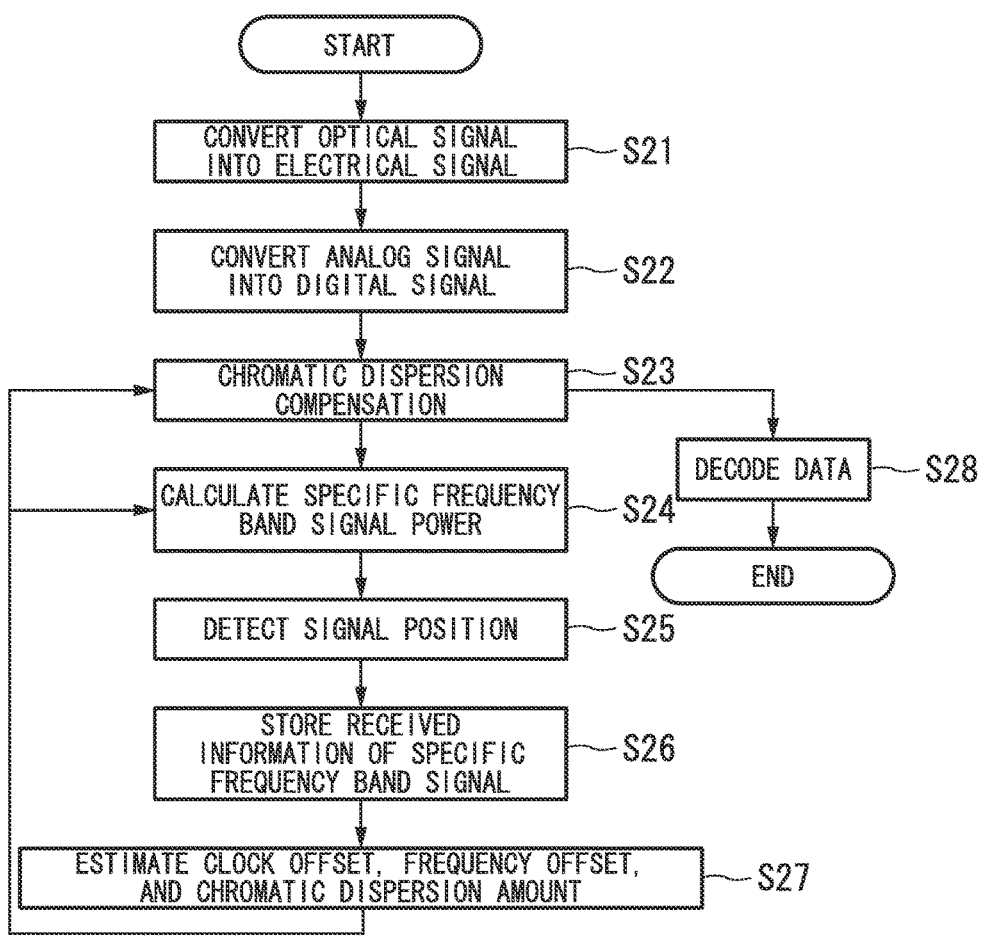
FIG. 23 is a diagram showing the flow of a method for establishing optical signal synchronization in accordance with the same embodiment.

FIG. 23 is a diagram showing steps including a discrete Fourier transform and its subsequent steps when an interval of a discrete Fourier transform for detecting a specific frequency band signal and an interval $N_{ss}$ of a discrete Fourier transform for estimating chromatic dispersion are the same in the method for establishing optical signal synchronization in accordance with the present embodiment.

The photoelectric conversion circuit 901 converts an input optical signal into a signal in an electrical domain (step S21), and converts an analog signal that is the converted signal in an electrical domain into a digital signal (step S22). The chromatic dispersion compensating circuit 902 performs chromatic dispersion compensation (step S23). A specific frequency band signal power value that is the sum of powers or amplitudes in the vicinity of the specific frequency band signal component is calculated from the signal in the frequency domain obtained by the chromatic dispersion compensating circuit 902 or the discrete Fourier transform circuit 903 (step S24). Next, any of the chromatic dispersion compensating circuit 902, the discrete Fourier transform circuit 903, and the specific frequency band signal detecting circuit 904 detects the signal position of the specific frequency band signal from the specific frequency band signal power value (step S25). The specific frequency band signal detecting circuit 904 outputs at least some of $P_p(i)$, $P_{m,1}(i)$, $P_{m,2}(i)$, $P_u(i)$, and $P_d(i)$, an individual arrival time difference calculated from these values, or a coefficient used in an equation for calculating the individual arrival time difference calculated from these values to the specific frequency band signal power storage circuit 905 to be stored (step S26). The reception signal property estimating circuit 906 estimates a clock offset, a frequency offset, and a residual chromatic dispersion amount from the position of a peak of the signal power in the frequency domain using the values stored in the specific frequency band signal power storage circuit 905 (step S27). Information on the residual chromatic dispersion amount is fed back from the reception signal property estimating circuit 906 to the chromatic dispersion compensating circuit 902. As a result, the accuracy of chromatic dispersion compensation can be improved. The chromatic dispersion compensating circuit 902 outputs a signal subjected to chromatic dispersion compensation to a communication device that decodes data, and the communication device decodes the data (step S28).

It is to be noted that the chromatic dispersion compensating circuit 902 deletes at least part of the information stored in the specific frequency band signal power storage circuit 905 when changing the coefficient for chromatic dispersion compensation. The specific frequency signal detecting circuit 904 outputs at least some of $P_p(i)$, $P_{m,1}(i)$, $P_{m,2}(i)$, $P_u(i)$, and $P_d(i)$ obtained for a newly input signal sequence, or a coefficient calculated from these values to the specific frequency band signal power storage circuit 905 to be stored. The reception signal property estimating circuit 906 estimates a clock offset, a frequency offset, and a residual chromatic dispersion amount from the position of the peak of the signal power in the frequency domain using the values newly written in the specific frequency band signal power storage circuit 905.

Further, when the specific frequency band signal power value is to be calculated, the specific frequency band signal power value can be calculated so that the peak of the specific frequency band signal becomes a center by shifting the position of a frequency that is considered as a specific frequency band signal using frequency offset information. As a result, it is possible to improve the accuracy of the estimated result of the chromatic dispersion compensation.

Figure 24A:
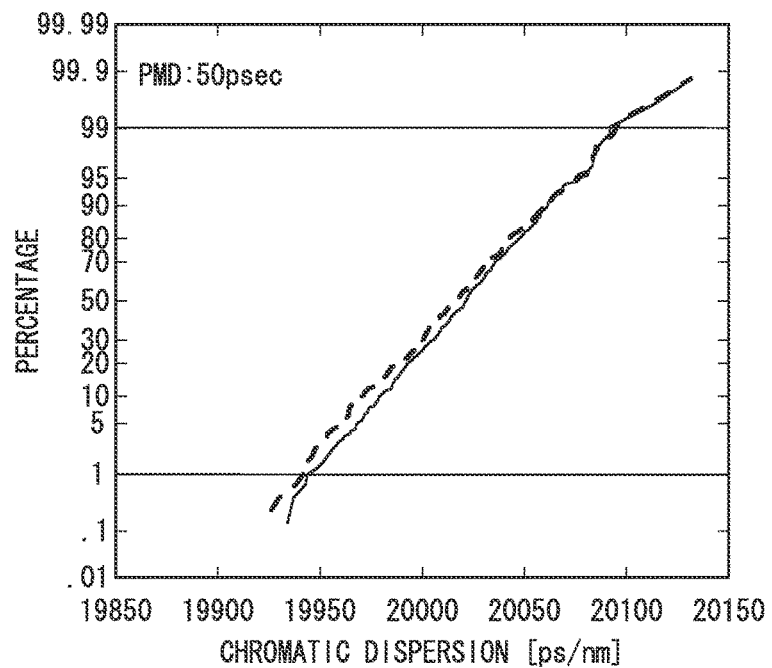
FIG. 24A is a diagram showing a cumulative probability distribution of estimated results of chromatic dispersion.
Figure 24B:
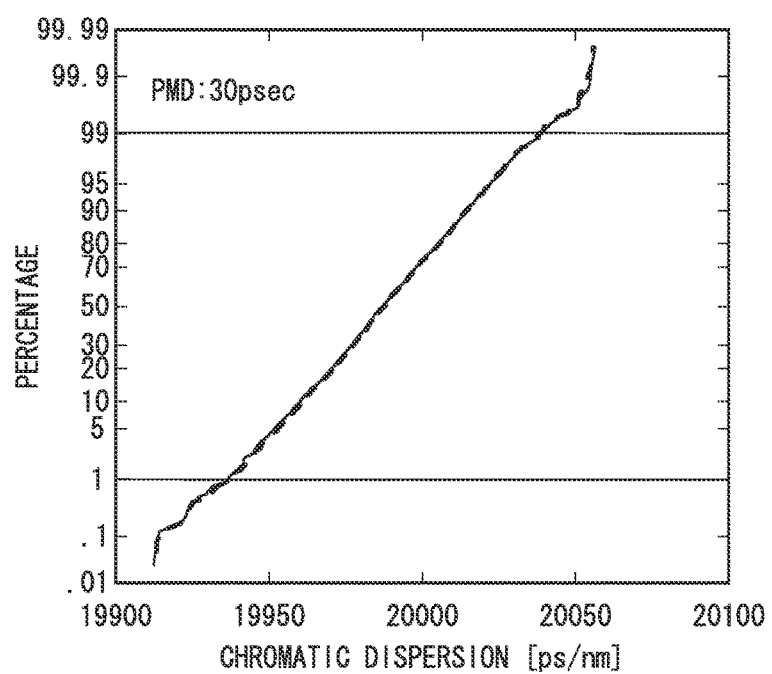
FIG. 24B is a diagram showing a cumulative probability distribution of estimated results of chromatic dispersion.

FIGS. 24A and 24B show results of computer simulations indicating the accuracy of chromatic dispersion estimation in the optical signal receiving apparatus in accordance with the present embodiment. Here, a signal of 31.5 Gbaud is transmitted using polarization-division multiplexing, and a specific frequency band signal of 64 symbols having peaks in two frequency bands (a signal of repetition of (S, S), (−S, −S)) are inserted into a front portion of a data sequence. In the optical signal receiving apparatus, chromatic dispersion was estimated by a discrete Fourier transform of 256 points using an A/D (analog/digital) converter of 63 Gsample/sec. Since over-sampling is performed at a receiving side, the specific frequency band signal has a length of 128 symbols ($N_k$=128). This corresponds to the scenario of case 4 in FIG. 15 because $N_f$=256. The accuracy of chromatic dispersion compensation was confirmed assuming that a chromatic dispersion amount of a light path was 20000 ps/nm, PMD was 50 ps and 30 ps, and the SNR (signal to noise ratio) of a symbol was 10 dB. Since a specific frequency band signal of 64 symbols is inserted into a front portion of a data block every time (128 symbols at the receiving side), 200 data blocks were used. That is, the chromatic dispersion was compensated for with 200 specific frequency band signals. 240 MHz was applied as a frequency offset.

First, the result of PMD=50 psec shown in FIG. 24A will be verified. In FIG. 24A, a solid line indicates the result in which each of $P_M$ and $P_p$ is averaged to calculate Δt for each front portion of a data block, a 200 number of Δt are averaged, and the chromatic dispersion amount is estimated. A distribution indicated by a dotted line is the result obtained by averaging $P_p$, calculating $P_M$ using Equation 11, and averaging $P_M$. It can be seen that substantially the same properties are obtained in both cases, 20021 ps/nm and 20016 ps/nm are obtained on average, and the calculation is performed with high accuracy in which it is 19940 to 20100 ps/nm in a cumulative probability of 98%. The estimation accuracy is determined for PMD, and when PMD is 30 psec, the dotted line overlaps the solid line as shown in FIG. 24B, and thus there is no great difference therebetween. It can be seen that the average value is 19988 ps/nm, the chromatic dispersion amount is 19936 to 20039 ps/nm with the probability of 98%, and the accuracy is higher than that in the case in which PMD is 50 psec as shown in FIG. 24A. Further, in the results of FIGS. 24A and 24B, the average values have offsets from 20000 ps/nm, but this problem can be resolved as follows. That is, the offsets from the real value can be reduced by outputting the estimated chromatic dispersion amount to the chromatic dispersion compensating circuit, performing the chromatic dispersion compensation based on the estimated chromatic dispersion amount, and again compensating for the residual chromatic dispersion amount using an algorithm of the present embodiment. Alternatively, a residual offset amount may be stored in advance and the value may be corrected and used as the chromatic dispersion amount. However, in the results of FIGS. 24A and 24B, the center positions have slight offsets from 20000 ps/nm. This is because the frequency offsets remain.

Figure 25:
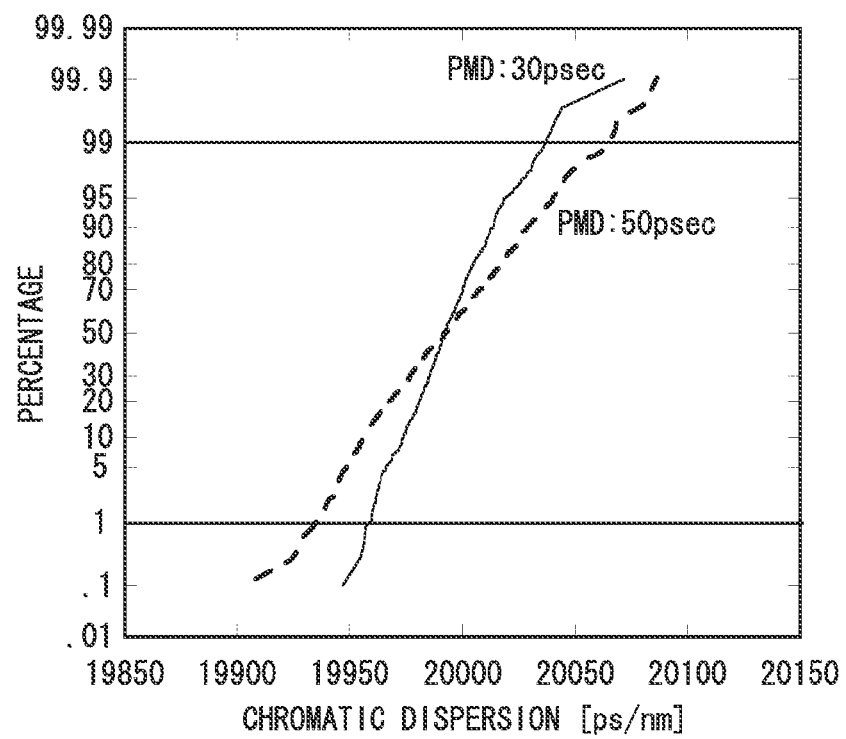
FIG. 25 is a diagram showing a cumulative probability distribution of estimated results of chromatic dispersion.

FIG. 25 is results of computer simulations indicating the accuracy of chromatic dispersion estimation in the optical signal receiving apparatus in accordance with the present embodiment. Here, a signal of 31.5 Gbaud is transmitted using polarization-division multiplexing, and an alternating signal of 80 symbols is inserted into a front portion of a data sequence. In the optical signal receiving apparatus, chromatic dispersion was estimated by a discrete Fourier transform of 256 points using an A/D converter of 63 Gsample/sec. Since over sampling is performed at a receiving side, the specific frequency band signal has a length of 160 symbols ($N_K$=160). This corresponds to the scenario of case 3 in FIG. 15 because $N_f$=256. In order to acquire one specific frequency band power serving as a peak, a period $N_s$ of the discrete Fourier transform is calculated assuming that $N_f$-$N_k$=96. The accuracy of chromatic dispersion compensation was confirmed assuming that a chromatic dispersion amount of a light path was 20000 ps/nm, the PMD was 50 ps and 30 ps, and the SNR (signal to noise ratio) of the symbols was 10 dB. 1000 data blocks were used in which a specific frequency band signal of 80 symbols having peaks in two frequency bands (a signal of repetition of (S, S), (−S, −S)) are inserted into a front portion of each data block every time. That is, the chromatic dispersion was compensated for with 1000 specific frequency band signals. FIG. 25 shows the result of correcting a position when the frequency offset is detected.

FIG. 25 shows the results for PMD=50 psec and PMD=30 psec. The result of calculating $P_{M0}$, which is obtained by Equation 13 from $P_u(1)$, $P_d(1)$, and $P_p(1)$, calculating Δt for each data block from the difference between signal positions of Equation 14, storing a 1000 number of Δt, and estimating the chromatic dispersion amount using an averaged value of stored Δt is shown. It can be seen that chromatic dispersion amounts of 19993 ps/nm and 19992 ps/nm are obtained on average for PMD=50 psec and PMD=30 psec, respectively, and the chromatic dispersion amounts are calculated with high accuracy in which they are 19934 to 20066 ps/nm and 19958 to 20037 ps/nm in a cumulative probability of 98%. It can be confirmed that the shift of the average value of the estimated values of chromatic dispersion is made small by taking the frequency offset into consideration.

Second Embodiment

Hereinafter, a second embodiment of the present invention will be described with reference to the drawings. It is to be noted that the schematic configurations of optical signal transmitting apparatuses (transmitters) in the second to tenth embodiments, which will be described hereinafter, are basically the same as the schematic configuration of the optical signal transmitting apparatus shown in FIG. 1. However, for example, in the second to tenth embodiments, a specific frequency band signal generated by the specific frequency band signal generating circuit 101 is not limited to an alternating signal such as the specific frequency band signal in the first embodiment.

Figure 26:
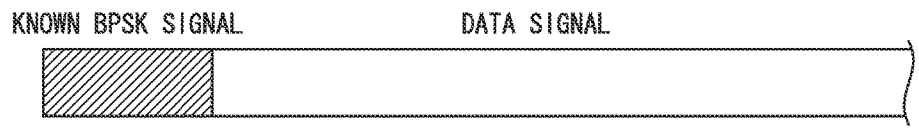
FIG. 26 is a diagram showing the schematic configuration of a transmission signal frame in accordance with a second embodiment of the present invention.

FIG. 26 is a diagram showing the schematic configuration of a transmission signal frame in accordance with the present second embodiment. The transmission signal frame shown in FIG. 26 is obtained by the signal synthesizing circuit 102, which performs time-division multiplexing on a BPSK (binary phase shift keying) signal sequence group known to the transmitter and the receiver at a front portion or an end portion of a transmission signal ("data signal") shown in FIG. 26).

It is to be noted that the configuration of the transmission signal frame of the second embodiment shown in FIG. 26 is an example in which the known BPSK signal sequence is inserted (time-division multiplexed) at the front portion of the transmission signal.

Further, this transmission signal frame is subjected to optical modulation in a band (1260 nm to 1625 nm) with a small optical fiber loss used in general optical fiber transmission as disclosed in "Optical Fiber Communication Technique" in Reference Document 3 by the electro-optical conversion circuit 103, and is transmitted to the receiver via a transmission line for optical fiber communication.

[Reference Document 3] Takaya Yamamoto, "Multimedia Transmission Technique Selected Book, Optical Fiber Communication Technique," Nikkan Kogyo Shimbun Ltd., p. 59, Jun. 26, 1995, First Issue of First Edition.

Here, reasons for using the BPSK signal as the known signal is as follows.

(Reason 1) The signal can be generated using a binary signal generator.

(Reason 2) SNR is higher compared to other modulations.

(Reason 3) Frequency spectrum components at a high frequency side and frequency spectrum components at a low frequency side have a complex conjugate relationship with respect to a center frequency.

The receiver performs digital signal processing on the received transmission signal frame using the BPSK signal sequence group, which is known to the transmitter and the receiver. The receiver performs timing detection and clock extraction for optical fiber communication based on the result obtained by this digital signal processing and estimates a reception quality, such as a frequency offset and a state of a transmission line.

The timing detection can be realized, for example, by calculating cross-correlation between the known BPSK signal used for transmission and the received known BPSK signal and detecting a peak value.

For the clock extraction, for example, the method for verifying a clock offset in the reception signal property estimating circuit 605 described in the first embodiment can be used.

The frequency offset estimation is performed, for example, based on the following measurements.

(Measurement 1) A discrete Fourier transform is performed on the known BPSK signal used for transmission and the received known BPSK signal, cross-correlation is calculated in a frequency domain based on the result of the discrete Fourier transform to detect the peak value, and the frequency offset is measured based on the detected peak value.

(Measurement 2) The received known BPSK signal is multiplied by a complex conjugate of the known BPSK signal used for transmission and a temporal phase variation is measured.

Further, a method for estimating a state of a transmission line includes, for example, the following estimation methods.

(Estimation method 1) A cross-correlation between the known BPSK signal used for transmission and the received known BPSK signal is calculated using a tapped delay line filter.

(Estimation method 2) A discrete Fourier transform is performed on the known BPSK signal used for transmission and the received known BPSK signal, and inverse modulation is performed on each frequency component.

The receiver estimates degradation factors specific to optical fiber transmission using the known BPSK signal in accordance with the operation as described above, and outputs the estimated value to an equalizer (not shown) or a compensator (not shown). Further, the receiver can demodulate the signal by correcting the received transmission signal frame using the estimated value.

Further, a method similar to that employed in the blind type equalizer as disclosed in Non-Patent Documents 2 and 3 can be used as a compensating method.

In the optical fiber transmission, generally, the instability of a light source has a great influence on a transmission property. However, when the configuration of the transmission signal frame of the present second embodiment is used, a frequency offset is estimated using the known BPSK signal, and thus accurate estimation compared to the blind estimation can be realized.

Further, the chromatic dispersion and the polarization mode dispersion can be estimated simultaneously as the state of the transmission line. Accordingly, when the receiver simultaneously estimates the chromatic dispersion and the polarization mode dispersion, it is unnecessary to provide a plurality of estimating apparatuses.

Moreover, in the case of the blind estimation, there is a problem (miscapturing) in that a desired signal cannot be demodulated due to convergence to an erroneous value such as an interference signal. In contrast, when the known BPSK signal is used as in the configuration of the transmission signal frame of the present second embodiment, an equalization weight for a desired signal can be calculated, and thus the problem of the miscapturing can be resolved.

As described above, the use of the known BPSK signal as in the configuration of the transmission signal frame of the second embodiment enables degradation factors to be estimated more accurately than the blind estimation.

Further, after the state of the transmission line is estimated with the known BPSK signal, a blind estimation algorithm is activated for a data signal portion, and the information estimated by the blind estimation algorithm is used together with the information estimated using the known BPSK signal, enabling the state of the transmission line following the temporal variation to be estimated.

It is to be noted that, in the configuration of the transmission signal frame of the present second embodiment, a BPSK signal is used as the known BPSK signal. On the other hand, a plurality of two point-symmetric points of a QPSK signal (e.g., $(1+j)/\sqrt{2}$ and $(-1-j)/\sqrt{2}$) may be arranged and used as the known BPSK signal sequence. Alternatively, a plurality of two point-symmetric points of a signal in multilevel modulation may be arranged and used as the known BPSK signal sequence.

Further, when the state of the optical fiber transmission line is estimated using the known BPSK signal sequence, a sequence length $T_p$ of the known BPSK signal is determined to be greater than or equal to a maximum delay difference of the state of the transmission line given in the following equation 18.

[Equation 18]

$$T_p \geq \frac{|D_{max}|B\lambda^2}{c} + T_{pmd} \quad \text{(Equation 18)}$$

In Equation 18, B denotes a bandwidth occupied by the transmission signal, $D_{max}$ denotes a maximum value of a chromatic dispersion amount to be compensated for, $T_{pmd}$ denotes a maximum value of polarization mode dispersion to be compensated for, λ denotes a center wavelength, and c denotes the speed of light. For example, when the state of the transmission line of a symbol rate at 28 Gbaud, a maximum value $D_{max}$ of the chromatic dispersion amount=20000 ps/nm, center wavelength λ=1550 nm, and maximum value $T_{pmd}$ of the polarization mode dispersion=50 ps is estimated, it can be seen that the sequence length $T_p$ of the known BPSK signal is set to 4.534 ns or more. Accordingly, a sequence formed by known BPSK signals of 127 or more symbols is necessary. Further, when only the chromatic dispersion and the polarization mode dispersion are to be estimated, the sequence lengths $T_p$ of the known BPSK signal are 4.485 ns and 50 ps, respectively, and thus known BPSK signals of at least 126 symbols and 2 or more symbols are inserted, respectively.

Third Embodiment

Figure 27:
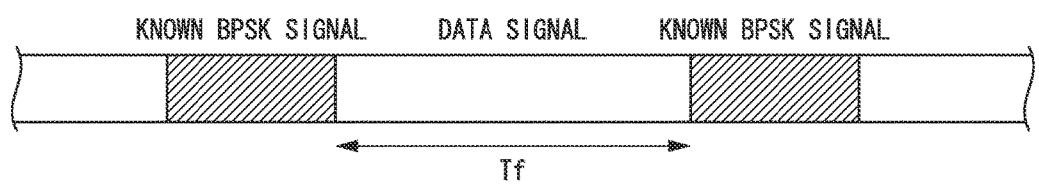
FIG. 27 is a diagram showing the schematic configuration of a transmission signal frame in accordance with a third embodiment of the present invention.

Hereinafter, a third embodiment of the present invention will be described with reference to the drawings. FIG. 27 is a diagram showing the schematic configuration of a transmission signal frame in accordance with the present third embodiment. As in the transmission signal frame shown in FIG. 27, the signal synthesizing circuit 102 periodically inserts a known BPSK signal at intervals of a period Tf. This period Tf is set, for example, to a length of 1/K (K is a positive number) of the length of an OTN (optical transport network) frame, as disclosed in "OTN Standardization Trend" in the following Reference Document 4, or a length of 1/K of a block length for error correction encoding. Accordingly, independent signal processing for each frame can be realized.

[Reference Document 4] Takuya Ohara, Osamu Ishida, "Global Standard Front-Line OTN Standardization Trend", NTT Technical Journal, January 2009, pp. 71-74.

Moreover, when the configuration of the transmission signal frame of the present third embodiment is used, tracking of the temporal variation in the state of the transmission line is better than the configuration of the transmission signal frame of the second embodiment shown in FIG. 26 because the signal synthesizing circuit 102 periodically inserts the known BPSK signal. Further, the use of a plurality of known BPSK signals periodically inserted, for example, using a forgetting factor improves the estimation accuracy for the state of the transmission line.

Further, for the known BPSK signal, a known BPSK signal sequence length that is greater than or equal to the maximum delay difference of the state of the transmission line to be estimated, as given in Equation 18, is necessary.

Additionally, when the configuration of the transmission signal frame of the present third embodiment is used, it is possible to monitor and detect a phase jump resulting from rapid temporal variation caused by, for example, non-linear effects specific to optical fiber transmission because the signal synthesizing circuit 102 periodically inserts the known BPSK signals.

Fourth Embodiment

Figure 28:
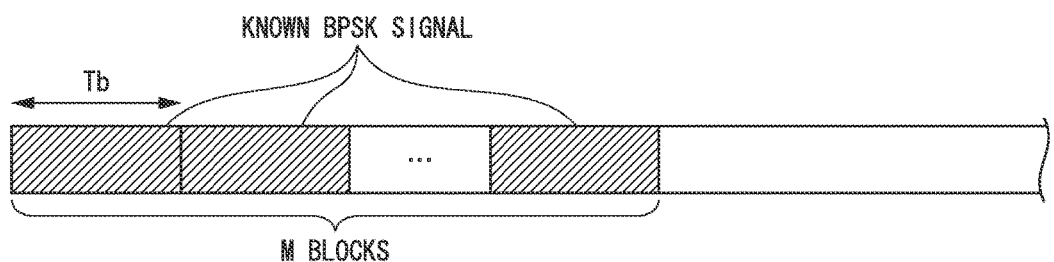
FIG. 28 is a diagram showing the schematic configuration of a transmission signal frame in accordance with a fourth embodiment of the present invention.

Hereinafter, a fourth embodiment of the present invention will be described with reference to the drawings. FIG. 28 is a diagram showing the schematic configuration of a transmission signal frame in accordance with the present fourth embodiment. As in the transmission signal frame shown in FIG. 28, the signal synthesizing circuit 102 continuously and iteratively inserts M known BPSK signal sequences having a block length of a time Tb. Such iterative insertion of the M known BPSK signal sequences enables the state of the transmission line to be estimated using a maximum of M same known BPSK signals and the results obtained by the estimation to be averaged. This enables interference, noise, or the like to be reduced and improves the estimation accuracy for the transmission line. Further, when the time Tb is set to a value that is greater than a maximum delay difference of an impulse response of the state of the transmission line given in above Equation 18, an immediately before frame serves as a guard interval. Accordingly, the periodicity of the signal is maintained, and thus information on the transmission line in the frequency domain can be estimated, for example, using a discrete Fourier transform (DFT) or a fast Fourier transform (FFT). Further, block calculation can be realized by setting the time Tb in this case to be equal to the block length of a DFT or an FFT.

Fifth Embodiment

Figure 29:
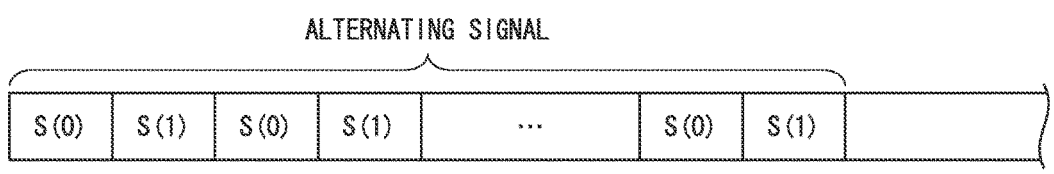
FIG. 29 is a diagram showing the schematic configuration of a transmission signal frame in accordance with a fifth embodiment of the present invention.

Hereinafter, a fifth embodiment of the present invention will be described with reference to the drawings. FIG. 29 is a diagram showing the schematic configuration of a transmission signal frame in accordance with the present fifth embodiment. The transmission signal frame shown in FIG. 29 shows an example of generating an alternating signal as the known BPSK signal sequence, in which two modulated signals (S(0) and S(1)) are alternately transmitted as known BPSK signals to generate the alternating signal.

Figure 30:
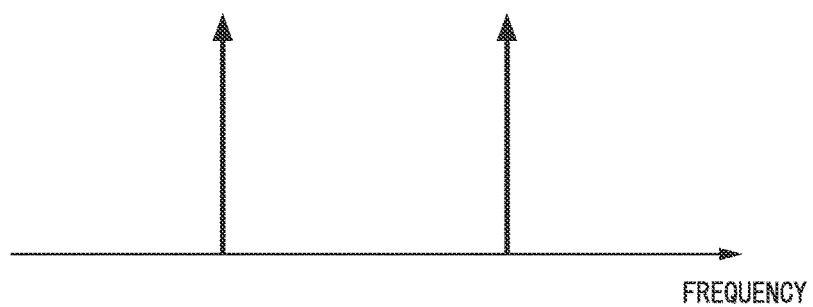
FIG. 30 is a diagram schematically showing the frequency spectrum of an alternating signal in accordance with the fifth embodiment of the present invention.

Moreover, FIG. 30 is a diagram schematically showing the frequency spectrum of the alternating signal. By transmitting the transmission signal frame shown in FIG. 29, two carriers appear in a frequency domain as shown in FIG. 30.

Using the two carriers, for example, the following operations can be performed.

(1) Estimation of a frequency offset by measuring a frequency difference (offset) between the received alternating signal and the transmitted alternating signal.

(2) Timing detection by calculating a cross-correlation between the received alternating signal and the transmitted alternating signal.

(3) Extraction of a clock by measuring zero-crossing points of the received alternating signal.

(4) Estimation of a chromatic dispersion amount in a transmission line by measuring an arrival time difference between the two carriers.

Further, in the configuration of the transmission signal frame in the present fifth embodiment described above, the alternating signal is generated as S(0), S(1), S(0), S(1) . . . . On the other hand, the transmission signal frame may be configured by alternately transmitting a plurality of same types of signals continuously, such as S(0), S(0), S(1), S(1), S(0), S(0), S(1), S(1) . . . or, S(0), S(0), S(0), S(0), S(1), S(1), S(1), S(1), S(0), S(0), S(0), S(0), S(1), S(1), S(1), S(1) . . . . Moreover, in this case, since two or more carriers appear, the above-described operations may be performed using the two or more appearing carriers.

Additionally, in the configuration of the transmission signal frame of the third embodiment shown in FIG. 27, an alternating signal may be used as the known BPSK signal. In this case, the same alternating signal may be used in all sequences. Further, different alternating signals may be alternately transmitted.

Further, since power is concentrated on a specific frequency in the alternating signal, a problem such as non-linear effects in optical fiber transmission may be generated. In order to resolve the problem such as the non-linear effects, the power of the specific frequency band can be dispersed to other frequency bands, for example, by mixing a repetition signal of −1, 1, −1, 1, −1, 1, . . . , −1, 1 with 1, −1, 1, −1, which is in the inverse order of this repetition signal.

Sixth Embodiment

Figure 31:
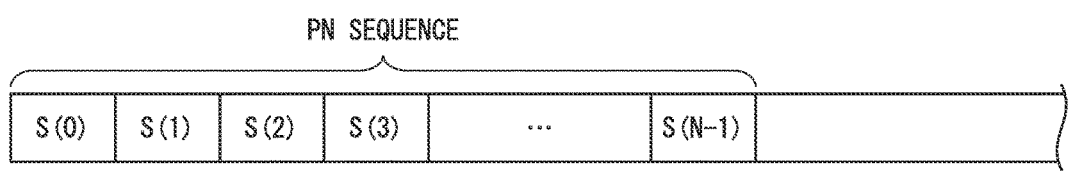
FIG. 31 is a diagram showing the schematic configuration of a transmission signal frame in accordance with a sixth embodiment of the present invention.

Hereinafter, a sixth embodiment of the present invention will be described with reference to the drawings. FIG. 31 is a diagram showing the schematic configuration of a transmission signal frame in accordance with the present sixth embodiment. The transmission signal frame shown in FIG. 31 shows an example of using a PN sequence as the known BPSK signal, in which a pseudo noise (PN) sequence of a sequence length N is subjected to BPSK modulation, and the obtained signal is transmitted as the known BPSK signal.

Such use of the PN sequence as the known BPSK signal provides, for example, the following advantages.

(1) Since an auto correlation of the PN sequence is high, the timing detection accuracy is improved.

(2) Since a variation in a level of the frequency spectrum of the PN sequence is less than those of other sequences, it is suitable for estimation of the state of the transmission line.

Further, in the configuration of the transmission signal frame of the present sixth embodiment, the length of the signal to which BPSK modulation is applied is set to a block length of a DFT or an FFT used in, for example, an equalizer, thereby improving the estimation accuracy for the state of the transmission line. Further, since the PN sequence in this case is configured by $2^K-1$ signals (K is an integer greater than or equal to 2), when the length of the PN sequence is less than the block length of the DFT or the FFT, "1"s or "0"s of the number corresponding to the insufficient length are added to the PN sequence, and thus the length of the signal can be set to the block length of the DFT or the FFT. For example, when 256 signals are to be generated, "1" or "0" is added to 255 ($=2^8-1$) signals, thereby generating a total of 256 signals, which are then subjected to the BPSK modulation.

Further, in the configuration of the transmission signal frame in the third embodiment shown in FIG. 27 and the configuration of the transmission signal frame in the fourth embodiment shown in FIG. 28, the PN sequence may be used as the known BPSK signal. In this case, all sequences may be the same PN sequence. Further, PN sequences generated by different generator polynomials may be alternately transmitted.

Further, a broad band can be obtained by spreading the frequency spectrum of the known BPSK signal using the PN signal as the alternating signal used in the configuration of the transmission signal frame in the fifth embodiment shown in FIG. 29.

Figure 32:
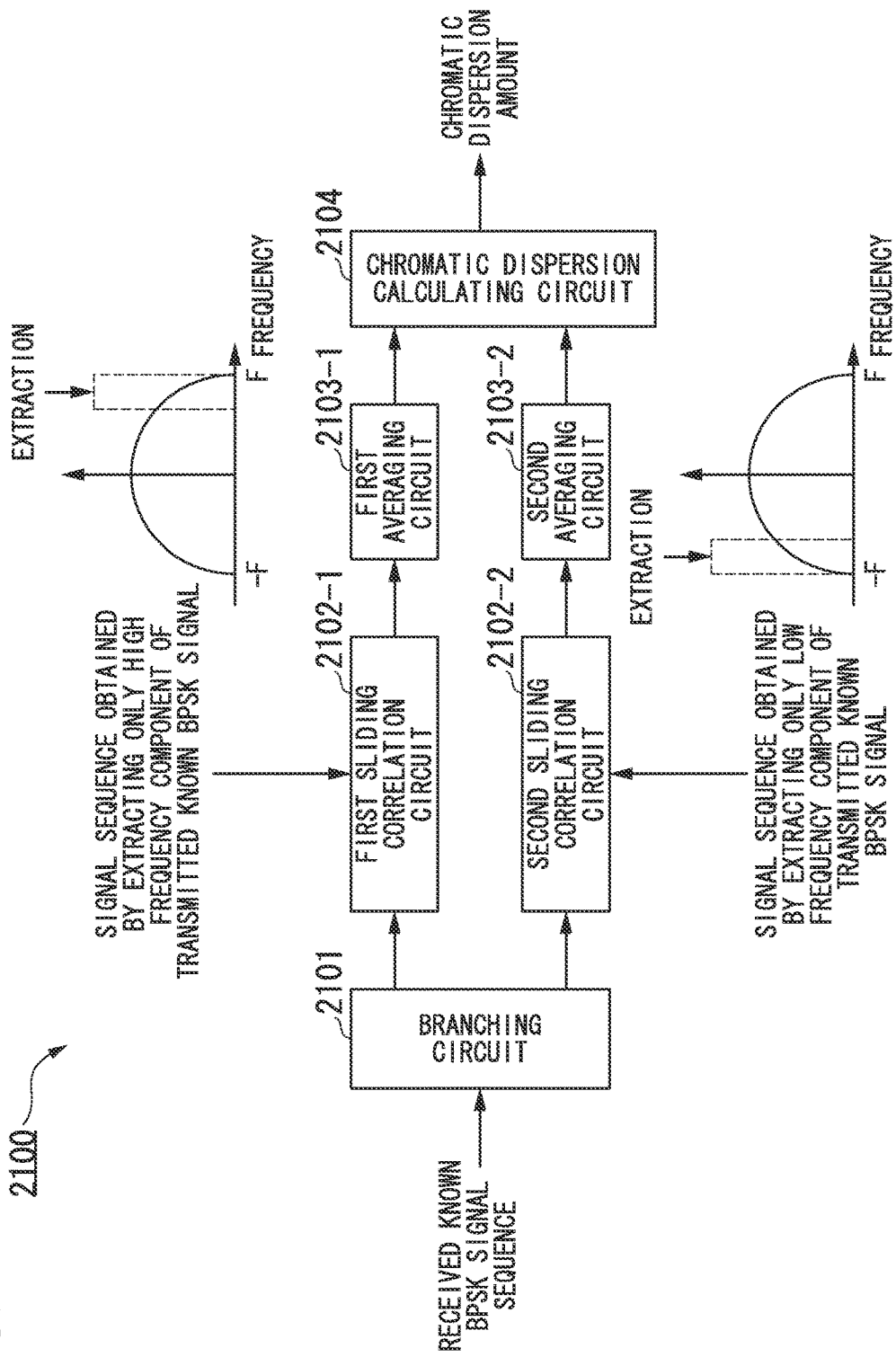
FIG. 32 is a block diagram showing the schematic configuration of a chromatic dispersion calculating circuit in an optical signal receiving apparatus (receiver) that estimates a chromatic dispersion amount using the configuration of a transmission signal frame in accordance with the sixth embodiment of the present invention.

Next, estimation for the chromatic dispersion when the transmission signal frame is received will be described. FIG. 32 is a block diagram showing the schematic configuration of a chromatic dispersion calculating circuit in a receiver for estimating chromatic dispersion, which is one element of the state of the transmission line, using the configuration of the transmission signal frame of the present sixth embodiment. In FIG. 32, a chromatic dispersion calculating circuit 2100 is configured by a branching circuit 2101, a first sliding correlation circuit 2102-1, a second sliding correlation circuit 2102-2, a first averaging circuit 2103-1, a second averaging circuit 2103-2, and a chromatic dispersion calculating circuit 2104.

The estimation for the chromatic dispersion by the chromatic dispersion calculating circuit in the receiver shown in FIG. 32 is performed as follows. First, a received known BPSK signal sequence is branched into two sequences by the branching circuit 2101, one branched known BPSK signal sequence is output to the first sliding correlation circuit 2102-1, and the other branched known BPSK signal sequence is output to the second sliding correlation circuit 2102-2.

Then, the first sliding correlation circuit 2102-1 calculates a cross-correlation between the received known BPSK signal sequence and a signal sequence obtained by extracting only a high frequency component of the known BPSK signal used for transmission, and obtains a time of a peak. Further, similar to the first sliding correlation circuit 2102-1, the second sliding correlation circuit 2102-2 calculates a cross-correlation between the received known BPSK signal sequence and a signal sequence obtained by extracting only a low frequency component of the known BPSK signal used for transmission, and obtains a time of a peak. Here, frequency components indicated by −F to 0, in fact, appear at folded back positions as F to 2F, but a negative representation is used for simplifying the description.

Thereafter, when a known BPSK signal in which a plurality of blocks are repeated is transmitted as in the configuration of the transmission signal frame of the fourth embodiment shown in FIG. 28, the results of the cross-correlation calculated by the first sliding correlation circuit 2102-1 and the second sliding correlation circuit 2102-2 are input to the first averaging circuit 2103-1 and the second averaging circuit 2103-2, respectively. The results of the cross-correlation are then averaged for each block by the first averaging circuit 2103-1 and the second averaging circuit 2103-2, thereby reducing noise and interference signals.

Then, the respective cross-correlation results in which the noise and the interference signals have been reduced by the first averaging circuit 2103-1 and the second averaging circuit 2103-2 are input as input values of the chromatic dispersion calculating circuit 2104. The chromatic dispersion calculating circuit 2104 then calculates a delay time difference $T_{cd}$ based on a time difference between peaks of the respective input cross-correlation results.

Figure 33:
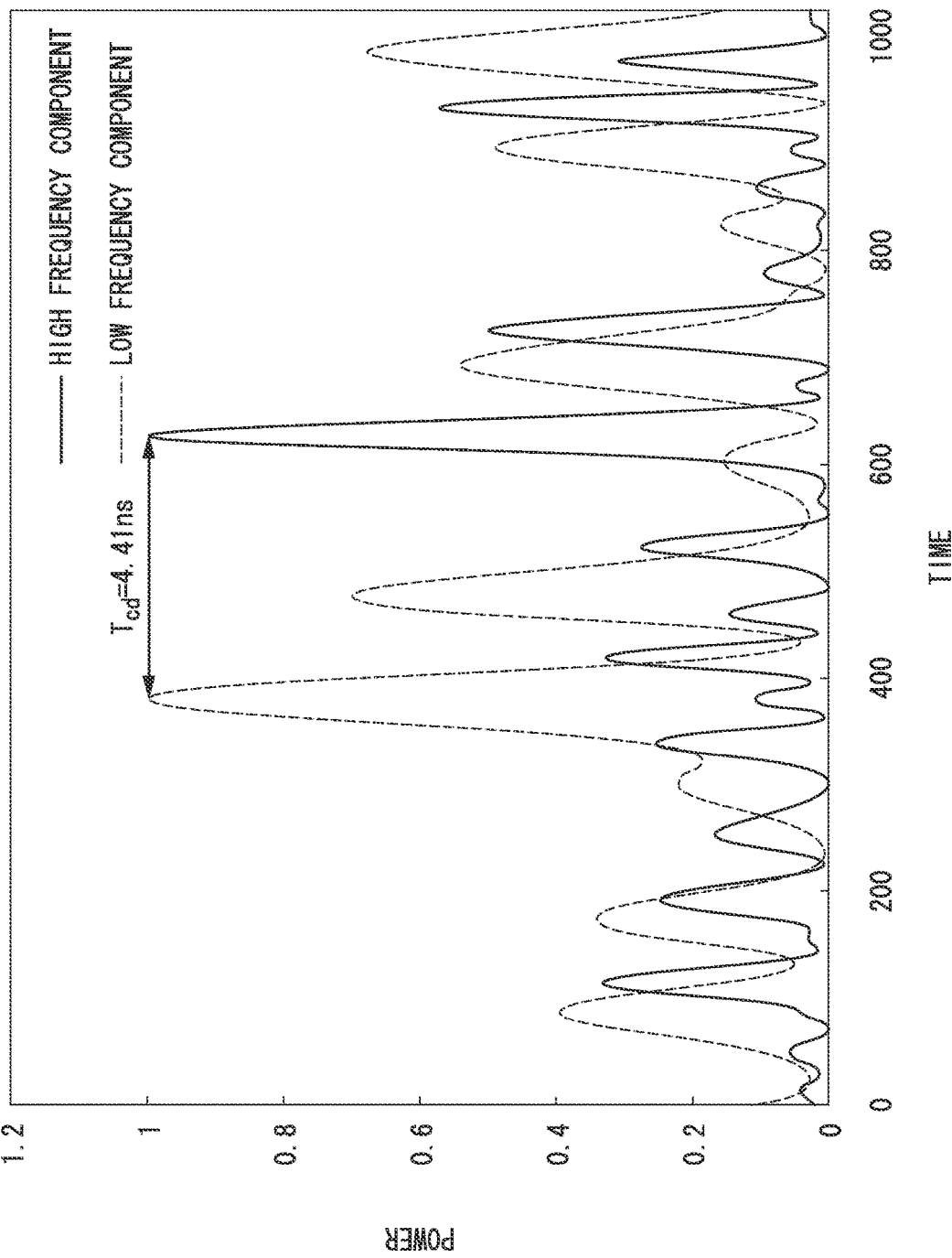
FIG. 33 is a diagram showing an output result of a first sliding correlation circuit which is provided in a chromatic dispersion calculating circuit and to which a high frequency component is input and an output result of a second sliding correlation circuit which is provided in the chromatic dispersion calculating circuit and to which a low frequency component is input, when the configuration of the transmission signal frame in accordance with the sixth embodiment of the present invention is used.

Next, a specific example of estimating chromatic dispersion from the received transmission signal frame will be described. FIG. 33 is a diagram showing an output result of the first sliding correlation circuit 2102-1, to which a high frequency component is input, and an output result of the second sliding correlation circuit 2102-2, to which a low frequency component is input, in the chromatic dispersion calculating circuit 2100 of the receiver shown in FIG. 32. The example shown in FIG. 33 shows the results of calculating cross-correlations with a high frequency component and with a low frequency component of the known BPSK signal used for transmission with respect to the known BPSK signal received when extracted signal band width B=28 GHz, chromatic dispersion amount D=20000 ps/nm, and center wavelength λ=1550 nm. From the results shown in FIG. 33, the delay time difference $T_{cd}$ between the peak values is calculated to be 4.41 ns. A chromatic dispersion amount D is calculated from the calculated result of the delay time difference $T_{cd}$ between the peak values. This calculation equation is given by the following equation 19.

[Equation 19]

$$D = \frac{T_{cd}c}{B\lambda^2} \qquad \text{(Equation 19)}$$

In Equation 19, c denotes the speed of light. It can be seen that D=19670 ps/nm is obtained by applying the result obtained from FIG. 33 to this Equation 19, and the chromatic dispersion amount can be accurately estimated.

Moreover, the above description uses a rectangular window function when the high frequency component and the low frequency component are extracted from the known BPSK signal used for transmission. On the other hand, unnecessary signal components can be suppressed by using a generally used band pass filter such as a Hamming window and a Kaiser window, and thus chromatic dispersion can be estimated with high accuracy.

Further, even for the received known BPSK signal sequence, the generally used band pass filter such as the Hamming window and the Kaiser window may be arranged directly before the branching circuit 2101 to suppress unnecessary signal components, thereby the chromatic dispersion can be estimated with high accuracy.

The configuration of the transmission signal frame of the second embodiment to the configuration of the transmission signal frame of the sixth embodiment as described above may be used in combination.

Seventh Embodiment

Figure 34:
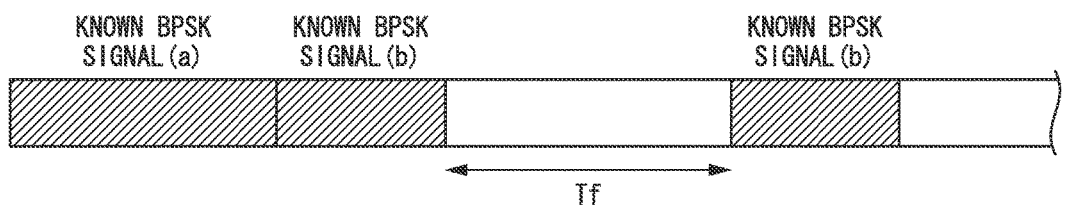
FIG. 34 is a diagram showing the schematic configuration of a transmission signal frame in accordance with a seventh embodiment of the present invention.

Hereinafter, a seventh embodiment of the present invention will be described with reference to the drawings. FIG. 34 is a diagram showing the schematic configuration of a transmission signal frame in accordance with the present seventh embodiment. The transmission signal frame shown in FIG. 34 is an exemplary combination of the configuration of the transmission signal frame of the second embodiment shown in FIG. 26 and the configuration of the transmission signal frame of the third embodiment shown in FIG. 27.

By using the configuration of the transmission signal frame in the seventh embodiment shown in FIG. 34, estimation and detection of parameters with a relatively small temporal variation (or no temporal variation), such as timing detection, frequency offset estimation, estimation of a state of a transmission line, and clock extraction, are performed using the known BPSK signal sequence (a) inserted into a front portion, i.e., the configuration of the transmission signal frame of the second embodiment shown in FIG. 26. Further, parameters with a relatively great temporal variation, such as polarization mode dispersion and phase offset, can be estimated using the known BPSK signal (b) that is periodically inserted and transmitted, i.e., the configuration of the transmission signal frame of the third embodiment shown in FIG. 27.

Figure 35:
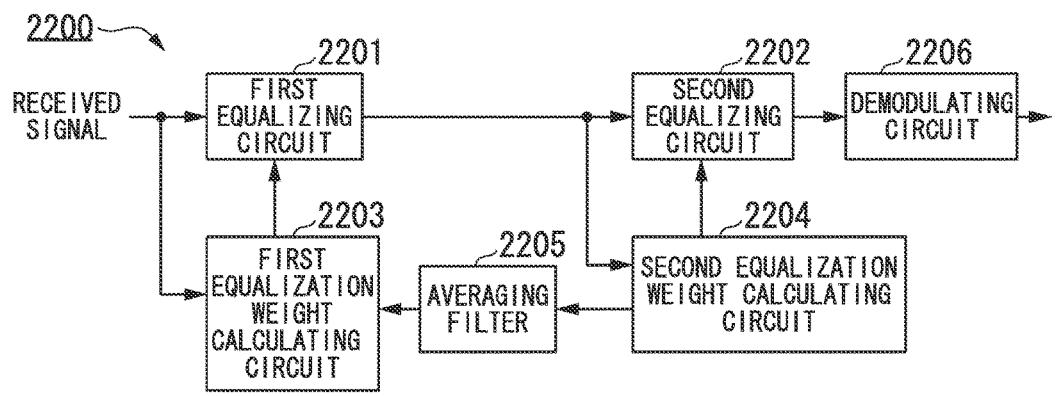
FIG. 35 is a block diagram showing an example of the schematic configuration of a digital signal processing unit in a receiver when the configuration of a transmission signal frame of the seventh embodiment of the present invention is used.

Next, a specific example of a receiver for receiving a transmission signal frame having the configuration of the transmission signal frame of the present seventh embodiment will be described. FIG. 35 is a block diagram showing an example of the schematic configuration of a digital signal processing unit in the receiver when the configuration of the transmission signal frame of the present seventh embodiment is used. In FIG. 35, a digital signal processing unit 2200 is configured by a first equalizing circuit 2201, a second equalizing circuit 2202, a first equalization weight calculating circuit 2203, a second equalization weight calculating circuit 2204, an averaging filter 2205, and a demodulating circuit 2206.

The first equalization weight calculating circuit 2203 estimates an initial state of a transmission line and calculates an equalization weight using the known BPSK signal sequence (a) in the configuration of the transmission signal frame of the present seventh embodiment shown in FIG. 34. The first equalization weight calculating circuit 2203 then outputs the result of the calculated equalization weight to the first equalizing circuit 2201, and the first equalizing circuit 2201 compensates for signal distortion.

Thereafter, for temporally varying factors in the state of the transmission line such as the polarization mode dispersion and the frequency offset, the second equalization weight calculating circuit 2204 estimates a difference between variations from an initial value of the state of the transmission line and calculates an equalization weight using a periodically inserted known BPSK signal sequence (b) in the configuration of the transmission signal frame of the present seventh embodiment shown in FIG. 34. Further, the second equalization weight calculating circuit 2204 periodically updates the equalization weight. Moreover, the second equalizing circuit 2202 performs equalization and compensation on a data signal output from the first equalizing circuit 2201. The demodulating circuit 2206 performs demodulation on the signal subjected to the equalization and the compensation.

Here, for example, when the state of the transmission line of a symbol rate of 28 Gbaud, a chromatic dispersion amount D=20000 ps/nm, a center wavelength λ=1550 nm, and polarization mode dispersion $T_{pmd}$=50 ps is estimated, the known BPSK signal length shown in Equation 18 may be used. Accordingly, the length of the known BPSK signal (a) is set to 4.534 ns or more and the length of the known BPSK signal (b) is set to 50 ps or more. Therefore, a long known BPSK signal (a) is inserted first and then a known BPSK signal (b) having a short sequence length is periodically inserted, resulting in a sequence length sufficient for estimation of the state of the transmission line at the receiver side. Accordingly, it is possible to suppress degradation of the transmission efficiency caused by the insertion of the known BPSK signals.

It is to be noted that compensation for a change in the state of the transmission line in a long time due to a temperature change or the like, rather than a change in the state of the transmission line in a short time, is performed as follows. That is, the equalization weight calculation result in the second equalization weight calculating circuit 2204 is input as an input value of the averaging filter 2205. The equalization weight calculation result averaged by the averaging filter 2205 is then output to the first equalization weight calculating circuit 2203. The original equalization weight value calculated by the first equalization weight calculating circuit 2203 is then updated based on the averaged equalization weight calculation result input from the averaging filter 2205. Thus, the change in the state of the transmission line in a long time can be compensated for.

Here, the averaging filter 2205 can perform averaging using a conventional averaging filter by, for example, obtaining an average value of the equalization weights calculated using past W known BPSK signal sequences (b) (W is an integer greater than or equal to 2) or averaging the equalization weights using a forgetting factor.

In accordance with the above-described configuration, the first equalization weight calculating circuit 2203 needs to estimate an impulse response with a longer delay time than that of the second equalization weight calculating circuit 2204, and accordingly requires a great amount of calculation. However, the first equalization weight calculating circuit 2203 almost need not update the equalization weight after calculating the equalization weight with the known BPSK signal (a). This can reduce the entire calculation process of compensating for the change in the state of the transmission line.

Eighth Embodiment

Figure 36:
FIG. 36 is a diagram showing the schematic configuration of a transmission signal frame in accordance with an eighth embodiment of the present invention.

Hereinafter, an eighth embodiment of the present invention will be described with reference to the drawings. FIG. 36 is a diagram showing the schematic configuration of a transmission signal frame in accordance with the present eighth embodiment. In accordance with the transmission signal frame shown in FIG. 36, in an initial mode, a transmitter does not transmit a data signal, and transmits only a known BPSK signal.

That is, in the initial mode, the transmitter transmits only the known BPSK signal, and the receiver measures various parameters (e.g., a state of a transmission line, the instability of an optical carrier, timing synchronization, and non-linear effects) in optical fiber transmission. Then, after the measurement of the various parameters in the optical fiber transmission is conducted for a sufficient time, the mode is switched from the initial mode to a data transmission mode, and the transmitter switches the transmission signal from the known BPSK signal to the data signal and transmits the data signal to the receiver.

As described above, in accordance with the configuration of the transmission signal frame of the present eighth embodiment, the transmitter transmits the known BPSK signal for a sufficient time, the receiver measures the various parameters in the optical fiber transmission, and the transmitter then transmits the data signal. This enables the receiver to perform demodulation of the data signal from a front portion of the data signal with a high transmission property.

It is to be noted that the known BPSK signal sequences used in the configuration of the transmission signal frame of the second embodiment to the configuration of the transmission signal frame of the sixth embodiment described above are used as signal sequences in the initial mode.

The configuration of the transmission signal frame of the second embodiment to the configuration of the transmission signal frame of the eighth embodiment described above may be used in combination.

Ninth Embodiment

Figure 37:
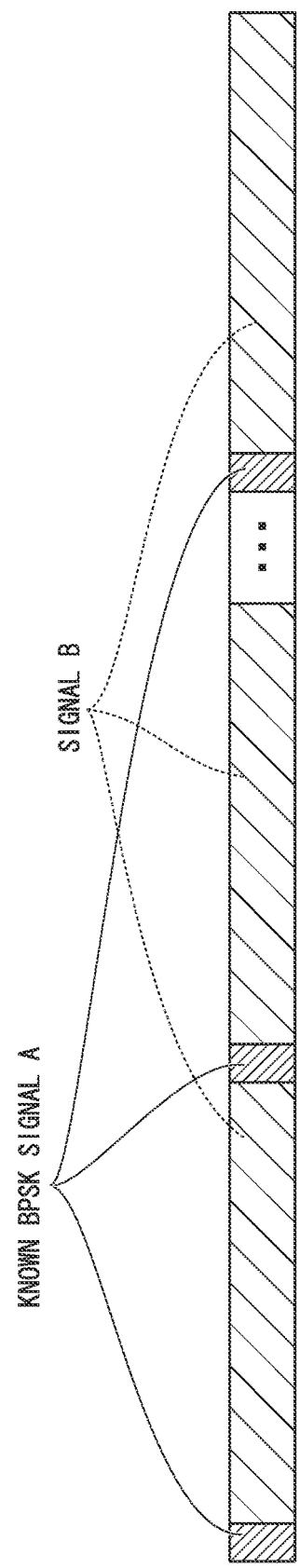
FIG. 37 is a diagram showing the schematic configuration of a transmission signal frame in accordance with a ninth embodiment of the present invention.

Hereinafter, a ninth embodiment of the present invention will be described with reference to the drawings. FIG. 37 is a diagram showing the schematic configuration of a transmission signal frame in accordance with the present ninth embodiment. The transmission signal frame shown in FIG. 37 is configured by a signal A and a signal B. The signal A is a signal sequence formed by an alternating signal or any known BPSK signal. For example, a PN sequence may be used as the signal A. The signal B is configured by a known BPSK signal or an arbitrary unknown data signal.

With the configuration of the transmission signal frame of the ninth embodiment shown in FIG. 37, a receiver can perform timing detection, sampling clock estimation, frequency offset estimation, and chromatic dispersion estimation using the known BPSK signal A. The receiver can also perform timing synchronization, frequency offset estimation, residual chromatic dispersion estimation, and equalization weight calculation using the signal B with high accuracy.

Here, the known BPSK signal A of FIG. 37 should be an alternating signal or any BPSK signal, and it may be a PN sequence or a plurality of times of repetitions of a certain BPSK signal sequence.

Figure 38:
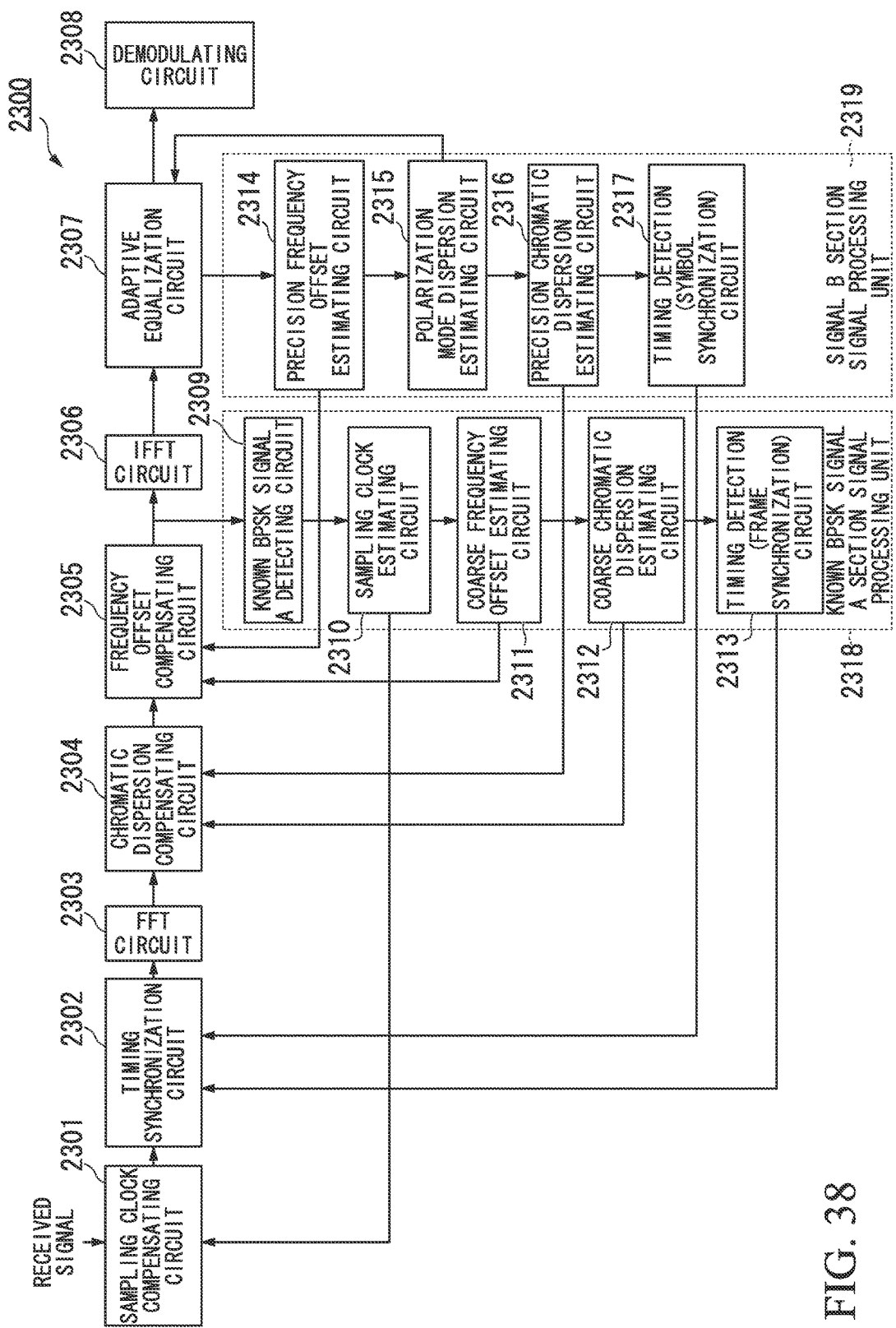
FIG. 38 is a block diagram showing an example of the schematic configuration of a receiver when the configuration of a transmission signal frame of the ninth embodiment of the present invention is used.

Next, a specific example of a receiver for receiving a transmission signal frame having the configuration of the transmission signal frame of the present ninth embodiment will be described. FIG. 38 is a block diagram showing an example of the schematic configuration of the receiver when the configuration of the transmission signal frame of the present ninth embodiment is used. In FIG. 38, a receiver 2300 is configured by a sampling clock compensating circuit 2301, a timing synchronization circuit 2302, an FFT circuit 2303, a chromatic dispersion compensating circuit 2304, a frequency offset compensating circuit 2305, an IFFT circuit 2306, an adaptive equalization circuit 2307, a demodulating circuit 2308, a known BPSK signal A section signal processing unit 2318, and a signal B section signal processing unit 2319. Further, the known BPSK signal A section signal processing unit 2318 is configured by a known BPSK signal A detecting circuit 2309, a sampling clock estimating circuit 2310, a coarse frequency offset estimating circuit 2311, a coarse chromatic dispersion estimating circuit 2312, and a timing detection (frame synchronization) circuit 2313. Further, the signal B section signal processing unit 2319 is configured by a precision frequency offset estimating circuit 2314, a polarization mode dispersion estimating circuit 2315, a precision chromatic dispersion estimating circuit 2316, and a timing detection (symbol synchronization) circuit 2317.

When the signal A is an alternating signal, the timing detection (frame synchronization) circuit 2313 can detect a point at which a peak value disappears using the fact that that a peak appears at a specific frequency point of the alternating signal and perform timing detection using its portion as a border (boundary) with a section of the signal B. On the other hand, when the signal A is any known BPSK signal, the timing detection (frame synchronization) circuit 2313 can perform timing detection using a cross-correlation with any known BPSK signal. The timing detection (frame synchronization) circuit 2313 then outputs the result of the timing detection to the timing synchronization circuit 2302.

As will be described below in detail, the known BPSK signal A section signal processing unit 2318 outputs estimated or detected results to the sampling clock compensating circuit 2301, the timing synchronization circuit 2302, the chromatic dispersion compensating circuit 2304, and the frequency offset compensating circuit 2305. Based on the output values, the sampling clock compensating circuit 2301, the timing synchronization circuit 2302, the chromatic dispersion compensating circuit 2304, and the frequency offset compensating circuit 2305 respectively perform sampling clock compensation, timing synchronization, chromatic dispersion compensation, and frequency offset compensation on a received signal.

First, the known BPSK signal A section signal processing unit 2318 will be described. In the known BPSK signal A section signal processing unit 2318, the known BPSK signal A detecting circuit 2309 detects a section of the known BPSK signal A from the received signal. When the known BPSK signal A is an alternating signal, the frequency spectrum is characteristic as shown in FIG. 30, and thus the section of the alternating signal can be detected, for example, when a specific frequency component in which a peak appears due to the alternating signal exceeds a certain threshold value.

Subsequently, the sampling clock estimating circuit 2310 estimates an offset of a sampling clock of the receiver using the received alternating signal, and outputs the estimated result to the sampling clock compensating circuit 2301. When the known BPSK signal A is an alternating signal, the sampling clock estimating circuit 2310 can estimate the offset of the sampling clock of the receiver from a signal distribution in the frequency domain. On the other hand, when the known BPSK signal A is any BPSK signal, the sampling clock estimating circuit 2310 estimates a residual clock offset from a timing offset or a phase offset of the received signal in the section of the known BPSK signal A received at constant intervals.

Subsequently, the coarse frequency offset estimating circuit 2311 performs coarse estimation of a frequency offset in the receiver using an offset between the spectrum of the received known BPSK signal A and the spectrum of a known BPSK signal A used for transmission, estimates the frequency offset using a repetition property of any BPSK signal, and outputs the estimated result to the frequency offset compensating circuit 2305.

Subsequently, the coarse chromatic dispersion estimating circuit 2312 estimates a chromatic dispersion amount using the received known BPSK signal A. Here, when the known BPSK signal A is an alternating signal, the coarse chromatic dispersion estimating circuit 2312 coarsely estimates the chromatic dispersion amount using an arrival time difference between the spectra of the received alternating signal. On the other hand, when the known BPSK signal A is any BPSK signal, the coarse chromatic dispersion estimating circuit 2312 coarsely estimates the chromatic dispersion amount using an arrival time difference between a signal at a high frequency side and a signal at a low frequency side using a property that the signal in a frequency domain have a complex conjugate relationship that uses a center frequency as a center point. The coarse chromatic dispersion estimating circuit 2312 then outputs the estimated result to the chromatic dispersion compensating circuit 2304.

Subsequently, the timing detection (frame synchronization) circuit 2313 detects a point at which a peak value disappears using the fact that a peak appears at a specific frequency point of the alternating signal when the known BPSK signal A is an alternating signal, and uses this point as a border with the section of the signal B. Accordingly, the timing can be detected using a portion in which the peak value disappears as a boundary. On the other hand, when the known BPSK signal A is any known BPSK signal, the timing detection (frame synchronization) circuit 2313 can detect the timing using cross-correlation. The timing detection (frame synchronization) circuit 2313 then outputs the result of timing detection to the timing synchronization circuit 2302.

As described above, the known BPSK signal A section signal processing unit 2318 outputs the estimated results and the detected results to the sampling clock compensating circuit 2301, the timing synchronization circuit 2302, the chromatic dispersion compensating circuit 2304, and the frequency offset compensating circuit 2305. The sampling clock compensating circuit 2301, the timing synchronization circuit 2302, the chromatic dispersion compensating circuit 2304, and the frequency offset compensating circuit 2305 respectively perform sampling clock compensation, timing synchronization, chromatic dispersion compensation, and frequency offset compensation on the received signal based on the estimated result or the detected result input from the known BPSK signal A section signal processing unit 2318.

It is to be noted that the FFT circuit 2303 performs an FFT on a signal in the time domain output from the timing synchronization circuit 2302 to convert the signal into a signal in the frequency domain. Further, the IFFT circuit 2306 performs an IFFT on a signal in the frequency domain output from the frequency offset compensating circuit 2305 to convert the signal into a signal in the time domain.

Next, the signal B section signal processing unit 2319 will be described. In a section in which the signal B is received, the precision frequency offset estimating circuit 2314, the polarization mode dispersion estimating circuit 2315, the precision chromatic dispersion estimating circuit 2316, and the timing detection (symbol synchronization) circuit 2317 in the signal B section signal processing unit 2319 perform estimation or detection based on the received signal B. The signal B section signal processing unit 2319 then outputs the respective estimated result or the detected results to the timing synchronization circuit 2302, the chromatic dispersion compensating circuit 2304, the frequency offset compensating circuit 2305, and the adaptive equalization circuit 2307.

First, the precision frequency offset estimating circuit 2314 precisely estimates the frequency offset based on the output of the adaptive equalization circuit 2307 and outputs the estimated result to the frequency offset compensating circuit 2305.

Subsequently, the polarization mode dispersion estimating circuit 2315 estimates polarization mode dispersion based on the output of the precision frequency offset estimating circuit 2314, and outputs the estimated result to the adaptive equalization circuit 2307.

Subsequently, the precision chromatic dispersion estimating circuit 2316 precisely estimates the chromatic dispersion, based on the output of the polarization mode dispersion estimating circuit 2315 and outputs the estimated result to the chromatic dispersion compensating circuit 2304.

Subsequently, the timing detection (symbol synchronization) circuit 2317 performs timing detection of a symbol synchronization level based on the output of the precision chromatic dispersion estimating circuit 2316, and outputs the detected result to the timing synchronization circuit 2302.

It is to be noted that an equalization weight for decoding can be calculated with a blind algorithm using characteristics of the transmitted signal. The frequency offset, the effect of the polarization mode dispersion, the timing offset, and the effect of the residual chromatic dispersion are included in the calculated equalization weight and the signal sequence decoded with the equalization weight. For this reason, information thereon may be fed back to a corresponding estimating circuit (i.e., the coarse frequency offset estimating circuit 2311 and the precision frequency offset estimating circuit 2314 for the frequency offset, the polarization mode dispersion estimating circuit 2315 for the effect of the polarization mode dispersion, the timing detection (frame synchronization) circuit 2313 and the timing detection (symbol synchronization) circuit 2317 for the timing offset, and the coarse chromatic dispersion estimating circuit 2312 and the precision chromatic dispersion estimating circuit 2316 for the effect of the residual chromatic dispersion). In order to estimate the value of the residual chromatic dispersion, a convolutional coefficient for applying the effect of the chromatic dispersion and a convolutional coefficient for applying the inverse property of the chromatic dispersion are prepared, and convolution is performed on the equalization weight. When a temporal spread of the equalization weight coefficient convoluted by any one of the coefficients becomes small, it means that there is residual chromatic dispersion. If the temporal spread becomes small when the equalization weight is convoluted with the convolutional coefficient for applying the effect of the chromatic dispersion, it means that the chromatic dispersion compensation amount of a previous stage (i.e., the chromatic dispersion compensating circuit 2304) is insufficient. On the other hand, if the temporal spread becomes small when the equalization weight is convoluted with the convolutional coefficient for applying the coefficient of the inverse property of the chromatic dispersion, it means that the chromatic dispersion compensation amount of the previous stage is excessive. Accordingly, these results can be fed back to the foregoing estimating circuits. Alternatively, when the transmitted signal B is a known signal sequence, the estimation and the detection can be performed using a conventional method such as calculating a cross-correlation between the received signal B and the known signal sequence.

Next, the frequency offset compensating circuit 2305, the chromatic dispersion compensating circuit 2304, and the timing synchronization circuit 2302 sequentially update information maintained in these circuits for compensation or timing synchronization based on the estimated result or the detected result input from the known BPSK signal A section signal processing unit 2318 and the signal B section signal processing unit 2319, and perform the compensation and the timing synchronization on the received signal using the updated result.

Further, the adaptive equalization circuit 2307 uses the estimated result input from the polarization mode dispersion estimating circuit 2315 as an input value, and adaptively performs polarization mode dispersion compensation.

It is to be noted that the sampling clock compensating circuit 2301, the timing synchronization circuit 2302, the chromatic dispersion compensating circuit 2304, and the frequency offset compensating circuit 2305 operate using the results estimated or detected by using the known BPSK signal A or the signal B. Therefore, the sampling clock compensating circuit 2301, the timing synchronization circuit 2302, the chromatic dispersion compensating circuit 2304, and the frequency offset compensating circuit 2305 do not operate until the estimated result or the detected result is input from the known BPSK signal A section signal processing unit 2318 or the signal B section signal processing unit 2319, or they operate only using previously given initial values.

A known signal sequence and a data signal sequence may be switched using the above-described configuration and may be used as the signal B. By doing so, the same configuration can be used for a known signal section for synchronization and a data section by providing the demodulating circuit 2308 as shown in FIG. 38, thereby making it possible to realize a simplified configuration of the receiver.

Further, when the section is switched to the data section, the data signal may be inserted into the section of the known BPSK signal A.

Further, it is possible to improve an estimation speed for parameters such as the frequency offset, the polarization mode dispersion, and the timing detection by performing coarse estimation with the known BPSK signal A and precision estimation with the signal B.

It is to be noted that the known BPSK signal A preferably has a sequence length that is approximately twice the tap length or the number of FFT points necessary for the maximum chromatic dispersion amount to be compensated for.

Tenth Embodiment

Figure 39:
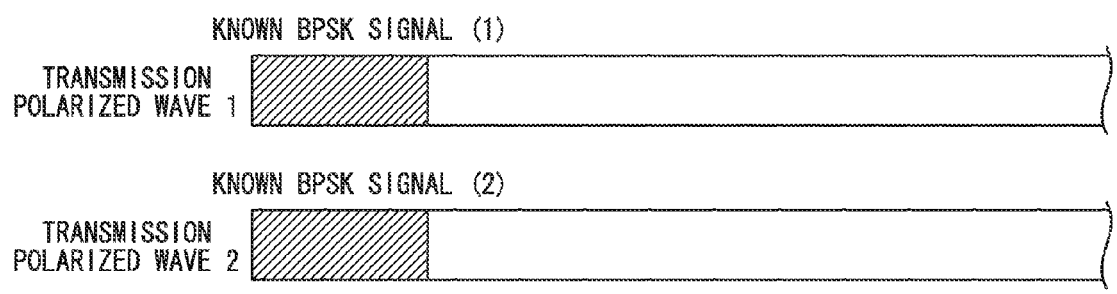
FIG. 39 is a diagram showing the schematic configuration of a transmission signal frame in accordance with a tenth embodiment of the present invention.

Hereinafter, a tenth embodiment of the present invention will be described with reference to the drawings. FIG. 39 is a diagram showing the schematic configuration of a transmission signal frame in accordance with the present tenth embodiment. When the transmission signal frame shown in FIG. 39 is used and when the signal is transmitted using a plurality of polarized waves, the signal synthesizing circuit 102 inserts known BPSK signals using different sequences for the polarized waves.

At the receiver side, a received signal r(n) (n is a natural number) can be expressed as shown in the following equation 20.

[Equation 20]

$$r(n) = \sum_{l=0}^{L-1} \begin{pmatrix} H_{XX}(l) & H_{XY}(l) \\ H_{YX}(l) & H_{YY}(l) \end{pmatrix} \begin{pmatrix} S_1(n-l) \\ S_2(n-l) \end{pmatrix}$$ (Equation 20)

In Equation 20, L denotes the number of discrete taps of the state of the transmission line, $S_1$ and $S_2$ denote the known BPSK signals in transmission polarized wave 1 and transmission polarized wave 2, $H_{XX}$, $H_{XY}$, $H_{YX}$, and $H_{YY}$ denote complex gains (coefficients) when the state of the transmission line is represented by the discrete taps.

At the receiver side, information on the transmission line is estimated from the received known BPSK signals, for example, using an LMS (least mean square) algorithm.

Thus, in accordance with the configuration of the transmission signal frame of the present tenth embodiment shown in FIG. 39, it is possible to resolve the problem (miscapturing) that only a transmission signal of one polarized wave can be demodulated in blind estimation as a result of the use of the different known BPSK signal sequences for the respective polarized waves.

Moreover, it is also possible to easily estimate the state of the transmission line by transmitting the known BPSK signal sequences so as to be orthogonal to each other for the polarized waves.

Figure 40:
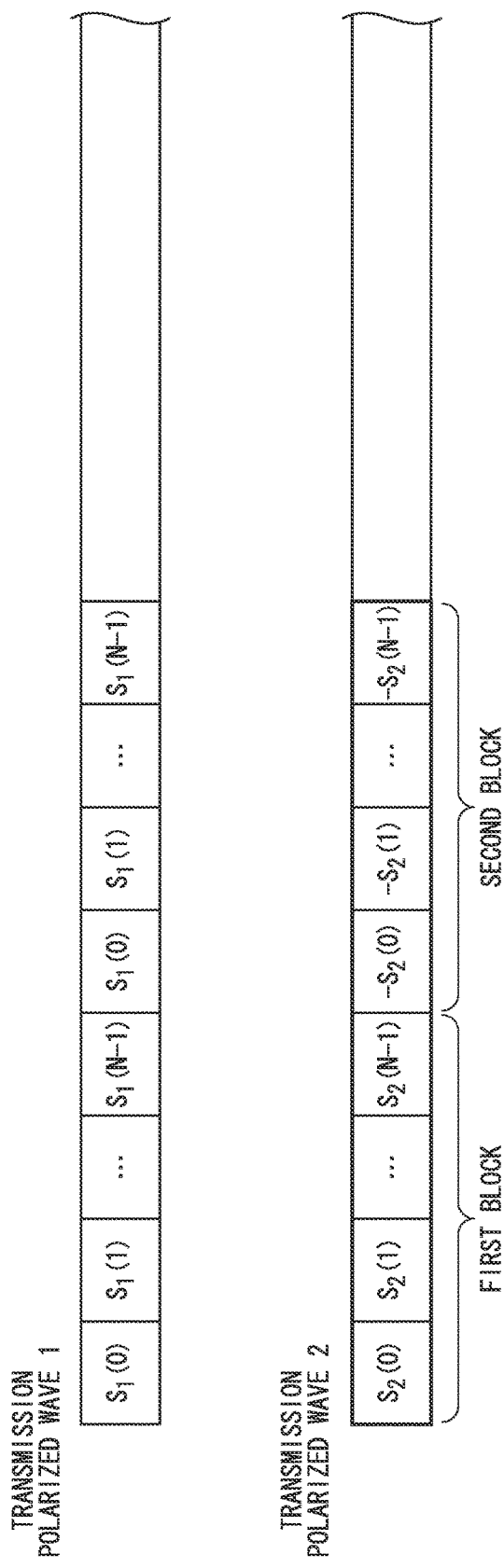
FIG. 40 is a diagram showing the schematic configuration of a transmission signal frame using known signals orthogonal to each other for polarized waves, which is an example of a transmission signal frame in accordance with the tenth embodiment of the present invention.

FIG. 40 is a diagram showing the configuration of frames when signal sequences orthogonal to each other for the polarized waves are used as known BPSK signals, which is an example of the configuration of the transmission signal frame of the present tenth embodiment.

In the first block, different sequences are transmitted for both polarized waves (transmission polarized wave 1 and transmission polarized wave 2), and, in the second block, a sequence obtained by inverting the sign of the sequence transmitted in the first block is transmitted only in one of the polarized waves (transmission polarized wave 2). The receiver side can estimate the state of the transmission line for a plurality of polarized waves by calculating the sum or the difference of signals having the same numbers (i.e., 0, 1, . . . , N−1) in the first block and the second block. In addition, for example, the following known orthogonal BPSK signals may be used.
   (1) When a known BPSK signal is transmitted using one polarized wave, a signal is not transmitted for the other polarized wave.
   (2) Orthogonal space-time code described in Reference Document 5 described below is used.
   (3) An Hadamard code disclosed in Reference Document 6 described below is used.
[Reference Document 5] S. M. Alamouti, "A Simple Transmit Diversity Technique for Wireless Communications," IEEE JOURNAL ON SELECT AREAS IN COMMUNICATIONS, VOL. 16, NO. 8, pp. 1451-1458, OCTOBER 1998.
[Reference Document 6] J. G. Proakis, "Digital communications," Fourth edition, McGraw-Hill, pp. 424-425, 2000.

Figure 41:
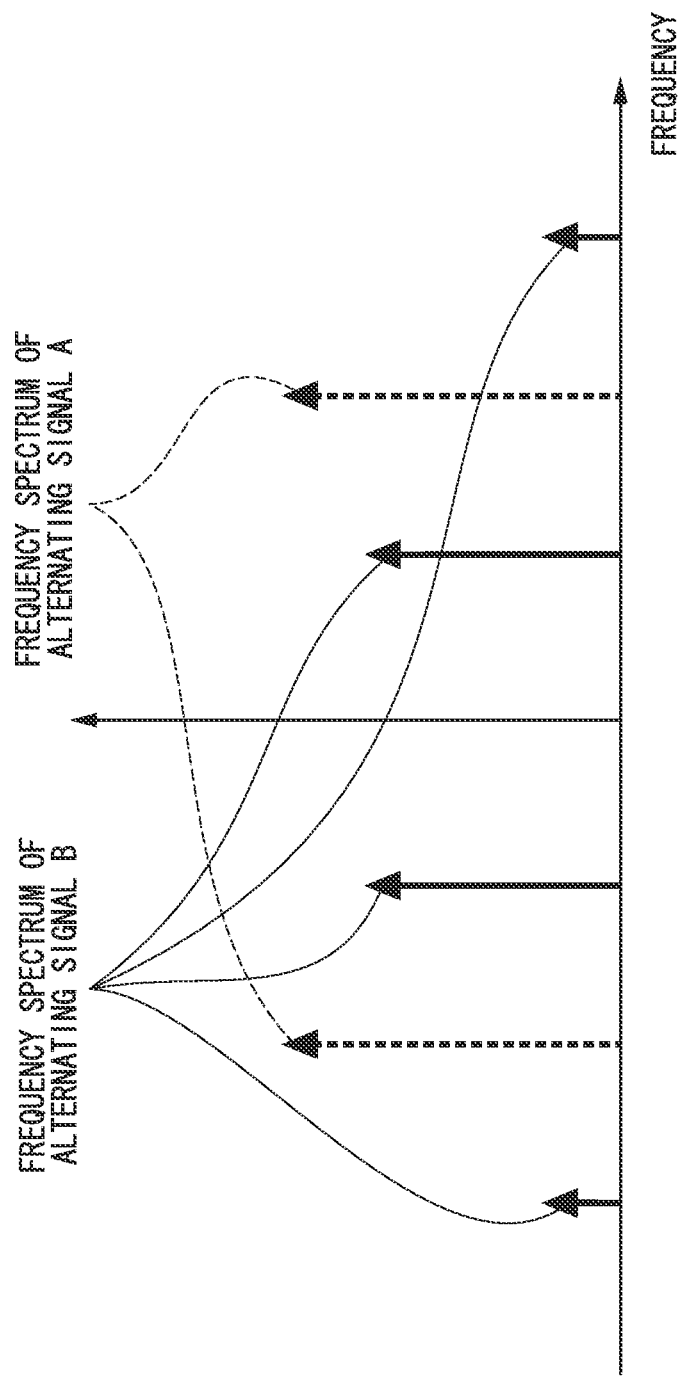
FIG. 41 is a diagram schematically showing the frequency spectrum of a received signal when two different alternating signals are polarization-division multiplexed in a case in which the configuration of a transmission signal frame in accordance with the tenth embodiment of the present invention is used.

Further, with an alternating signal having the configuration of the transmission signal frame in the fifth embodiment shown in FIG. 29, the miscapturing problem can be resolved by using different alternating signals for polarized waves. For example, when an alternating signal A (S(0), S(1), S(0), S(1), S(0), S(1), S(0), S(1), . . . ) and an alternating signal B (S(0), S(0), S(1), S(1), S(0), S(0), S(1), S(1), . . . ) are polarization-division multiplexed and transmitted as the known BPSK signal, the frequency spectrum of the received signal as shown in FIG. 41 is observed in the receiver. When the receiver compensates this received signal using a weight used for equalization, only the frequency spectrum of any one of the alternating signal A and the alternating signal B appears, so that a determination can be made as to which polarized wave signal is being demodulated.

A signal length of the above-described known BPSK signal may be variable in accordance with an observed error rate or the shape of a frequency spectrum, required communication quality, a Q value margin, a type of fiber, a propagation distance, a chromatic dispersion amount of a transmission line, a polarization mode dispersion amount, the number of multiplexing, and so on.

As described above, in accordance with the second to tenth embodiments of the present invention, it is possible to realize optical fiber communication with improved transmission quality by estimating the state of the transmission line and the instability specific to the optical transmitting apparatus using the time-division multiplexed known BPSK signal sequence in optical fiber transmission using a coherent detection scheme.

It is to be noted that the second to tenth embodiments of the present invention describe the examples using the configuration of the transmission signal frame in which the known BPSK signal sequence is inserted (time-division multiplexed) into a front portion. However, a case in which the known BPSK signal sequence is inserted (time-division multiplexed) into an end portion may be similarly used.

Further, the second to tenth embodiments of the present invention describe the examples using the configuration of the transmission signal frame in which the known BPSK signal and the data signal are transmitted with the same signal power. On the other hand, the known BPSK signal and the data signal may be transmitted with different signal powers, in which a transmission signal power of the known BPSK signal is a times ($\alpha$>0) the transmission signal power of the data signal.

For example, if $\alpha$>1, a signal-to-noise power ratio of the known BPSK signal is greater than a signal-to-noise power ratio of the data signal, thereby improving the estimation accuracy for various parameters. Further, if $\alpha$<1, a peak of a specific frequency spectrum can be suppressed when the alternating signal is transmitted.

Although respective embodiments of the present invention have been described with reference to the drawings, the specific configuration is not limited to the embodiments, and various modifications may be made to the present invention without departing from the gist of the present invention.

The above-described embodiments may be appropriately combined. For example, among the BPSK signal sequences described in the second to tenth embodiments, a BPSK signal sequence configured by an alternating signal is an example of the specific frequency band signal described in the first embodiment. Accordingly, the configurations using the BPSK signal sequence of the alternating signal in the second to tenth embodiments may be combined with the configuration of the first embodiment.

INDUSTRIAL APPLICABILITY

As described above, in accordance with the present invention, the signal position detection, the clock offset estimation, the frequency offset estimation, and the chromatic dispersion amount estimation can be performed using an optical signal transmitting apparatus that transmits a specific frequency band signal and an optical signal receiving apparatus that receives the specific frequency band signal. Further, synchronization between the optical signal transmitting apparatus and the optical signal receiving apparatus can be established with a known signal.

DESCRIPTION OF REFERENCE SYMBOLS

101 . . . specific frequency band signal generating circuit
102 . . . signal synthesizing circuit
103 . . . electro-optical conversion circuit
104 . . . transmission signal generating circuit
201 . . . specific frequency band signal generating circuit
202-1 to 202-L . . . signal synthesizing circuit
203 . . . electro-optical conversion/frequency-division multiplexing circuit
204 . . . transmission signal generating circuit
601, 801, 901, 1001 . . . photoelectric conversion circuit
602, 802 . . . analog/digital conversion circuit
603, 803, 903, 1003, 1008 . . . discrete Fourier transform circuit
604, 804, 904, 1004 . . . specific frequency band signal detecting circuit
605, 806, 906, 1006 . . . reception signal property estimating circuit
805, 905, 1005 . . . specific frequency band signal power storage circuit
902, 1002 . . . chromatic dispersion compensating circuit
1007 . . . signal storage circuit
2100 . . . chromatic dispersion calculating circuit
2101 . . . branching circuit
2102-1 . . . first sliding correlation circuit
2102-2 . . . second sliding correlation circuit
2103-1 . . . first averaging circuit
2103-2 . . . second averaging circuit 2104 . . . chromatic dispersion calculating circuit
2200 . . . digital signal processing unit
2201 . . . first equalizing circuit
2202 . . . second equalizing circuit
2203 . . . first equalization weight calculating circuit
2204 . . . second equalization weight calculating circuit
2205 . . . averaging filter
2206 . . . demodulating circuit
2300 . . . receiver
2301 . . . sampling clock compensating circuit
2302 . . . timing synchronization circuit
2303 . . . FFT circuit
2304 . . . chromatic dispersion compensating circuit
2305 . . . frequency offset compensating circuit
2306 . . . IFFT circuit
2307 . . . adaptive equalization circuit
2308 . . . demodulating circuit
2309 . . . known BPSK signal A detecting circuit
2310 . . . sampling clock estimating circuit
2311 . . . coarse frequency offset estimating circuit
2312 . . . coarse chromatic dispersion estimating circuit
2313 . . . timing detection (frame synchronization) circuit
2314 . . . precision frequency offset estimating circuit
2315 . . . polarization mode dispersion estimating circuit
2316 . . . precision chromatic dispersion estimating circuit
2317 . . . timing detection (symbol synchronization) circuit
2318 . . . known BPSK signal A section signal processing unit
2319 . . . signal B section signal processing unit

The invention claimed is:

1. A method for establishing optical signal synchronization, the method comprising:
an optical signal generation step of generating specific frequency band signals having power concentrated on two or more specific frequencies;
a digital signal acquisition step of receiving a signal including the specific frequency band signals generated in the optical signal generation step and converting the received signal into a digital signal;
a signal position detection step of detecting positions of the specific frequency band signals from the digital signal converted in the digital signal acquisition step;
a frequency offset detection step of estimating frequency positions of the specific frequency band signals detected in the signal position detection step and detecting a frequency offset between an optical signal receiving apparatus and an optical signal transmitting apparatus that perform optical communication;
a clock offset detection step of estimating the frequency positions of the specific frequency band signals detected in the signal position detection step, and detecting a clock offset between the optical signal receiving apparatus and the optical signal transmitting apparatus from an interval between the frequency positions; and
a chromatic dispersion amount detection step of estimating temporal positions of the specific frequency band signals detected in the signal position detection step, and detecting a chromatic dispersion amount from a difference between the temporal positions of the specific frequency band signals corresponding to different frequencies.

2. A method for establishing optical signal synchronization, the method comprising:
an optical signal generation step of generating specific frequency band signals having power concentrated on two or more specific frequencies;
a digital signal acquisition step of receiving a signal including the specific frequency band signals generated in the optical signal generation step and converting the received signal into a digital signal;
a chromatic dispersion compensation step of applying an inverse property of an estimated chromatic dispersion to the digital signal converted in the digital signal acquisition step;
a specific frequency band signal power value calculation step of performing a discrete Fourier transform on the digital signal and calculating specific frequency band signal power values that are powers or amplitudes of the specific frequency band signals;
a signal position detection step of detecting positions of the specific frequency band signals from the digital signal to which the inverse property of the estimated chromatic dispersion has been applied in the chromatic dispersion compensation step;
a specific frequency band signal storage step of storing the specific frequency band signal power values detected in the signal position detection step;
a frequency offset detection step of estimating frequency positions of the specific frequency band signals from the specific frequency band signal power values stored in the specific frequency band signal storage step, and detecting a frequency offset between an optical signal receiving apparatus and an optical signal transmitting apparatus that perform optical communication;
a clock offset detection step of estimating the frequency positions of the specific frequency band signals from the specific frequency band signal power values stored in the specific frequency band signal storage step, and detecting a clock offset between the optical signal receiving apparatus and the optical signal transmitting apparatus from an interval between the frequency positions; and
a chromatic dispersion amount detection step of estimating temporal positions of the specific frequency band signals from the specific frequency band signal power values stored in the specific frequency band signal storage step, and detecting a chromatic dispersion amount from a difference between the temporal positions of the specific frequency band signals corresponding to different frequencies.

3. The method for establishing optical signal synchronization according to claim 2,
wherein the specific frequency band signal power value calculation step includes shifting a frequency region when calculating the specific frequency band signal power values in accordance with an amount of the frequency offset detected in the frequency offset detection step.

4. An optical signal synchronization system comprising:
an optical signal transmitting apparatus; and an optical signal receiving apparatus that performs optical communication with the optical signal transmitting apparatus,
wherein the optical signal transmitting apparatus includes a specific frequency band signal generating circuit that generates specific frequency band signals having power concentrated on two or more specific frequencies, and the optical signal receiving apparatus includes:
an analog/digital conversion circuit that receives a signal including the specific frequency band signals generated in the specific frequency band signal generating circuit, and converts the received signal into a digital signal;

a specific frequency band signal detecting circuit that detects positions of the specific frequency band signals from the digital signal converted in the analog/digital conversion circuit; and a reception signal property estimating circuit that estimates frequency positions of the specific frequency band signals detected in the specific frequency band signal detecting circuit, detects a frequency offset between the optical signal receiving apparatus and the optical signal transmitting apparatus, detecting a clock offset between the optical signal receiving apparatus and the optical signal transmitting apparatus from an interval between the frequency positions, estimating temporal positions of the specific frequency band signals detected in the specific frequency band signal detecting circuit, and detecting a chromatic dispersion amount from a difference between the temporal positions of the specific frequency band signals corresponding to different frequencies.

5. An optical signal synchronization system comprising:

an optical signal transmitting apparatus; and an optical signal receiving apparatus that performs optical communication with the optical signal transmitting apparatus, wherein the optical signal transmitting apparatus includes a specific frequency band signal generating circuit that generates specific frequency band signals having power concentrated on two or more specific frequencies, and the optical signal receiving apparatus includes:

an analog/digital conversion circuit that receives a signal including the specific frequency band signals generated in the specific frequency band signal generating circuit, and converts the received signal into a digital signal;

a chromatic dispersion compensating circuit that applies an inverse property of an estimated chromatic dispersion to the digital signal converted in the analog/digital conversion circuit;

a Fourier transform circuit that performs a discrete Fourier transform on the digital signal;

a specific frequency band signal detecting circuit that detects positions of the specific frequency band signals from the digital signal to which the inverse property of the estimated chromatic dispersion has been applied in the chromatic dispersion compensating circuit;

a specific frequency band signal storage circuit that stores specific frequency band signal power values that are powers or amplitudes of the specific frequency band signals detected in the specific frequency band signal detecting circuit; and a reception signal property estimating circuit that estimates frequency positions of the specific frequency band signals from the specific frequency band signal power values of the specific frequency band signals stored in the specific frequency band signal storage circuit, detects a frequency offset between the optical signal receiving apparatus and the optical signal transmitting apparatus, detects a clock offset between the optical signal receiving apparatus and the optical signal transmitting apparatus from an interval between the frequency positions, estimates temporal positions of the specific frequency band signals from the specific frequency band signal power values of the specific frequency band signals stored in the specific frequency band signal storage circuit, and detects a chromatic dispersion amount from a difference between the temporal positions of the specific frequency band signals corresponding to different frequencies.

* * * * *